(12) United States Patent
Yamada et al.

(10) Patent No.: US 6,947,114 B2
(45) Date of Patent: Sep. 20, 2005

(54) LCD ELEMENT INCLUDING REGIONS WHERE HELICAL AXES OF LC MOLECULES OF NEIGHBORING DOMAINS IN FOCALCONIC STATE EXTEND IN SAME DIRECTION

(75) Inventors: Jun Yamada, Takatsuki (JP);
Masakazu Okada, Kyoto (JP);
Kiyofumi Hashimoto, Suita (JP);
Mitsuyoshi Miyai, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/901,885

(22) Filed: Jul. 29, 2004

(65) Prior Publication Data

US 2005/0007531 A1 Jan. 13, 2005

Related U.S. Application Data

(62) Division of application No. 09/896,873, filed on Jun. 29, 2001, now Pat. No. 6,809,788.

(30) Foreign Application Priority Data

| Jun. 30, 2000 | (JP) | 2000-199023 |
| Aug. 4, 2000 | (JP) | 2000-236810 |
| Mar. 14, 2001 | (JP) | 2001-72054 |
| Mar. 14, 2001 | (JP) | 2001-72911 |

(51) Int. Cl.$^7$ .................. G02F 1/1337; C09K 9/02
(52) U.S. Cl. .................. 349/129; 349/169; 349/175; 349/185
(58) Field of Search .................. 349/129, 169, 349/175, 185

(56) References Cited

U.S. PATENT DOCUMENTS

| 5,384,067 A | 1/1995 | Doane et al. .......... 252/299.01 |
| 5,437,811 A | 8/1995 | Doane et al. .......... 252/299.01 |
| 5,453,863 A | 9/1995 | West et al. .................. 359/91 |
| 5,864,376 A | 1/1999 | Takatori .................. 349/129 |
| 5,889,566 A * | 3/1999 | Wu et al. .................. 349/35 |
| 6,034,752 A | 3/2000 | Khan et al. .................. 349/74 |
| 6,061,107 A | 5/2000 | Yang et al. .................. 349/86 |
| 6,104,448 A * | 8/2000 | Doane et al. .................. 349/12 |
| 6,124,908 A * | 9/2000 | Kobayashi et al. ......... 349/106 |
| 6,320,639 B1 | 11/2001 | Mori et al. .................. 349/155 |
| 6,757,039 B2 * | 6/2004 | Ma .................. 349/115 |

FOREIGN PATENT DOCUMENTS

| JP | 10-031205 A | 2/1998 |
| JP | 10-090728 A | 4/1998 |

OTHER PUBLICATIONS 13.3: Surface–Modified Reflective Cholesteric Displays, Z.–J. Lu, W.D. St. John, X.–Y. Huang, D.–K. Yang, J.W. Doane, Liquid Crystal Institute and Department of Physics, Kent State University, Kent, OH, SID 95 Digest, pp. 172–175.

M. Schadt et al., "Surface–Induced Parallel Alignment of Liquid Crystals By Linearly Polymerized Photopolymers", Japanese Journal of Applied Physics, Publication Office Japanese Journal of Applied Physics, Tokyo, JP, vol. 31, No. 7, Part 1, Jul. 1, 1992, pp. 2155–2164.

J. Chen et al., "Four–domain twisted nematic liquid crystal display fabricated by reverse rubbed polyimide process", Journal of Applied Physics, American Institute of Physics, New York, US, vol. 80, No. 4, Aug. 15, 1996, pp. 1985–1990.

* cited by examiner

*Primary Examiner*—Tarifur R. Chowdhury
(74) *Attorney, Agent, or Firm*—Sidley Austin Brown & Wood LLP

(57) ABSTRACT

A liquid crystal light modulation element is provided that includes a liquid crystal layer held between a pair of substrates. The liquid crystal layer includes a liquid crystal material that exhibits a cholesteric phase and has a plurality of domains. The liquid crystal layer includes regions where the helical axes of the liquid crystal molecules in a focal conic state extend in regular directions within a plane that is substantially parallel to the surface substrate.

50 Claims, 25 Drawing Sheets

Fig.5(PriorArt)
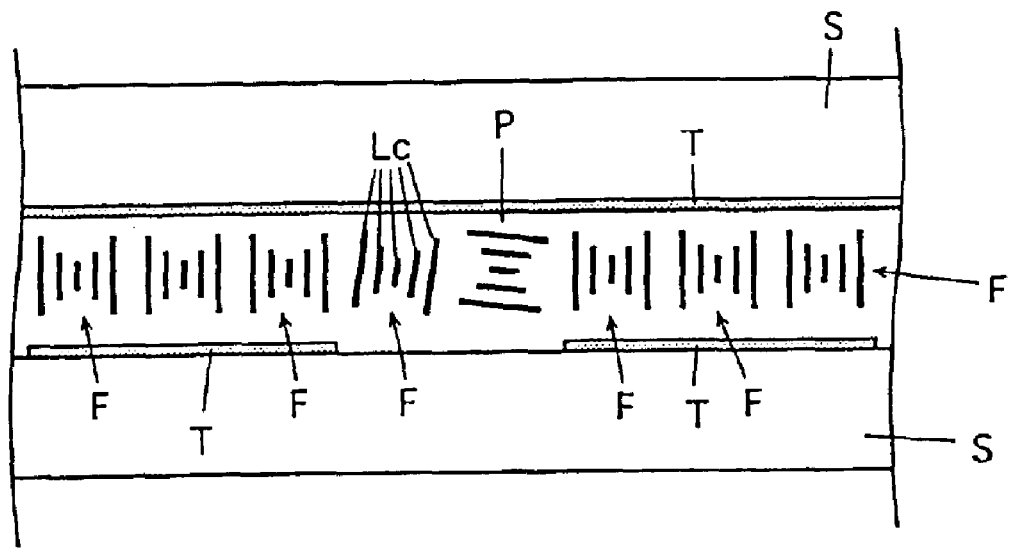
Fig.6(PriorArt)
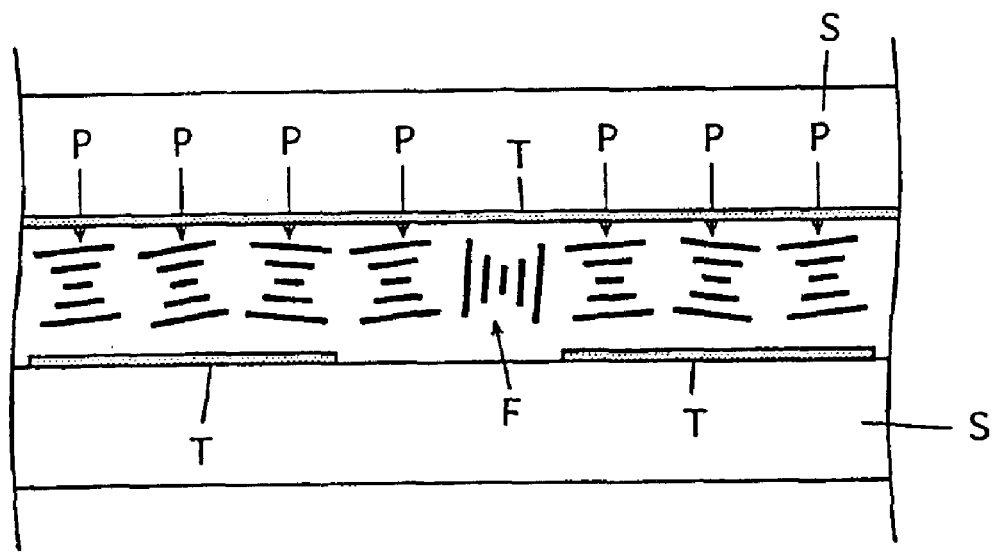

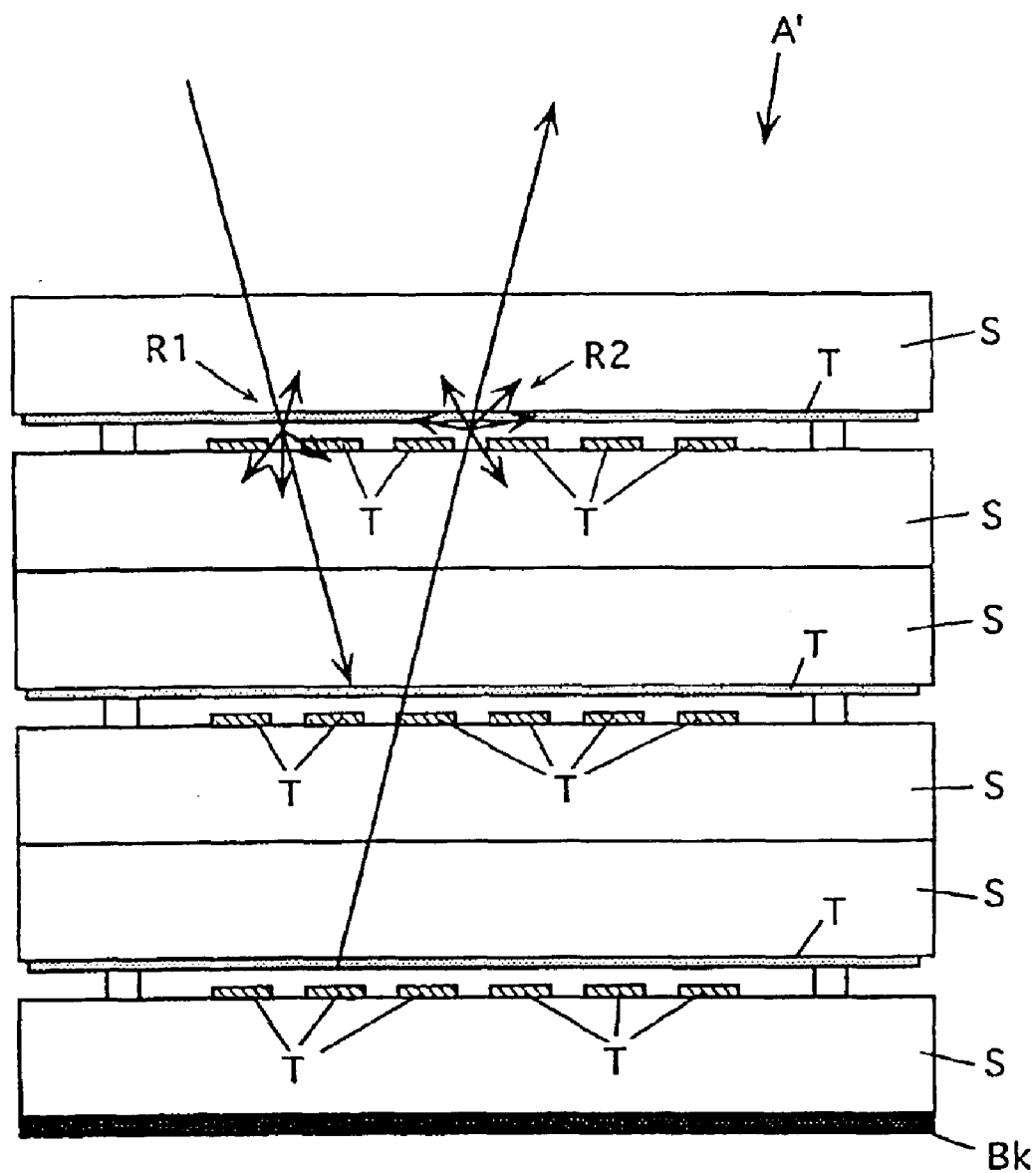
Fig.7(PriorArt)

Fig.18
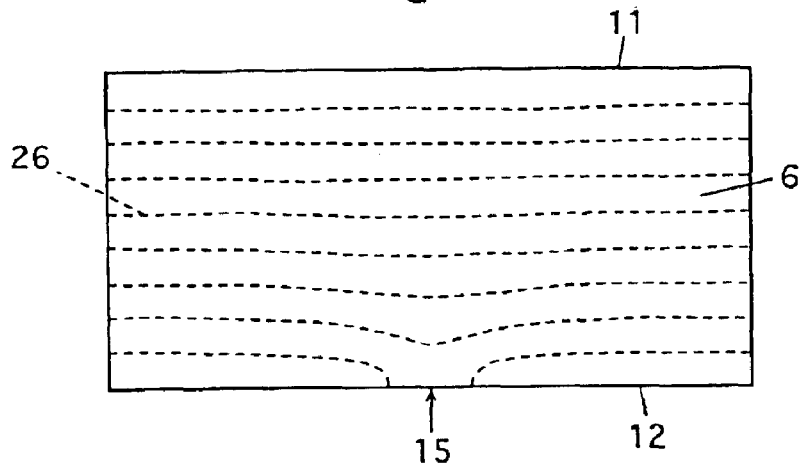
Fig.19
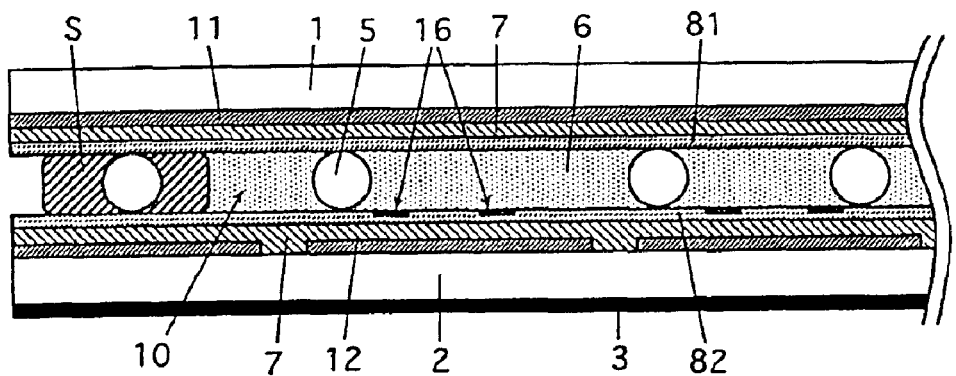
Fig.29 (PriorArt)
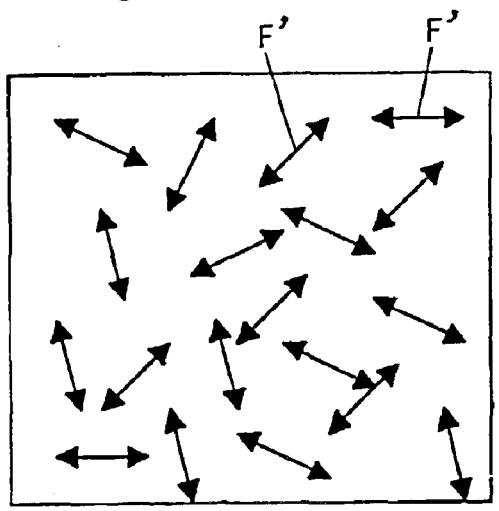

Fig.20(A)
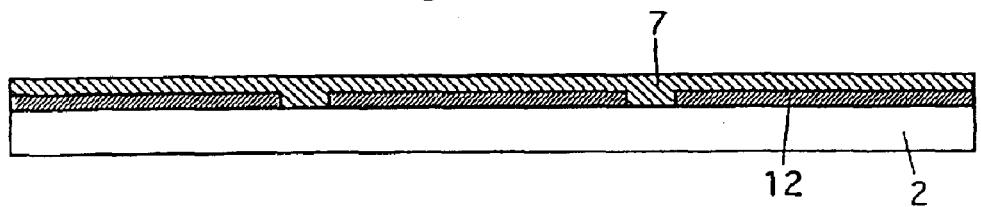
Fig.20(B)
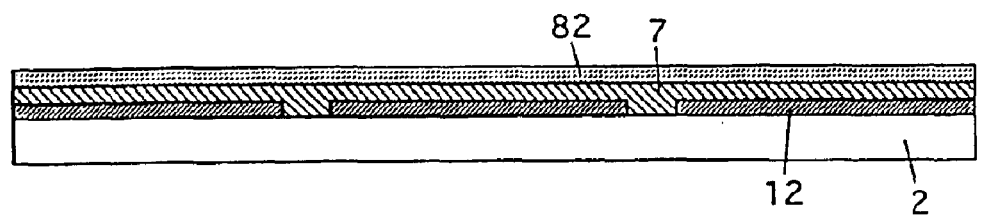
Fig.20(C)
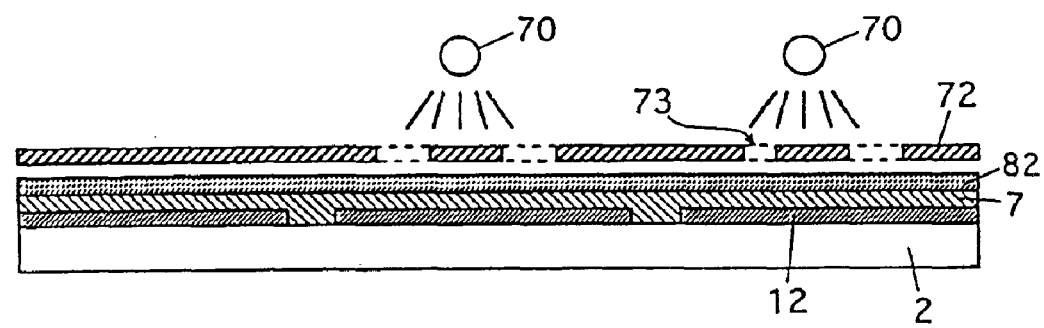
Fig.20(C')
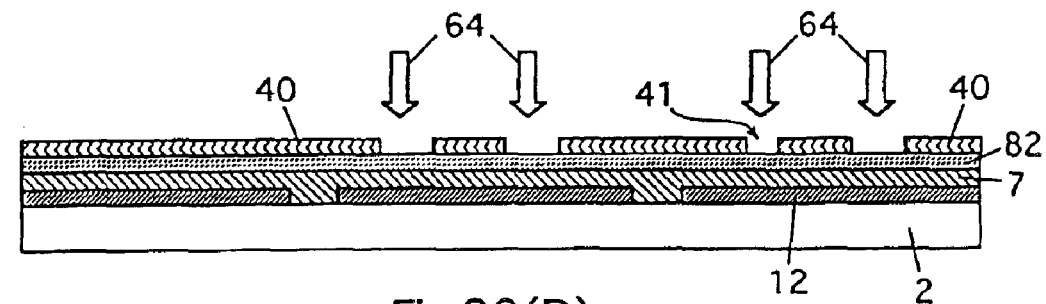
Fig.20(D)
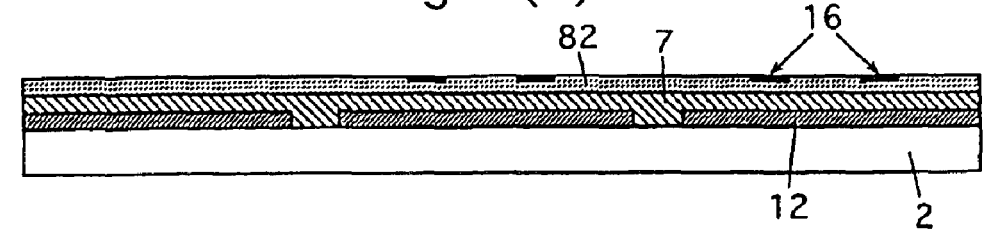

Fig.40(a)
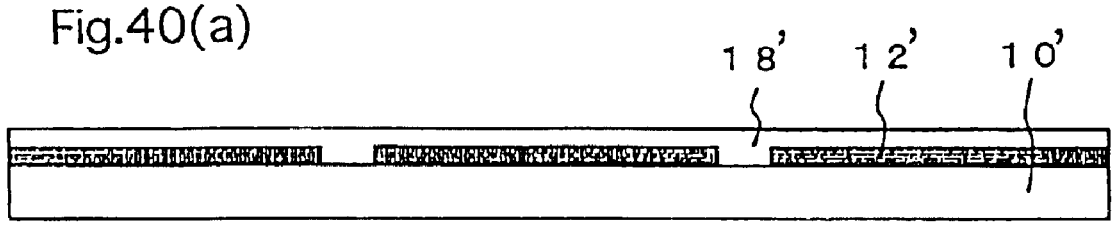
Fig.40(b)
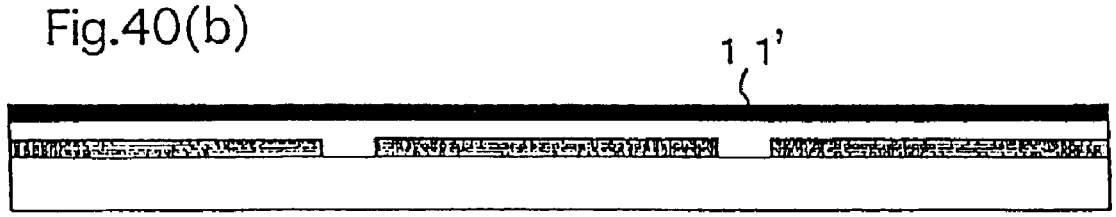
Fig.40(c)
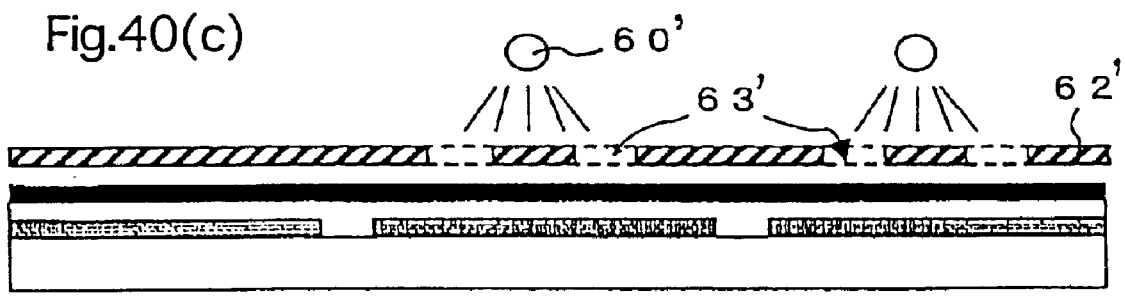
Fig.40(C')
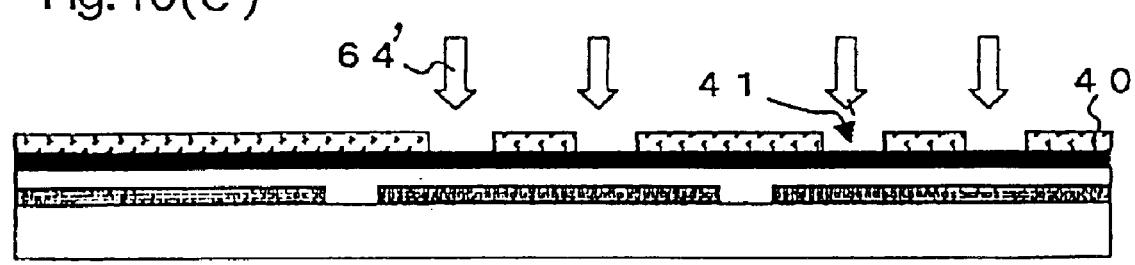
Fig.40(d)
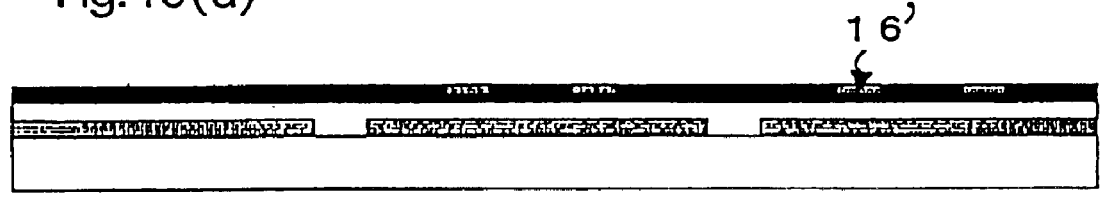

LCD ELEMENT INCLUDING REGIONS WHERE HELICAL AXES OF LC MOLECULES OF NEIGHBORING DOMAINS IN FOCALCONIC STATE EXTEND IN SAME DIRECTION

CROSS REFERENCE TO RELATED APPLICATION

This application is a divisional application of application Ser. No. 09/896,873, filed Jun. 29, 2001, now U.S. Pat. No. 6,809,788 which is based on patent application Nos. 2000-199023 Pat., 2000-236810 Pat., 2001-72054 Pat., and 2001-72911 Pat. filed in Japan, the entire contents of which are hereby incorporated by reference.

BACKGROUND OF THE INVENTION

1. Field of the Invention

The present invention relates to a liquid crystal display element, and in other words, a liquid crystal light modulation element and method of producing the same.

2. Description of the Background Art

The liquid crystal display element and, in other words, the liquid crystal light modulation element primarily includes a pair of substrates, between which a liquid crystal layer including liquid crystal material is held. For example, predetermined drive voltage is applied to the liquid crystal layer to control orientation of liquid crystal molecules in the liquid crystal layer so that external light incident on the liquid crystal light modulation element is modulated to perform intended display of images or the like.

The liquid crystal light modulation element using the cholesteric liquid crystal has been known as the above kind of liquid crystal light modulation element, and various studies have been made.

Examples of the cholesteric liquid crystal are, e.g., liquid crystal, which exhibits the cholesteric phase by itself, and chiral nematic liquid crystal obtained by adding a chiral agent to nematic liquid crystal.

The cholesteric liquid crystal has such a feature that the liquid crystal molecules form helical structures, and can exhibit three states, i.e., a planar state, focal conic state and a homeotropic state when it is held between a pair of substrates, and is subjected to an external stimulus such as an electric field, a magnetic field or a heat.

In the liquid crystal light modulation element (e.g., liquid crystal display element) using the cholesteric liquid crystal, these three states exhibit different light transparencies and reflectances. Therefore, the three states and the manner of applying the external stimulus can be appropriately selected to perform the display. For example, the display may be performed in the cholesteric-nematic phase transfer mode using the homeotropic state and the focal conic state, and may be performed in a bistable mode using the planar state and the focal conic state.

Among them, the display in the bistable mode has such a feature that the planar state and the focal conic state are stable even in the state where no external stimulus is applied, and thus has the bistability (memory property), which maintains the display state even when no external stimulus (e.g., voltage) is applied. For the above reason, the liquid crystal light modulation element using the cholesteric liquid crystal has been increasingly studied in recent years as the memorizable element (display element achieving the stable display state).

In particular, the liquid crystal light modulation element using the cholesteric liquid crystal, which exhibits the selective reflection property in the visible wavelength range when it is in the planar state, has the memorizable property, and can achieve a bright reflection state. In other words, it can perform bright display without using a polarizing plate or a color filter. Therefore, it is expected that the liquid crystal light modulation element described above can be used as a display element, which is very effective at reducing the power consumption, and can be used as a display element of, e.g., a mobile telephone requiring low power consumption.

The liquid crystal having the bistability can be stable in both the planar state (i.e., the state of the planar orientation), where the helical axis of the cholesteric liquid crystal is substantially perpendicular to the substrate surface, and the liquid crystal exhibits the selective reflection state, and the focal conic state (the state of the focal conic orientation), where the helical axis of the liquid crystal is substantially parallel to the substrate surface, and the liquid crystal is transparent to the visible light.

However, in the liquid crystal display element utilizing the selective reflection characteristics of the cholesteric liquid crystal, the reflection wavelength shifts toward the shorter side in accordance with the incident angle of the light and observation angle because it employs the reflection manner using the light interference.

This phenomenon becomes more remarkable as the helical axis of the cholesteric liquid crystal in the planar orientation is closer to the vertical direction to the substrate surface. In particular, a TN liquid crystal element and an STN liquid crystal element may use a pair of substrates having deposited and rubbed polyimide thin films thereon for holding a liquid crystal layer therebetween, in which case the helical axis of the cholesteric liquid crystal is perfectly or substantially perfectly perpendicular to the substrate surface, resulting in an extremely narrow view angle. If the above liquid crystal element is used as the display element, therefore, the viewability becomes extremely low.

The rubbing of the thin polyimide film increases the restricting force on a polyimide interface so that it becomes difficult to maintain the focal conic state. Consequently, the bistability, which is the distinctive feature of the cholesteric liquid crystal, may be lost.

For avoiding the above, it has been attempted to incline slightly the helical axis of the cholesteric liquid crystal with respect to the normal of the substrate. One of such attempts is called PSCT (Polymer Stabilized Cholesteric Texture), in which polymers are dispersed in the cholesteric liquid crystal so that the helical axes may be positioned in random directions owing to mutual operations between the polymers and the liquid crystal (U.S. Pat. No. 5,384,067). According to this method, however, mixing of the polymer in the liquid crystal material may lower the reliability of the element, and/or may require the increased drive voltage.

In another method, a polyimide film not subjected to the rubbing is deposited on substrate surface opposed to the liquid crystal so that the helical axis may be inclined. In this method, however, domains including different directions of the inclined helical axes (directions of the helical axes projected onto the substrate) are formed randomly so that scattering of the incident light is liable to occur due to the difference in refractive index between the domains, resulting in lowering of the purity of the display color in the selective reflection. In a multilayer liquid crystal display element employing a multilayer structure for multicolor display, the reflection light from the lower layer is liable to be affected by light scattering by an upper layer, which lowers both the contrast and color purity.

For improving the characteristics of the cholesteric liquid crystal element, in which the liquid crystal is held between the substrates provided with the polyimide films not subjected to the orientation processing, Japanese Laid-open Patent Publication No. 10-31205 (31205/1998) has disclosed the following manner. Different surface treatments are effected on the polyimide films formed on the substrates on the observation side and the non-observation (opposite) side, respectively. More specifically, the rubbing processing is effected on only the polyimide film on the non-observation side, and the liquid crystal domains on the observation side may be the non-orientation random domains (polydomain state). Thereby, the helical axes of the liquid crystal on the non-observation side may be substantially perfectly perpendicular to the substrate surface, and the liquid crystal domains on the non-observation side may be uniform (mono-domain state).

According to this manner, however, the rubbing is effected on the whole polyimide film area of the substrate on the non-observation side. Therefore, the liquid crystal domains form the monodomain state on the whole substrate so that the stability in the focal conic state is liable to lower, and the bistability, which is the feature of the cholesteric liquid crystal element, is may be impaired. In the planar orientation state, the inclination of helical axes of the liquid crystal on the random domain side is gradually lost, which impairs the long-term bistability. In any one of the above case, it is difficult to maintain the display state (good display state with high contrast and color purity) for a long time without voltage application, and it is difficult to achieve the intended characteristics for high contrast and high color purity together with the bistability.

In the focal conic state of the cholesteric liquid crystal, the helical axes of liquid crystal molecules are parallel to the substrate plane. Usually, the liquid crystal has a plurality of liquid crystal molecule regions (liquid crystal domains). In the focal conic state, the helical axes of the liquid crystal are parallel or substantially parallel to each other in each liquid crystal domain, but the directions F' of the helical axes in the neighboring liquid crystal domains are not parallel to each other as shown in FIG. 29. Accordingly, due to the difference in refractive index between the liquid crystal domains, the light incident on the liquid crystal element is slightly scattered at an interface between the liquid crystal domains. In particular, if the helical pitch is small (more specifically, if the helical pitch of the liquid crystal in the planar state is small to cause the selective reflection in the visible range), the liquid crystal domains become small in principle, and the light scattering occurs to a large extent in the element so that employment thereof in the display element cause low contrast.

It is also known to use an element (multilayer liquid crystal element) formed of a plurality of liquid crystal layers stacked together and, e.g., having different selective reflection wavelengths, respectively, for providing a multilayer liquid crystal light modulation element, which allows color display in two or more colors (e.g., full color display). In the case of this multilayer structure, multiple-scattering or the like between the liquid crystal layers particularly increases the influence due to the scattering between the domains so that the contrast is liable to be low.

In the display region of the liquid crystal display element (liquid crystal light modulation element), electrodes are not located on the opposite sides of the liquid crystal in the region other than the pixels, and thus, the non-pixel region (the inter-pixel region). Therefore, the molecules of the liquid crystal in such region cannot be controlled. This results in the following disadvantage.

If the liquid crystal between the substrates is in the planar state (e.g., in the case where a multilayer liquid crystal display element is to be formed by stacking and adhering the plurality of liquid crystal display elements under a pressure, and particularly the liquid crystal between the substrates in each liquid crystal display element is in the planar state due to the pressure), a predetermined voltage may be applied to the liquid crystal of the pixel(s) in one or more liquid crystal display elements for changing the liquid crystal in the pixel(s) into the focal conic state, whereby the molecular orientation of the liquid crystal of the pixel(s) is controlled to attain the focal conic state, as shown in FIG. 5. However, the liquid crystal between the neighboring pixels is affected by the applied voltage, and thereby partially attains the focal conic state so that the focal conic state and the planar state are mixed in the liquid crystal between the pixels. In this mixed state, the domains of the different state may be adjacent to each other. In general, as compared with the case of only the planar state alone, the domains are small in the case where the two states are mixed, and therefore incident light is liable to scatter. Further, selective reflection of the incident light may partially occur.

In the liquid crystal display element, a predetermined voltage may be applied to the liquid crystal of the pixel for changing it from the focal conic state to the planar state. In this case, as shown in FIG. 6, the molecular orientation of liquid crystal of the pixel is controlled to attain the planar state. However, the liquid crystal between the neighboring pixels is affected by the applied voltage to attaint partially the planar state. Thus, the planar state and the focal conic state are mixed in the liquid crystal between the pixels.

For the above reasons, the planar state and the focal conic state are mixed in the liquid crystal between the pixels in the liquid crystal display element. In FIGS. 5 and 6, S indicates the substrate, T indicates the electrode, Lc indicates the liquid crystal molecules, P indicates the planar orientation state of the liquid crystal molecules, and F indicates the focal conic orientation state of the liquid crystal molecules.

As described above, a part of the incident light is selectively reflected and scattered by the liquid crystal between the pixels due to mixing of the focal conic state and the planar state of the liquid crystal between the pixels. This deteriorates the display characteristics of the liquid crystal display element.

According to the study by the inventors, if the rubbing processing is not effected on the substrate surface or the like for controlling the orientation directions of the liquid crystal molecules in the liquid crystal display element of the reflection type, the liquid crystal molecules between the substrates tend to be positioned in the random directions so that the view angle range allowing good observation of the display can be increased. This is already known.

However, if the rubbing processing is not effected for increasing the view angle, the liquid crystal molecules between the pixels are positioned in random directions. Therefore, the liquid crystal between the pixels forms small domains, and light scattering is liable to occur on the boundary between the domains.

As described above, in the liquid crystal display element or in the multilayer liquid crystal display element formed of the plurality of liquid crystal layers stacked together, the incident light may be scattered or selectively reflected (R1 in FIG. 7) if the light is applied to the liquid crystal between the pixels in each liquid crystal display element without effecting no control on the molecular orientation, as shown in FIG. 7.

In the multilayer liquid crystal display element A', as shown in FIG. 7, the liquid crystal in the non-pixel region on the upper side (image observation side), i.e., the liquid crystal in the regions between the pixels scatters the light, which is selectively reflected by the liquid crystal display element lower than the liquid crystal display element nearest to the observation side, and passes toward the observation side (R2 in FIG. 7).

In this state, when performing the color display using the stacked liquid crystal display elements for display in red, green and blue, respectively, white display can be performed with high brightness owing to the selective reflection and scattering by the liquid crystal in the non-pixel domains. However, when performing, e.g., the black display by a light absorbing layer Bk in the focal conic state of the liquid crystal in the pixels, the black display is blurred due to the selective reflection and scattering of the incident light by the liquid crystal between the pixels, resulting in low contrast of the image display. Further, since the selective reflection and scattering of the incident light are caused by the liquid crystal between the pixels, and the liquid crystal between the pixels scatters the light, which is selectively reflected by the lower layer toward the observation side, these lower the color purity in display.

In any one of the above cases, the optimum solution has not yet achieved in connection with the orientation control of the liquid crystal in the above types of liquid crystal display element.

SUMMARY OF THE INVENTION

A primary object of the invention is to provide a liquid crystal display element capable of image display with high quality.

Another object of the invention is to provide a liquid crystal display element capable of image display with high contrast.

Still another object of the invention is to provide a liquid crystal display element capable of image display with good color purity.

Yet another object of the invention is to provide a method of producing such an improved liquid crystal display element.

The invention provides the following liquid crystal display elements (liquid crystal light (optical) modulation elements) and methods of producing the same.
(1) Liquid Crystal Display Element (Liquid Crystal Light (Optical) Modulation Element)
(1-1) First Element A liquid crystal display element including a liquid crystal layer including liquid crystal contained between a pair of substrates and exhibiting a cholesteric phase, wherein an orientation film is arranged on at least one of the paired substrates, and is in contact with the liquid crystal layer, and liquid crystal molecular orientation processing for portions of each orientation film corresponding to pixel regions is effected in a manner different from that effected on at least a portion of a portion corresponding to non-pixel region (inter-pixel region) of the orientation film on at least one of the substrates.

The invention also provides a multilayer liquid crystal display element formed of the plurality of first liquid crystal display elements stacked together.
(1-2) Second Element A liquid crystal display element including a liquid crystal layer arranged between a pair of substrates and including liquid crystal exhibiting a cholesteric phase, and a plurality of pixels, wherein an orientation film is formed on at least one of the substrates, and liquid crystal molecular orientation processing is effected on at least a portion of a portion corresponding to non-pixel region (inter-pixel region) of the orientation film.

The invention also provides a multilayer liquid crystal display element formed of the plurality of second liquid crystal display elements stacked together.
(1-3) Third Element A liquid crystal display element formed of a plurality of liquid crystal layers stacked together and each held between a pair of substrates, wherein at least one of the plurality of liquid crystal layers is provided with an orientation film arranged on at least one of the paired substrates holding the liquid crystal layer therebetween and being in contact with the liquid crystal layer, and liquid crystal molecular orientation processing for portions of each orientation film corresponding to pixel regions is effected in a manner different from that effected on at least a portion of a portion corresponding to non-pixel region (inter-pixel region) of the orientation film on at least one of the substrates.

The invention further provides fourth and fifth elements as well as first and second element producing methods described later. These are based on the following findings of the inventors.

In the liquid crystal light (optical) modulation element including a pair of substrates and a liquid crystal layer held between the substrates and including a liquid crystal material, which exhibits a cholesteric phase in a room temperature and has a peak of a selective reflection wavelength in a visible wavelength range, a mixed state of a polydomain state and a monodomain state may be attained in the liquid crystal domains of the pixel regions near at least one of the substrates holding the liquid crystal layer in the selective reflection state. Alternatively, the polydomain state may be achieved in each of the liquid crystal domains of the pixel regions near the substrates of the liquid crystal layer in the selective reflection state. Thereby, the liquid crystal in the liquid crystal domains in the pixel region near one of the opposite substrates may have the cholesteric helical axes different in angle with respect to a normal of the substrate from that of the other substrate. Thereby, the reflected light can be collected on the front surface on the element observation side, and the good image display with high brightness, contrast and color purity can be performed. Further, when no external stimulus (e.g., no voltage) is applied, the display state (image display with high brightness, contrast and color purity) can be maintained for a long term.

The above "polydomain state" is a bunch of domains, where the helical axes of the liquid crystal in the selective reflection state are slightly inclined with respect to the substrate normal, and the directions of the helical axes projected on the substrate are randomly different among the domains. The "monodomain state" is a bunch of domains where the helical axes of the liquid crystal are perpendicular or substantially perpendicular to the substrate surface, and thus extend in a uniform direction.
(1-4) Fourth Element A liquid crystal light (optical) modulation element including a liquid crystal layer held between a pair of substrates and including a liquid crystal material exhibiting a cholesteric phase in a room temperature and having a peak of a selective reflection wavelength in a visible wavelength range, wherein the liquid crystal layer in a selective reflection state has pixel regions neighboring to the opposite substrates, respectively, and liquid crystal domains in the pixel regions neighboring to at least one of the substrates are in a mixed state of a polydomain state and a monodomain state.

(1-5) Fifth Element

A liquid crystal light (optical) modulation element including a liquid crystal layer held between a pair of substrates and including a liquid crystal material exhibiting a cholesteric phase in a room temperature and having a peak of a selective reflection wavelength in a visible wavelength range, wherein the liquid crystal layer in a selective reflection state has pixel regions neighboring to the opposite substrates, respectively, each of liquid crystal domains in the pixel regions take a polydomain state, and angles of the cholesteric helical axes of the liquid crystal with respect to the substrate normal are different between the liquid crystal domains in the pixel regions near one of the opposite substrates and the liquid crystal domains in the pixel regions near the other substrate.

The invention also provides a liquid crystal light (optical) modulation element, in which a plurality of liquid crystals each held between a pair of substrates are stacked, and at least one of the plurality of liquid crystal layers forms together with the corresponding pair of substrates holding the liquid crystal layer said fourth or fifth liquid crystal optical modulation element.

The inventors have also found such a phenomenon that scattering between the domains is remarkably reduced by aligning the directions of the helical axes of the cholesteric liquid crystal molecules in the focal conic state, and provides a sixth element and a third element producing method described later based on the above finding.

(1-6) Sixth Element

A liquid crystal light (optical) modulation element for performing light (optical) modulation by utilizing a focal conic state of liquid crystal molecules included in a liquid crystal layer held between a pair of substrates, wherein helical axes of the liquid crystal molecules in the focal conic state extend in regular directions within a plane substantially parallel to a substrate surface.

As an element of the same kind as the above, the invention provides a liquid crystal light (optical) modulation element for performing light (optical) modulation by utilizing a focal conic state of liquid crystal molecules included in a liquid crystal layer held between a pair of substrates, wherein orientation regulating means for the liquid crystal molecules is employed for orientating the helical axes of the liquid crystal molecules in the focal conic state in regular directions within a plane substantially parallel to a substrate surface.

The invention also provides a multilayer liquid crystal display element formed of the plurality of said liquid crystal optical modulation elements stacked together.

(2) Method of Producing Liquid Crystal Display Element (Liquid Crystal Light (Optical) Modulation Element)

(2-1) First Element Producing Method

A method of producing a liquid crystal light (optical) modulation element including a liquid crystal layer held between a pair of substrates and including a liquid crystal material exhibiting a cholesteric phase at a room temperature and having a peak of a selective reflection wavelength in a visible wavelength range, including:

a substrate processing step of processing at least one of the paired substrates such that the liquid crystal layer in the selective reflection state has pixel regions neighboring to the opposite substrates, respectively, and liquid crystal domains in the pixel regions neighboring to at least one of the substrates are in a mixed state of a polydomain state and a monodomain state; and a step of arranging the liquid crystal layer between the paired substrates including the substrate(s) subjected to the substrate processing step.

(2-2) Second Element Producing Method

A method of producing a liquid crystal light (optical) modulation element including a liquid crystal layer held between a pair of substrates and including a liquid crystal material exhibiting a cholesteric phase at a room temperature and having a peak of a selective reflection wavelength in a visible wavelength range, including:

a substrate processing step of processing the paired substrates such that the liquid crystal layer in the selective reflection state has pixel regions neighboring to the opposite substrates, respectively, liquid crystal domains in the pixel regions take a polydomain state, and the angles of the cholesteric helical axes of the liquid crystal with respect to the substrate normal are different between the liquid crystal domains in the pixel regions near one of the opposite substrates and the liquid crystal domains in the pixel regions near the other substrate; and a step of arranging the liquid crystal layer between the paired substrates subjected to the substrate processing step.

(2-3) Third Element Producing Method

A method of producing a liquid crystal light (optical) modulation element for performing light (optical) modulation by utilizing a focal conic state of liquid crystal molecules included in a liquid crystal layer held between a pair of substrates, including the steps of providing orientation regulating means (e.g., a projected structure, a groove in an electrode formed on the substrate, an insulating film having a groove and formed on the substrate, a region on the substrate having partially different orientation regulating force) for the liquid crystal molecules for orientating helical axes of the liquid crystal molecules in the focal conic state on at least one of the substrates; and a step of arranging the liquid crystal layer between the paired substrates.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 schematically shows a focal conic state of a liquid crystal display element in the prior art.

FIG. 6 schematically shows a planar state of a liquid crystal display element in the prior art.

FIG. 7 is a schematic cross section of a three-layer liquid crystal display element in the prior art.

FIG. 18 shows a state where distortion occurs in equal potential lines near a slit in the liquid crystal light modulation element having an electrode provided with the slit.

FIG. 19 shows further another modified liquid crystal light modulation element similar to that shown in FIG. 9, and particularly an example in which a partially processed region is formed on an orientation control layer (orientation film).

FIGS. 20(A)–20(D) show, by way of example, steps of producing a liquid crystal light modulation element, and FIG. 20(A) shows a step of forming an insulating film on an electrode surface of a substrate provided with an electrode pattern, FIG. 20(B) shows a step of forming an orientation film on the insulating film, FIG. 20(C) shows a step of exposing the orientation film with a light source through openings in a mask, FIG. 20(C') shows a step of forming a resist film on the orientation film, patterning the resist film and rubbing the orientation film through openings in the resist film, and FIG. 20(D) is a step of removing the resist film and obtaining partially processed regions.

FIG. 29 is a view showing directions of helical axes of respective liquid crystal domains in the focal conic state in a conventional liquid crystal element.

FIGS. 40(a)–40(d) show by way of example steps of producing a liquid crystal light modulation element.

DESCRIPTION OF THE PREFERRED EMBODIMENTS

Figure 1:
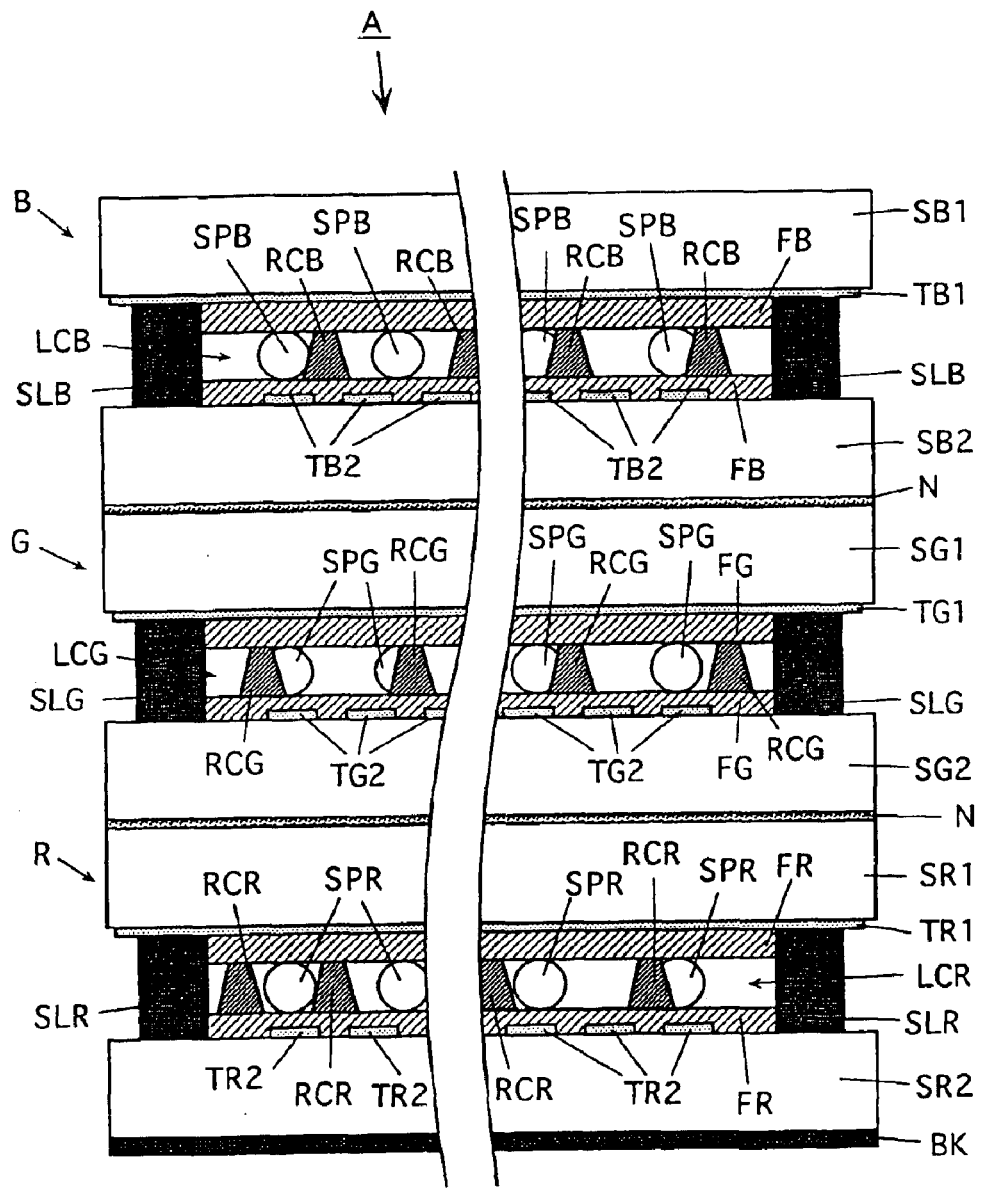
FIG. 1 is a schematic cross section of an example of a three-layer liquid crystal display element.

(1) With Respect to First, Second and Third Liquid Crystal Display Element

(1-1) First Element

A first liquid crystal display element includes a liquid crystal layer including liquid crystal contained between a pair of substrates and exhibiting a cholesteric phase.

An orientation film is arranged on at least one of the paired substrates, and is in contact with the liquid crystal layer, and liquid crystal molecular orientation processing for portions of each orientation film corresponding to pixel regions is effected in a manner different from that effected on at least a portion of a portion corresponding to non-pixel region (inter-pixel region) of the orientation film on at least one of the substrates.

A multilayer liquid crystal display element may be formed of the plurality of first liquid crystal display elements stacked together.

In the liquid crystal display element and the multilayer liquid crystal display element described above, the orientation film is arranged on one of or each of the paired substrates of the liquid crystal display element, and is in contact with the liquid crystal layer. The liquid crystal molecular orientation processing for each orientation film is performed such that the processing for portions of each orientation film corresponding to the pixel regions is effected in a manner different from that effected on at least a portion of the portion corresponding to non-pixel region of the orientation film on at least one of the substrates (i.e., one or both of the orientation films in the case where the orientation films are arranged on both the paired substrates, and one orientation film in the case where the orientation film is formed on only one substrate). Accordingly, the orientation processing for the orientation film portion corresponding to the non-pixel region (inter-pixel region) can be performed independently, and thereby the molecular orientation of the liquid crystal between the pixels can be controlled so that the selective reflection of a part of incident light by the liquid crystal between the pixels as well as the scattering of the incident light can be suppressed. In the liquid crystal display element, the optical characteristics such as contrast can be improved owing to the above.

In the multilayer liquid crystal display element, the selective reflection of a part of incident light by the liquid crystal between the pixels as well as the scattering of the incident light can likewise be suppressed in each of the stacked elements. Further, such a situation can be prevented that the light scattering by the liquid crystal between the pixels in the liquid crystal display element on the upper side (image observation side) is caused when the light selectively reflected by the liquid crystal display element, which is located at a lower level than the liquid crystal display element on the end of the image observation side, passes toward the observation side. Thereby, the monochrome (e.g., black and white) image display can be performed with good contrast, and the color display can be performed with high color impurity.

For the orientation film provided on at least one of the substrates in the liquid crystal display element described above, the liquid crystal molecular orientation processing may be performed in different manners on the portions corresponding to the pixel regions and at least a portion of the portion corresponding to the non-pixel region (inter-pixel region) (i.e., regions between the pixels), respectively.

The orientation films may be arranged on the opposite substrates, respectively, in which case the liquid crystal molecular orientation processing for each orientation film may be performed in different manners on the portions corresponding to the pixel regions and at least a portion of the portion corresponding to the non-pixel region, respectively.

The "liquid crystal molecular orientation processing" also includes a case where the orientation processing is not effected. For example, the orientation processing may not be effected on the portions corresponding to the pixel regions of the orientation film, and the orientation processing may be effected on at least a portion of the portion corresponding to the non-pixel region.

(1-2) Second Liquid Crystal Display Element

As a liquid crystal display element having advantages similar to the above, following element is provided.

A liquid crystal display element including a liquid crystal layer arranged between a pair of substrates and containing liquid crystal exhibiting a cholesteric phase, and a plurality of pixels, wherein an orientation film is formed on at least one of the substrates, and liquid crystal molecular orientation processing is effected on at least a portion of a portion corresponding to non-pixel region (inter-pixel region) of the orientation film.

The invention also provides a multilayer liquid crystal display element formed of the plurality of second liquid crystal display elements stacked together.

(1-3) Third Element

As a liquid crystal display element having advantages similar to the above, following mitilayer element is provided.

A liquid crystal display element formed of a plurality of liquid crystal layers stacked together and each held between a pair of substrates, wherein at least one of the plurality of liquid crystal layers is provided with an orientation film arranged on at least one of the paired substrates holding the liquid crystal layer therebetween and being in contact with the liquid crystal layer, and liquid crystal molecular orientation processing for portions of each orientation film corresponding to pixel regions is effected in a manner different from that effected on at least a portion of a portion corresponding to non-pixel region (inter-pixel region) of the orientation film on at least one of the substrates.

In this element, it is not necessary that different substrates, which are dedicated to the neighboring liquid crystal layers, respectively, are arranged between the neighboring liquid crystal layers, and a common substrate may be arranged between the neighboring liquid crystal layers.

In this multilayer liquid crystal display element, the above orientation film may be employed for at least one (or only one) liquid crystal layer.

The multilayer liquid crystal display element may be provided with the orientation film arranged on at least one of the paired substrates holding each of the liquid crystal layers, and liquid crystal molecular orientation processing for portions of each orientation film of each liquid crystal layer corresponding to pixel regions may be effected in a manner different from that effected on at least a portion of a portion corresponding to non-pixel region (inter-pixel region) of the orientation film on at least one of the paired substrates.

In the orientation film arranged on at least one of the paired substrates holding the liquid crystal layer therebetween, the liquid crystal molecular orientation processing may be effected on the portions corresponding to the pixel regions and at least a portion of the portion corresponding to the non-pixel region in different manners, respectively.

The orientation films may be arranged on all the substrate surfaces opposed to each liquid crystal layer.

(1-4) Features Common to the First to Third Elements

In any one of the above elements, the orientation processing effected on at least a portion of the portion corresponding to the non-pixel region of the orientation film may be performed to set the liquid crystal of the inter-pixel region corresponding to the orientation-processed portion to the planar state.

The orientation processing of the orientation film may be rubbing processing or optical orientation processing.

If the processing is effected on at least a portion of the portion corresponding to the non-pixel region of the orientation film to set the liquid crystal of the inter-pixel region to the planar state, such setting can be achieved by horizontal orientation processing performed by rubbing of the orientation film.

By setting the liquid crystal between the pixels to the perfect or substantially perfect planar state providing large domains, the scattering of light at the boundary between the domains can be significantly reduced. Since the liquid crystal molecules in the planar state are orientated in the same direction, the light which is reflected by the regular reflection is selectively reflected, and other light passes so that the selectively reflected light cannot be viewed on the image observation side unless it is observed from a specific direction that matches with the regular reflection.

In the case of the multilayer liquid crystal display element, the transparency of the liquid crystal between the pixels can be increased, and the attenuation of the light reflected by the lower layer can be reduced when leading the light toward the image observation side. Therefore, the color image display of high quality can be performed.

From now on, the liquid crystal display elements will be improved to attain higher resolutions and smaller pixel pitches. Therefore, the rate of inter-pixel regions forming the non-pixel regions in the image display screen will increase. The above type of liquid crystal display elements are advantageous in view of these facts.

(1-5) With Respect to Image Display Elements Shown in Figures and Others

The liquid crystal display elements of the foregoing types and others will now be described with reference to FIGS. 1–8.

FIG. 1 is a schematic cross section of an example of the multilayer liquid crystal display element.

A multilayer liquid crystal display element $\underline{A}$ shown in FIG. 1 is formed of liquid crystal display elements B, G and R, which are employed for display in blue, green and red, respectively. These elements B, G and R are stacked in this order, and are adhered together by adhesives N.

In the liquid crystal display element B, a liquid crystal layer LCB exhibiting a cholesteric phase for image display in blue is held between a pair of transparent substrates SB1 and SB2 opposed together.

Each of substrates SB1 and SB2 is provided with electrodes TB1 and TB2 on the surfaces opposed to the liquid crystal layer LCB, respectively. The electrode TB1 is formed of a plurality of thin belt-like electrodes extending in the longitudinal direction of the substrate SB1. The electrode TB2 is likewise formed of a plurality of thin belt-like electrodes extending parallel to the short side of the substrate SB2, and thus perpendicularly to the electrode TB1.

The substrates SB1 and SB2 are further provided with orientation films FB. The orientation film FB covers the electrodes, and is in contact with the liquid crystal layer LCB.

The liquid crystal layer LCB includes spacers SPB and resin structures RCB. The spacers SPB and resin columns RCB maintain a predetermined space or distance between the opposite substrates. Elements G and R, which will be described later, employ similar spacers and resin columns for the same purpose as the above.

The liquid crystal layer LCB is surrounded by a seal wall SLB for sealing the periphery of the space between the substrates. The seal wall SLB is formed of, e.g., thermoplastic resin or thermosetting resin, although not restricted thereto.

In the liquid crystal display element G, a liquid crystal layer LCG exhibiting a cholesteric phase for image display in green is held between a pair of transparent substrates SG1 and SG2 opposed together.

Each of substrates SG1 and SG2 is provided with electrodes TG1 and TG2 on the surfaces opposed to the liquid crystal layer LCG, respectively. The electrode TG1 is formed of a plurality of thin belt-like electrodes extending in the longitudinal direction of the substrate SG1. The electrode TG2 is likewise formed of a plurality of thin belt-like electrodes extending parallel to the short side of the substrate SG2, and thus perpendicularly to the electrode TG1.

The substrates SG1 and SG2 are further provided with orientation films FG.

The liquid crystal layer LCG includes spacers SPG and resin structures RCG.

The liquid crystal layer LCG is surrounded by a seal wall SLG for sealing the periphery of the space between the substrates.

In the liquid crystal display element R, a liquid crystal layer LCR exhibiting a cholesteric phase for image display in red is held between a pair of transparent substrates SR1 and SR2 opposed together.

Each of substrates SR1 and SR2 is provided with electrodes TR1 and TR2 on the surfaces opposed to the liquid crystal layer LCR, respectively. The electrode TR1 is formed of a plurality of thin belt-like electrodes extending in the longitudinal direction of the substrate SR1. The electrode TR2 is likewise formed of a plurality of thin belt-like electrodes extending parallel to the short side of the substrate SR2, and thus perpendicularly to the electrode TR1.

The substrates SR1 and SR2 are further provided with orientation films FR.

The liquid crystal layer LCR includes spacers SPR and resin structures RCR.

The liquid crystal layer LCR is surrounded by a seal wall SLR for sealing the periphery of the space between the substrates.

A light absorber layer BK is arranged on the outer surface of the outer substrate SR2 of the element R.

The multilayer liquid crystal display element $\underline{A}$ may be manufactured as follows.

First, for the liquid crystal display element B, the transparent substrate SB1, which is provided with the electrode TB1 and the orientation film FB, and is made of glass, resin or the like, is prepared. Also, the transparent substrate SB2, which is provided with the electrode TB2 and the orientation film FB, and is made of glass, resin or the like, is prepared. In this operation, a predetermined orientation processing is effected in advance on at least one of the orientation films on the substrates SB1 and SB2, and more specifically is effected in advance on at least a portion of the orientation film portion corresponding to the non-pixel region (in other words, inter-pixel region). In this example, the processing is effected on each of the orientation film on the substrates SB1 and SB2. Thus, the predetermined orientation processing is effected in advance on at least a portion of the portion corresponding to the non-pixel region (inter-pixel region), which is not pixel region where the electrodes TB1 and TB2 intersect with each other, on each of the orientation films FB formed on the substrates SB1 and SB2. This orientation processing will be described later. The seal wall SLB is formed on the substrate SB2, and the spacers SPB are dispersed thereon. The seal wall SLB thus formed has a height slightly larger than the intended final height. The spacers SPB may be mixed in the seal wall SLB. The seal wall SLB maybe provided with a liquid crystal inlet. Further the resin structures RCB are formed on one of the substrates.

The substrates SB1 and SB2 are bonded together at a predetermined temperature such that the surface of the substrate SB2 provided with the seal wall SLB is opposed to the substrate SB1.

In this bonding processing, the seal wall SLB and the resin structures RCB are adhered to the substrate, and are compressed to have a predetermined height, which keeps the predetermined distance between the substrates.

The liquid crystal LCB is supplied, e.g., by vacuum supply, into the empty cell thus prepared through the inlet in the seal wall, and then the inlet is closed to complete the element B.

The liquid crystal display elements G and R are produced in the similar manner. For the liquid crystal display element R, the black light absorber layer is formed on the side of the substrate SR2 remote from the liquid crystal layer.

After Producing the respective liquid crystal display elements B, G and R, the substrates SB2 and SG1 as well as the substrates SG2 and SR1 are layered and adhered together by the transparent adhesives N so that the three-layer liquid crystal display element $\underline{A}$ is formed.

Figure 2:
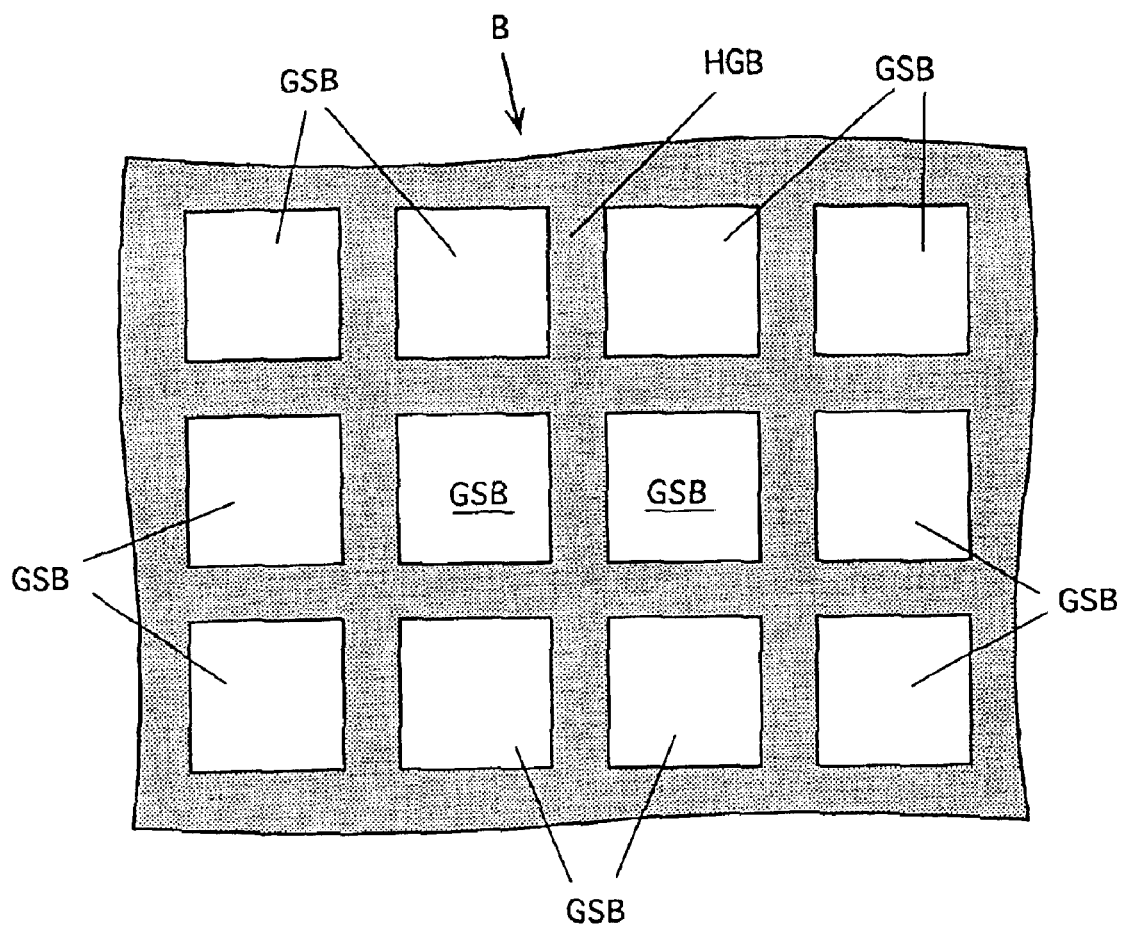
FIG. 2 is a schematic plan showing a pixel pattern of one element in the multilayer liquid crystal display element shown in FIG. 1.
Figure 3:
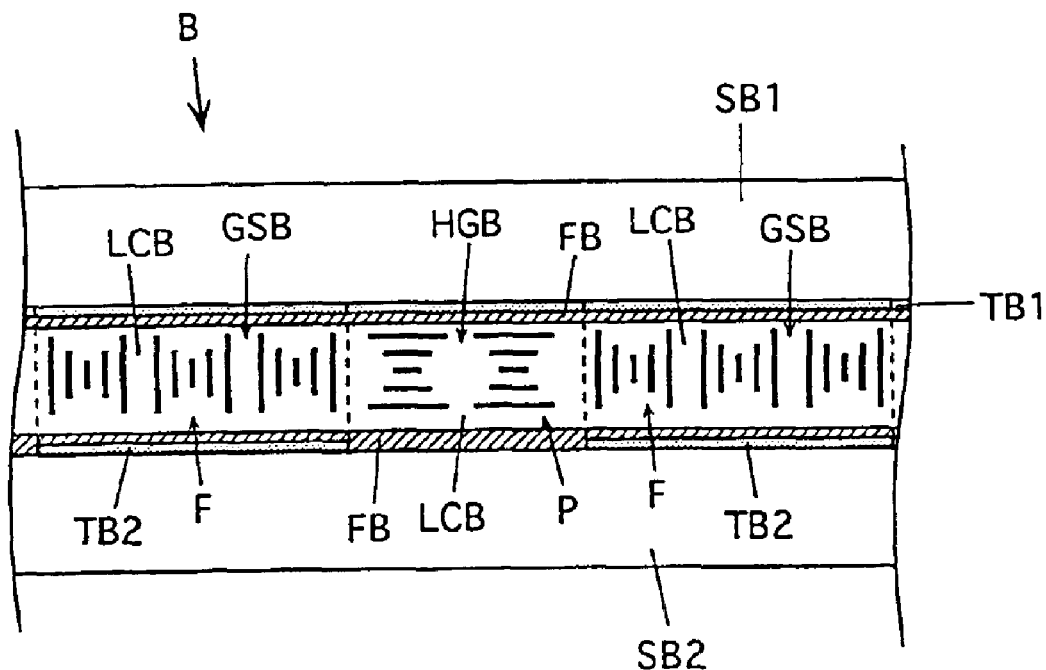
FIG. 3 schematically shows a focal conic state of one element in the three-layer liquid crystal display element shown in FIG. 1.
Figure 4:
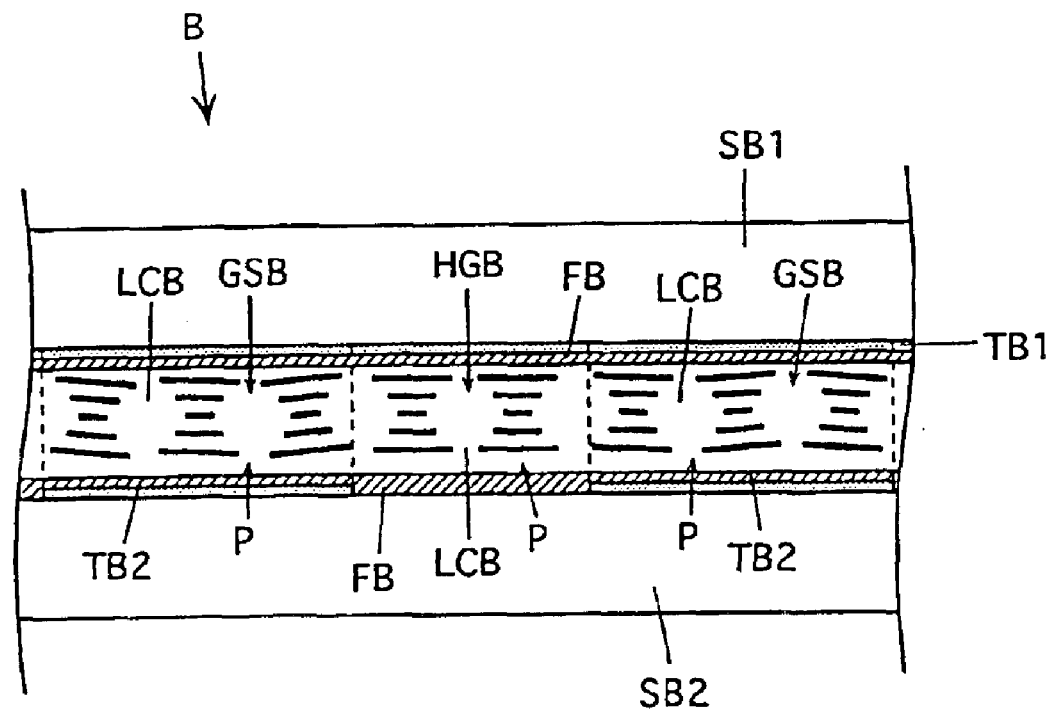
FIG. 4 schematically shows a planar state of the liquid crystal display element shown in FIG. 3.

The pixel pattern of the liquid crystal display element B in the multilayer element $\underline{A}$ thus produced is shown in FIG. 2. FIGS. 3 and 4 are cross sections fragmentarily showing the liquid crystal display element B. FIG. 3 shows the focal conic state achieved by voltage application, and FIG. 4 shows the planar state. For the sake of convenience, description will be given on the liquid crystal display element B. However, the following description relating to the electrode pattern as well as the focal conic state and the planar state can be true also with respect to the other elements G and R.

In FIG. 2, "GSB" indicates the pixel region defined by the crossing portions of the electrodes TB1 and TB2, and "HGB" indicates a non-pixel region (inter-pixel region) between the pixel regions. In the non-pixel region HGB, the orientation processing for orientating the liquid crystal molecules to the horizontal direction is effected on at least one of the orientation films FB of the two substrates SB1 and SB2. Accordingly, the inter-pixel region completely or substantially completely attains the planar state providing large domains. This will now be described in greater detail with reference to FIGS. 3 and 4. The helical structures of the liquid crystal LCB are schematically depicted in these figures for showing the directions of the helical axes. In the practical structure, the helical pitch is sufficiently smaller than the thickness between the substrates. In the non-pixel region HGB of the example shown in FIGS. 3 and 4, the orientation processing is not effected on the orientation film FB on the substrate SB1, but the orientation processing for orientating the liquid crystal molecules to the horizontal direction is effected on the orientation film FB on the substrate SB2. Accordingly, in the liquid crystal LCB within the non-pixel region HGB, the direction of the liquid crystal LCB near the substrate SB2 is restricted by the orientation film FB on the substrate SB2. This restricting force decreases as the position moves toward the substrate SB1. However, the liquid crystal LCB in the whole non-pixel region HGB completely or substantially completely attains the planar state providing large domains.

In the state where the liquid crystal between the substrates of the element B is in the planar state shown in FIG. 4, when a predetermined voltage is applied to the liquid crystal LCB of the pixel region GSB for changing the liquid crystal LCB in the pixel region GSB to the focal conic state, the molecular orientation of the liquid crystal LCB in the pixel region GSB is controlled to attain the focal conic state as shown in FIG. 3. However, the liquid crystal LCB in the non-pixel region HGB is already subjected to the foregoing orientation processing effected to the corresponding portion of the orientation film FB, and therefore is not affected by the application of the voltage so that it maintains the planar state P. These domains are large, and the scattering of light on the boundary between the domains is reduced. The liquid crystal LCB in the non-pixel region HGB is in the planar state, in which the directors are orientated in the same direction, so that the light of the regular reflection is selectively reflected, and the other light passes therethrough so that selectively reflected light cannot be viewed unless it is observed from specific direction that matches with the regular reflection. The selectively reflected light can not be observed when the incident direction of the external light to the liquid crystal display element and the observation direction exhibit a predetermined relationship. Thereby, by slightly changing the observation position, the selectively reflected right can be easily avoided. The above can be true also with respect to the elements G and R. Owing to the above, each of elements B, G and R can reduce unnecessary scattering and selective reflection, and can improve the optical characteristics such as contrast.

Each element can improve the contrast when used in the liquid crystal display element for monochrome (monocolor) display.

In the multilayer liquid crystal display element $\underline{A}$, the light transparency of the liquid crystal in the non-pixel region can be increased, and the reflected light coming from the lower layer can be led toward the image observation side while suppressing the attenuation. Thereby, the color image display of high quality can be achieved.

In the multilayer liquid crystal display element, the substrates located between the liquid crystal layers of the neighboring liquid crystal display elements may be formed of the substrate common to both the liquid crystal layers.

Further specific examples of the multilayer liquid crystal display element $\underline{A}$ of the type shown in FIG. 1 will now be described.

EXAMPLE 1

This example is a three-layer liquid crystal display element of the reflection type using glass substrates, in which the rubbing processing is effected on a portion of each orientation film in each liquid crystal display element corresponding to the liquid crystal in the non-pixel region.

The liquid crystal display elements B, G and R were produced in the foregoing methods, and then were successively layered and bonded by the adhesives N.

In each element, 7059 glass substrate (manufactured by Corning Inc.) was used as each substrate. On each substrate, belt-like transparent ITO electrodes were formed in parallel with each other. The belt-like electrodes had a width of 300 $\mu$m, and were arranged with a pitch of 340 $\mu$m.

On all the surfaces of the substrates in contact with the liquid crystal, there were formed the orientation films made of polyimide AL8044 (manufactured by JSR Corp.). Rubbing processing was effected on a portion of each orientation film corresponding to the non-image region (inter-pixel region).

The rubbing processing was effected in the following manner. First, resist of about 1 μm in thickness was uniformly applied by a table coater over the polyimide film formed on the substrate. The resist was of the positive type. Then, a photomask of the same configuration as the electrode pattern was arranged on the substrate coated with the resist, and exposure was performed by an exposing device. After the exposure, development was performed to remove the resist from the non-pixel region, and the resist remained on only the electrode pattern. In this state, the rubbing processing was performed using a known rubbing processing method. After the rubbing processing, the resist was removed.

In this manner, the rubbing processing was effected on the structure while leaving the resist on only the electrode pattern. Thereby, the portion of the orientation film corresponding to the non-pixel region (inter-pixel region) was subjected to the orientation processing except for the portions corresponding to the electrodes. The rubbing processing was not effected on the orientation film portion corresponding to the pixel region either. In this example, as described above, the orientation processing was effected in different manners on the portions corresponding to the pixel regions of the orientation film and at least a portion of the portion corresponding to the non-pixel region.

The substrates thus processed were bonded together so that the substrates could be parallel to each other, and the parallel ITO electrodes on one side of the liquid crystal could be perpendicular to the electrodes on the other side.

The liquid crystal filling the lower, middle and upper liquid crystal display elements were cholesteric selective-reflection liquid crystal, which could selectively reflect the light in red, green and blue, respectively. The liquid crystal for red display was made of cholesteric liquid crystal, which had a peak wavelength of the selective reflection equal to 680 nm, and was made of a mixture of nematic liquid crystal BL46 and 32.6 wt % of chiral agent CB15 both manufactured by Merk & Co. The liquid crystal for green display was made of cholesteric liquid crystal, which had a peak wavelength of the selective reflection equal to 550 nm, and was made of a mixture of nematic liquid crystal BL46 and 40 wt % of chiral agent CB15 both manufactured by Merk & Co. The liquid crystal for blue display was made of cholesteric liquid crystal, which had a peak wavelength of the selective reflection equal to 480 nm, and was made of a mixture of nematic liquid crystal BL46 and 47.6 wt % of chiral agent CB15 both manufactured by Merk & Co.

Spacers N3M14 (manufactured by Ube-Nitto Kasei Co., Ltd.), which were made of thermoplastic resin and had a particle diameter of 7 μm, were arranged between the substrates at dispersion density of about 200 pcs/mm$^2$. Also, resin structures, which were made of polyester resin PES-360S30 (manufactured by Three Bond Co., Ltd.) and had a diameter of about 40 μm and a height of 7 μm, were formed with a pitch of 300 μm. The seal wall provided with the liquid crystal inlet was made of the same polyester resin as the above. The inlet was closed by ultraviolet-curing resin Photolec A-704-60 (manufactured by Sekisui Finechemical Co., Ltd.) after supply of the liquid crystal.

Black paint forming the light absorber layer was applied to the outer surface of the outer substrate of the liquid crystal display element for red display.

Black display was performed by the three-layer liquid crystal display element of the cholesteric selective reflection type, in which the rubbing processing was effected on the polyimide orientation film portion corresponding to the non-pixel region, as described above. As a result, the light scattering and selective reflection were reduced in the inter-pixel region of each liquid crystal display element, and Y-value (luminous reflectance) lowered to increase the contrast. In the color display operation, the color purity could be higher than that of the structure, in which the rubbing processing was not effected on the orientation film portion corresponding to the non-pixel region.

EXAMPLE 2

In each liquid crystal display element, the orientation film, which could be subjected to optical orientation processing, was formed on each of the substrate surfaces in contact with the liquid crystal, and the optical orientation processing was effected on the film portion corresponding to the non-pixel region. Structures other than the above were the same as those of the example 1.

The optical orientation was performed in the following manner. First, a photomask of the same configuration as the electrode pattern was arranged on the substrate, which was coated with polyimide, i.e., the orientation film material similar to that of the example 1, and was registered with the electrode pattern on the substrate. The above structure was irradiated with ultraviolet light. A lamp for emitting the ultraviolet light was a mercury lamp having a central wavelength of 365 nm. The emitting direction of the ultraviolet light formed 75° with respect to the normal of the substrate. The irradiation intensity was 500 mJ/cm$^2$, and a deflector plate for deflecting the ultraviolet light was attached to the photomask.

Black display was performed by the three-layer liquid crystal display element of the cholesteric selective reflection type, in which the orientation processing was effected to control and keep the orientation of the liquid crystal in the non-pixel region in the planar state, as described above. As a result, the light scattering and selective reflection were reduced in the inter-pixel region, and Y-value lowered to increase the Y-value ratio (contrast) (Y-value in white display/Y-value in black display). In the color display operation, the color purity could be higher than that of the structure, in which the rubbing processing was not effected on the orientation film portion corresponding to the non-pixel region.

EXAMPLE 3

A plurality of substrates of 0.2 μm in thickness, made of polycarbonate manufactured by Teijin Limited, were employed. Each substrate was provided with transparent belt-like ITO electrodes parallel to each other. Each transparent electrode had a width of 300 μm and was arranged with a pitch of 330 μm.

All the surfaces of each substrate in contact with the liquid crystal were provided with polyimide films AL8044 manufactured by JSR Corp., and the rubbing processing was effected in the following manner on the portion of the polyimide film in the non-pixel region.

First, positive resist of about 1 μm in thickness was uniformly applied to the polyimide film by a table coater. A photomask provided with holes of configurations corresponding to the electrode pattern was arranged on the substrate coated with the resist, and the exposure by the exposing device was performed. By the development after the exposure, the resist between the pixels, i.e., the resist in the non-pixel region was removed, and the resist was left on only the electrodes. In this state, the rubbing processing was effected in the known rubbing method. After the rubbing processing, the resist was removed.

The substrates thus processed were arranged so that the substrates could be parallel to each other, and the parallel ITO electrodes on one side of the liquid crystal could be perpendicular to the electrodes on the other side.

The liquid crystal filling the lower, middle and upper liquid crystal display elements could selectively reflect the light in red, green and blue, respectively. The liquid crystal for red display was made of cholesteric liquid crystal, which had a peak wavelength of the selective reflection equal to 680 nm, and was made of a mixture of nematic liquid crystal BL46 and 32.6 wt % of chiral agent CB15 both manufactured by Merk & Co. The liquid crystal for green display was made of cholesteric liquid crystal, which had a peak wavelength of the selective reflection equal to 550 nm, and was made of a mixture of nematic liquid crystal BL46 and 40 wt % of chiral agent CB15 both manufactured by Merk & Co. The liquid crystal for blue display was made of cholesteric liquid crystal, which had a peak wavelength of the selective reflection equal to 480 nm, and is made of a mixture of nematic liquid crystal BL46 and 47.6 wt % of chiral agent CB15 both manufactured by Merk & Co.

Spacers N3M14 (manufactured by Ube-Nitto Kasei Co., Ltd.), which were made of thermoplastic resin and had a particle diameter of 5 μm, were arranged between the substrates at dispersion density of about 400 pcs/mm². Also, resin structures, which were made of polyester resin PES-360S30 (manufactured by Three Bond Co., Ltd.) and had a diameter of about 50 μm and a height of 5 μm, were formed with a pitch of 500 μm. The seal wall provided with the liquid crystal inlet was made of the same polyester resin as the above. The inlet was closed by ultraviolet-curing resin Photolec A-704-60 (manufactured by Sekisui Finechemical Co., Ltd.) after supply of the liquid crystal.

Black display was performed by the three-layer liquid crystal display element of the selective reflection type, in which the rubbing processing was effected on the polyimide orientation film portion corresponding to the non-pixel region, as described above. As a result, the light scattering and selective reflection were reduced in the inter-pixel region of each liquid crystal display element. As compared with the structure not subjected to the rubbing processing, Y-value (luminous reflectance) was larger by 0.68 times, and the contrast was improved by 2.0 points. In the color display operation, the color purity could be higher than that of the structure, in which the rubbing processing was not effected on the orientation film portion corresponding to the non-pixel region.

For confirming the performances of the liquid crystal display elements of the types described above, test pieces were prepared in the following manner, and the Y-values and reflectances were measured. First, a pattern of ITO, which had an electrode portion of 10 mm by 10 mm forming the pixel and a terminal potion for connection to a power source, was formed on each of glass substrates, and a polyimide film was arranged on the ITO. Some of the polyimide films thus prepared were already subjected to the rubbing processing, and the others are not subjected to the rubbing processing. Liquid crystal was vacuum-supplied into a space between the two substrates subjected to the rubbing processing so that a liquid crystal layer of 5 μm in thickness was held therebetween to form a sample A. Another liquid crystal layer of 5 μm in thickness was held between the two substrates not subjected to the rubbing processing in a similar manner so that a sample B was formed.

The above liquid crystal was made of cholesteric liquid crystal, which had a peak wavelength of the selective reflection equal to 550 nm, and was made of a mixture of nematic liquid crystal BL46 and 40 wt % of chiral agent CB15 both manufactured by Merk & Co. A light absorber layer was arranged on the side of each sample remote from the observation side.

The luminous reflectance and Y-value were measured with a spectrometer CM-3700 manufactured by Minolta Co., Ltd.

For the sample A, the liquid crystal was set in the planar state, and the measurement was performed under the conditions that the regular reflection was removed. For the sample B, the measurement was performed for the liquid crystal in the planar state and the liquid crystal in the focal conic state under the conditions that the regular reflection was removed. In each of the samples, the planar state was achieved by applying a pressure. The focal conic state of the sample B was achieved by applying a voltage to the liquid crystal from the liquid crystal display element.

Figure 8:
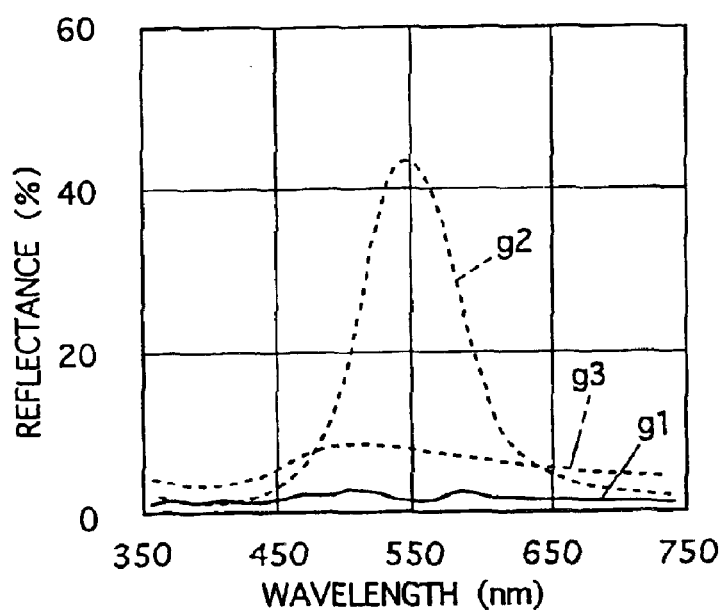
FIG. 8 shows reflection characteristics of a liquid crystal display element of an embodiment of the invention and a liquid crystal display element in the prior art.

Result of the measurement are shown in Table 1 and FIG. 8.

TABLE 1

| Sample | Rubbing | State | Take-In | Y-value | Ref* |
|--------|---------|-------|---------|---------|------|
| A | Yes | Planar | No | 1.5 | g1 |
| B | No | Planar | No | 29.4 | g2 |
| C | No | F/C* | No | 6.9 | g3 |

Take-In*: take-in of regular reflection
Ref*: reflectance characteristics
F/C*: focal conic As can be seen from the Y-value and the reflectance characteristics g1 of the sample A, which was subjected to the rubbing processing and was in the planar state, the reflectance is extremely small, the reflection is suppressed to a higher extent than the sample B, which was not subjected to the rubbing processing, in the planar state and further the sample B in the focal conic state.

Thereby, it can be understood that, unless it is observed from specific direction that matches with the regular reflection, the clear black display and high contrast can be achieved by effecting the orientation processing on the orientation film portion located between the pixels, and thereby completely setting the liquid crystal located between the pixels to the planar state, as compared with the situation that the orientation processing is not effected on the inter-pixel region, and the planar state and the focal conic state are present in a mixed state.

(2) With Respect to Fourth and Fifth Liquid Crystal Display Elements (Liquid Crystal Light (Optical) Modulation Elements) and First and Second Methods of Producing the Elements (2-1) Fourth Liquid Crystal Light (Optical) Modulation Element This liquid crystal light (optical) modulation element includes a liquid crystal layer held between a pair of substrates and including a liquid crystal material exhibiting a cholesteric phase in a room temperature and having a peak of a selective reflection wavelength in a visible wavelength range.

In this element, the liquid crystal layer in the selective reflection state has pixel regions neighboring to the opposite substrates, respectively, and liquid crystal domains in the pixel regions neighboring to at least one of the substrates are in a mixed state of a polydomain state and a monodomain state.

(2-2) Fifth Liquid Crystal Light (Optical) Modulation Element

A liquid crystal light (optical) modulation element includes a liquid crystal layer held between a pair of substrates and including a liquid crystal material exhibiting a cholesteric phase in a room temperature and having a peak of a selective reflection wavelength in a visible wavelength range.

In this element, the liquid crystal layer in the selective reflection state has pixel regions neighboring to the opposite substrates, respectively, liquid crystal domains in the pixel regions take a polydomain state, and the angles of the cholesteric helical axes of the liquid crystal with respect to the substrate normal are different between the liquid crystal domains in the pixel regions near one of the substrates and the liquid crystal domains in the pixel regions near the other substrate.

In each of the fourth and fifth liquid crystal light (optical) modulation elements, at least one of the paired substrates is usually transparent, and the substrate on the observation side is usually transparent.

The above "polydomain" is a bunch of domains, where the helical axis of the liquid crystal in the selective reflection state is slightly inclined with respect to the substrate normal, and the directions of the helical axes projected onto the substrate are randomly different among the domains. The "monodomain" is a bunch of domains where the helical axes of the liquid crystal are perpendicular or substantially perpendicular to the substrate surface, and thus extend in a uniform direction.

In the fourth liquid crystal optical modulation element, the liquid crystal layer in the selective reflection state has pixel regions neighboring to the opposite substrates, respectively, and the liquid crystal domains of the pixel regions neighboring to at least one of the substrates is in a mixed state of a polydomain state and a monodomain state. In the fifth liquid crystal optical modulation element, the liquid crystal layer in the selective reflection state has pixel regions neighboring to the opposite substrates, respectively, and the liquid crystal domains in the pixel regions take a polydomain state, and angles of cholesteric helical axes of the liquid crystal with respect to the substrate normal are different between the liquid crystal domains in the pixel regions near one of the substrates and the liquid crystal domains in the pixel regions near the other substrate (thus, the angle of the helical axis of the liquid crystal domain in the pixel region near one of the substrates with respect to the substrate normal is smaller than that of the pixel region near the other substrate). Therefore, good image display with high brightness, contrast and color purity can be performed, and the display state with high brightness, contrast and color purity can be maintained for a long time, e.g., even when the voltage is not applied. In other words, the characteristics of high reflection intensity, high contrast and high color purity in the planar state can be achieved together with the bistability.

In the fourth and fifth liquid crystal optical modulation elements, electrodes (e.g., pixel electrodes) may be formed on the paired substrates, if necessary.

In the selective reflection state of the fourth liquid crystal optical modulation element, the liquid crystal domains in the pixel regions near the opposite substrates may be in the foregoing mixed state. Also, the liquid crystal domains in the pixel regions near one of the substrates may be in the foregoing mixed state, and the liquid crystal domains in the pixel regions near the other substrate may take only the polydomain state.

In the selective reflection state, if each of the liquid crystal domains in the pixel regions near the opposite substrates is in the foregoing mixed state, it is preferable that a ratio between the liquid crystal domains taking polydomain state and the liquid crystal domains taking monodomain state is different between the liquid crystal domain in each of the pixel regions near one of the substrates and the liquid crystal domain in each of the pixel regions near the other substrate. It is further preferable that the liquid crystal domain in each of the pixel regions near the substrate on an element observation side take the polydomain state at a higher rate than that on the other side.

In the selective reflection state, if the liquid crystal domains in each of the pixel regions near one of the substrates are in the foregoing mixed state, and the liquid crystal domains in each of the pixel regions near the other substrate take only the polydomain state, it is preferable that the liquid crystal domains in the pixel regions near the substrate on the element observation side take only the polydomain state.

In any case of the fourth element, an orientation control layer may be arranged at least on the substrate opposed to the liquid crystal domains in the mixed state, and particularly on the side of the substrate opposed to the liquid crystal domains in the mixed state, and may be in contact with the liquid crystal. Thereby, the liquid crystal molecules in the mixed state may be subjected to the orientation control by the orientation control layer. This orientation control may be performed in the following manners (a) and (b).

(a) The orientation control is performed by the rubbing, which is effected on the orientation control layer arranged on the substrate opposed to the liquid crystal domains in the mixed state. In this case, it is preferable that the orientation control layer subjected to the rubbing has a rubbing density of 10 or lower. For example, by performing the rubbing through a mask having a predetermined opening pattern, the orientation control layer can be partially subjected to the rubbing so that the foregoing mixed state may be achieved.

The direction of the rubbing is not restricted, and the rubbing can be performed in any direction. For example, in the case where the belt-like electrodes are arranged on the substrate, the rubbing may be performed either parallel to or perpendicular to the electrodes. However, in the case of effecting the rubbing on the whole orientation control layer, the rubbing is performed in a single direction.

(b) The orientation control is performed by emitting light under predetermined condition(s) to the orientation control layer, which is arranged on the substrate opposed to the liquid crystal domains in the mixed state. The above predetermined conditions may contain any one of the amount of emitted light, the substrate temperature, the angle of the incident light on the substrate surface. More specifically, the orientation control may be performed by the amount of the emitted light, may be performed by the substrate temperature during the irradiation of the orientation control layer with the predetermined light, or may be performed by the angle of the predetermined light emitted to the orientation control layer with respect to the substrate surface. The light irradiation may be performed with a mask having a predetermined pattern of openings so that the orientation control layer is partially irradiated with the light for achieving the foregoing mixed state. In any one of the above cases, the predetermined light may be ultraviolet light. In the case where the monodomain state and polydomain state are present in the mixed fashion, the average angle of the liquid crystal helical axes with respect to the substrate is preferably in a range larger than zero and not exceeding 10°, and more preferably in a range from 3° to 8°.

In the fifth liquid crystal optical modulation element, it is preferable in the selective reflection state that the liquid crystal of the liquid crystal domains in the pixel region near the substrate on the observation side has the cholesteric helical axes, which define a larger angle with respect to the substrate normal than that of the liquid crystal in the liquid crystal domains remote from the observation side.

In any one of the foregoing cases, the fifth liquid crystal optical modulation element may be provided with the orientation control layers, which are provided on the sides of the paired substrates opposed to the liquid crystal layer, respectively, and are in contact with the liquid crystal, so that the orientation control layers may control the angles of the cholesteric helical axes of the liquid crystal in the respective liquid crystal domains of the pixel regions near the opposite substrates with respect to the substrate normal in the selective reflection state. As a result of the control by the orientation control layer, a difference occurs in the angle of the cholesteric helical axis of the liquid crystal with respect to the substrate normal between the liquid crystal domains in the pixel regions near the opposite substrates. As examples of the difference in angle, the following cases (c) and (d) will now be described.

(c) The difference is caused by the fact that at least one of the orientation control layers arranged on the opposite substrates is subjected to the rubbing. It is desired that the rubbing density of the orientation control layer does not exceed 10. The difference in angle may be caused, e.g., by partially effecting the rubbing on the orientation control layer through a mask having a predetermined pattern of openings. In any one of the above cases, the orientation control layer may not change into the monodomains, depending on the material of the orientation film and/or rubbing conditions, and the polydomains having the helical axes at a smaller angle than the original angle are obtained.

(d) The difference is caused by the fact that at least one of the orientation control layers which are arranged on the opposite substrates, respectively, is irradiated with light under the predetermined condition(s).

The predetermined conditions may include the amount of emitted light, substrate temperature, incident angle of the light on the substrate surface. More specifically, the difference, which is present in the angle of the cholesteric helical axis of the liquid crystal to the substrate normal between the liquid crystal domains in the pixel regions near the opposite substrates, may be controlled by the amount of the predetermined light emitted to the orientation control layer, the temperature of the substrate during irradiation of the orientation control layer with the predetermined light, or the incident angle of the predetermined light with respect to the substrate surface during irradiation of the orientation control layer with the predetermined light. For example, the irradiation with the light may be performed through a mask having a predetermined pattern of openings so that the orientation control layer may be partially irradiated with the light, whereby the difference in angle may be caused as described above. In any one of the above cases, the orientation control layer may not change into monodomains depending on the material of the orientation film and/or the irradiation conditions, and the polydomains having the helical axes, of which inclination is smaller than the original inclination, are obtained. In any one of the above cases, the predetermined light may be ultraviolet light.

In the cases (c) and (d), the inclination of the helical axes of the liquid crystal molecules in the region of the orientation control layer, which is subjected to the rubbing processing or light irradiation, becomes lower than that of the other region, although it does not become perpendicular. Owing to this, the average inclination of the helical axes of the whole liquid crystal molecules probably becomes smaller than that before the processing.

The fifth liquid crystal optical modulation element may be provided with the orientation control layers, which are provided on the sides of the paired substrates opposed to the liquid crystal layer, respectively, and are in contact with the liquid crystal, so that the orientation control layers may control the angles of the cholesteric helical axes of the liquid crystal in the respective liquid crystal domains of the pixel regions near the opposite substrates with respect to the substrate normal in the selective reflection state. In this case, material parameters of the orientation control layers provided for the opposite substrates may be different from each other. In this case, the orientation control layers provided on the opposite substrates and having different material parameters control the angles of the cholesteric helical axes of the liquid crystal in the liquid crystal domains of the pixel regions near one of the substrates and the liquid crystal domains of the pixel regions near the other substrate with respect to the substrate normal. The orientation control layers may be made of different materials, respectively, so that the material parameter of each orientation control layer is different from the other. The material parameter may be a pretilt angle, although not restricted thereto. As will be described later, the orientation control layer may be partially made of a different material for controlling the above angle.

In the selective reflection state of any one of the fourth and fifth liquid crystal optical modulation elements, the angle of the cholesteric helical axis of the liquid crystal in each of the liquid crystal domains of the pixel regions near the opposite substrates with respect to the substrate normal maybe preferably 20° or less on average, and more preferably may be 20° or less in all the liquid crystal domains. If this angle exceeds 20°, the bistability already described is deteriorated.

According to the study by the inventors, it is already found that, in a liquid crystal optical modulation element for performing optical modulation by utilizing a focal conic state of liquid crystal molecules included in a liquid crystal layer held between a pair of substrates, scattering between the domains is remarkably reduced by aligning the directions of the helical axes of the cholesteric liquid crystal molecules in the focal conic state.

By orientating helical axes of the liquid crystal molecules in the focal conic state in regular directions within a plane substantially parallel to a substrate surface, the light transparency of the liquid crystal layer in the focal conic state is remarkably improved, and the contrast can be improved.

Accordingly, in the fourth and fifth liquid crystal optical modulation elements, the helical axes of the liquid crystal molecules in the focal conic state may be arranged in regular directions within a plane substantially parallel to the substrate surface. Thereby, the helical axes of the liquid crystal molecules in the focal conic state are orientated, and the light scattering in the element is reduced.

In this case, orientation regulating means for the liquid crystal molecules may be employed in the liquid crystal element for aligning or orientating helical axes of the liquid crystal molecules in the focal conic state in regular directions within a plane substantially parallel to a substrate surface.

The orientation regulating means may be a region provided partially on a surface of at least one of the substrates in contact with the liquid crystal, and having a different orientation regulating force. This region can regularly orientate the helical axes of the liquid crystal. By employing the region of a different orientation regulating force, the helical axes are orientated by the difference in surface regulating force during transition of the liquid crystal molecules to the focal conic state. Thereby, the helical axes of the liquid crystal can be regularly orientated.

The region providing the different orientation regulating force may be formed by rubbing or light irradiation. It may be also formed, e.g., by the method of partially effecting the rubbing, partially performing light irradiation or employing a partially different material.

The manners of entirely or partially effecting the rubbing and the manners of entirely or partially effecting the light irradiation may be similar to those employed in the fourth liquid crystal optical modulation element, if it is provided with the foregoing orientation control layer, and the liquid crystal molecules in the foregoing mixed state of the liquid crystal layer in the selective reflection state are subjected to the orientation control by the orientation control layer. The manners of entirely or partially effecting the rubbing, the manners of entirely or partially effecting the light irradiation and the manner of employing a partially different material may be similar to those employed in the fifth liquid crystal optical modulation element of the invention, if it is provided with the orientation control layer, and the orientation control layer controls the angle of the cholesteric helical axis of the liquid crystal in each of the liquid crystal domains of the pixel regions near the opposite substrates with respect to the substrate normal when the liquid crystal layer is in the selective reflection state.

In the fourth liquid crystal optical modulation element, therefore, the mixed state where the monodomain state and the polydomain state are mixed is achieved, and the focal conic state causing less light scattering can be achieved. In the fifth liquid crystal optical modulation element, the partial rubbing processing, partial photo-orientation processing or use of a partially different material may be employed for causing a difference in inclination of the helical axes, in which case the focal conic state causing less light scattering can be achieved.

More specifically, the fourth liquid crystal optical modulation element has a region of a different orientation regulating force, which causes monodomain state and polydomain state. Therefore, it can be considered that, when the liquid crystal molecules change to the focal conic state, the above region regularly orientates the helical axes of the liquid crystal owing to the difference in surface regulating force, and thereby the scattering in the focal conic state can be reduced. In the fifth liquid crystal optical modulation element, although the partial rubbing processing, partial photo-orientation processing or use of a partially different material does not provide the complete monodomain regions, but the inclination of the helical axis in each of the minute regions is different from the others. Therefore, it can be considered that, when the liquid crystal molecules change to the focal conic state, the above region regularly orientates the helical axes of the liquid crystal owing to the difference in surface regulating force, and thereby the scattering in the focal conic state can be reduced.

Assuming that the region of the different orientation regulating force has a width of W, and the liquid crystal has a helical pitch of P, it is preferable that the following relationship is present between the width W and the pitch P.

$P < W < 20P$

Assuming that the regions of different orientation regulating force are arranged at a pitch of L, and the liquid crystal has the helical pitch of p, it is preferable that the following relationship is present between the arrangement pitch L and the helical pitch p.

$5p < L < 100p$

By employing the regions of the different orientation regulating force having the width W and arrangement pitch L in the foregoing ranges, a good regulating force can be kept for the liquid crystal molecules, and complication of the element producing process can be prevented.

The arrangement pitch of the regions of the different orientation regulating force may not be uniform within the above range. By employing the arrangement pitch of the regions of the different orientation regulating force, which is not uniform, it is possible to prevent lowering of the visibility due to light diffraction.

In any one of the cases described above, a plurality of pixels may be arranged in the display region. In this case, the direction of the arrangement of the regions of the different orientation regulating force may be different from that of the arrangement direction of these pixels. A plurality of regions, which are different in the arrangement direction of the regions of the different orientation regulating force, may be employed. In these cases, the visibility is not affected by the light incident angle, and uniform light transparent characteristics can be achieved.

In the fourth and fifth liquid crystal optical modulation elements, the helical axes of the liquid crystal molecules in the focal conic state may be aligned in regular directions within a plane substantially parallel to a substrate surface, in which case the liquid crystal material exhibiting the cholesteric phase at the room temperature may be a material having positive dielectric anisotropy.

In connection with the fourth and fifth liquid crystal optical modulation elements, a multilayer liquid crystal light (optical) modulation element can be provided, which is formed of a plurality of liquid crystal layers stacked together and each held between the paired substrates, and at least one of the liquid crystal layers and the corresponding pair of substrates holding the liquid crystal form the fourth or fifth liquid crystal optical modulation element.

In this multilayer liquid crystal optical modulation element, the plurality of liquid crystal layers may be formed of liquid crystal layers, which perform display in different colors, and thus have different peak wavelengths of the selective reflection, respectively, whereby multicolor display (i.e., display in two or more colors) can be performed. At least three liquid crystal layers, which perform display in blue, green and red, respectively, may be employed for full-color display. Two liquid crystal layers having different optical rotation directions may be employed, in which case the light utilizing efficiency can be increased. The liquid crystal layers of different optical rotation directions may have the substantially same peak wavelength of the selective reflection, in which case the light reflectance of the liquid crystal layer can be increased.

In any one of the above cases, the above multilayer liquid crystal optical modulation element may be a multilayer liquid crystal optical modulation element formed of a plurality of liquid crystal elements including at least one or all formed of the fourth or fifth types of liquid crystal elements. The neighboring liquid crystal optical modulation elements may commonly use the same substrate between the neiboring liquid crystal layers.

Any one of the multilayer liquid crystal optical modulation elements may employ the following preferable forms.

(e) In any neighboring liquid crystal optical modulation elements, the angle of the cholesteric helical axis of the liquid crystal in the liquid crystal domains of each of the pixel regions near the substrate on the observation side in the liquid crystal optical modulation element in the selective reflection state on the element observation side with respect to the substrate normal is larger than the angle of the cholesteric helical axis of the liquid crystal in the liquid crystal domains of each of the pixel regions near the substrate on the observation side in the liquid crystal optical modulation element in the selective reflection state on the side opposite to the element observation side with respect to the substrate normal.

(f) In any neighboring liquid crystal optical modulation elements, the angle of the cholesteric helical axis of the liquid crystal in the liquid crystal domains of each of the pixel regions near the substrate on the side opposite to the observation side in the liquid crystal optical modulation element in the selective reflection state on the element observation side with respect to the substrate normal is larger than the angle of the cholesteric helical axis of the liquid crystal in the liquid crystal domains of each of the pixel regions near the substrate opposite to the observation side in the liquid crystal optical modulation element in the selective reflection state on the side opposite to the element observation side with respect to the substrate normal.

(g) Combination of the above (e) and (f)

In any one of the above cases, each of the liquid crystal optical modulation elements of the multilayer liquid crystal optical modulation element may include the orientation control layer arranged on the substrate opposed to the liquid crystal domains in the mixed state of the polydomain state and monodomain state, and subjected to the rubbing, in which case it is preferable in any neighboring liquid crystal optical modulation elements that the rubbing density of the orientation control layer subjected to the rubbing and arranged in the liquid crystal optical modulation element on the element observation side is smaller than the rubbing density of the orientation control layer, corresponding to the above orientation control layer, subjected to the rubbing and arranged in the liquid crystal optical modulation element on the opposite side.

The multilayer liquid crystal optical modulation element may contain a liquid crystal layer, in which the liquid crystal molecules in the focal conic state have the helical axes arranged regularly in a plane substantially parallel to the substrate surface. In this case, at least the liquid crystal layer on the outermost side (element observation side) may be the liquid crystal layer, in which the liquid crystal molecules in the focal conic state have the helical axes arranged regularly in a plane substantially parallel to the substrate surface. In any one of the above cases, it can be effectively suppressed that the light transparency increases in the focal conic state due to increase of the scattering components by layering of the plurality of liquid crystal layers.

As examples of the method of producing the liquid crystal light (optica)l modulation element described above, first and second producing methods described below may be employed. The contents already described in connection with the fourth and fifth liquid crystal optical modulation elements can be true also with respect to the first and second producing methods as well as the liquid crystal optical modulation elements produced by the first and second methods.

(2-3) First Method of Producing Liquid Crystal Light (Optical) Modulation Element A first method is a method of producing a liquid crystal light (optical) modulation element including a liquid crystal layer held between a pair of substrates (usually including at least one transparent substrate), and containing a liquid crystal material exhibiting a cholesteric phase at a room temperature and having a peak of a selective reflection wavelength in a visible wavelength range.

This method includes a substrate processing step of processing at least one of the paired substrates such that the liquid crystal layer in the selective reflection state may have pixel regions neighboring to the opposite substrates, respectively, and liquid crystal domains in the pixel regions neighboring to at least one of the substrates may be in a mixed state of a polydomain state and a monodomain state; and a step of arranging the liquid crystal layer between the paired substrates including the substrate(s) subjected to the substrate processing step.

(2-4) Second Method of Producing Liquid Crystal Light (Optical) Modulation Element A second method is a method of producing a liquid crystal light (optical) modulation element including a liquid crystal layer held between a pair of substrates (usually including at least one transparent substrate), and containing a liquid crystal material exhibiting a cholesteric phase at a room temperature and having a peak of a selective reflection wavelength in a visible wavelength range.

This method includes a substrate processing step of processing the paired substrates such that the liquid crystal layer in the selective reflection state may have pixel regions neighboring to the opposite substrates, respectively, each of liquid crystal domains in the pixel regions may take a polydomain state, and the angles of the cholesteric helical axes of the liquid crystal with respect to the substrate normal may be different between the liquid crystal domains in the pixel regions near one of the opposite substrates and the liquid crystal domains in the pixel regions near the other substrate; and a step of arranging the liquid crystal layer between the paired substrates subjected to the substrate processing step.

In the first method of producing the liquid crystal optical modulation element, the substrate processing step is performed to process at least one of the paired substrates such that the liquid crystal layer in the selective reflection state may have pixel regions neighboring to the opposite substrates, respectively, and the pixel regions neighboring to one of the substrates may be in a mixed state of a polydomain state and a monodomain state; and the step is performed for arranging the liquid crystal layer between the paired substrates including the substrate(s) subjected to the substrate processing step. In this manner, the fourth liquid crystal optical modulation element described above can be produced.

In the second method of producing the liquid crystal optical modulation element, the substrate processing step is performed to process the paired substrates such that the liquid crystal layer in the selective reflection state may have pixel regions neighboring to the opposite substrates, respectively, liquid crystal domains in the pixel regions may take a polydomain state, and the angles of the cholesteric helical axes of the liquid crystal with respect to the substrate normal may be different between the liquid crystal domains in the pixel regions near one of the substrates and the liquid crystal domains in the pixel regions near the other substrate; and the step is performed for arranging the liquid crystal layer between the paired substrates subjected to the substrate processing step. In this manner, the fifth liquid crystal optical modulation element described above can be produced.

The first and second Producing methods can provide the liquid crystal optical modulation elements, in which good image display with high brightness, contrast and color purity can be performed, and the display state with high brightness, contrast and color purity can be maintained for a long time, e.g., even when the voltage is not applied. In other words, it is possible to provide the liquid crystal optical modulation elements, in which the characteristics of high reflection intensity, high contrast and high color purity in the planar state can be achieved together with the bistability.

In the first method of producing the liquid crystal optical modulation element, the substrate processing step may be performed such that each of the liquid crystal domains in the pixel regions near the opposite substrates may be in the foregoing mixed state, or that the liquid crystal domains in the pixel regions near one of the substrates may be in the foregoing mixed state, and the liquid crystal domains in the pixel regions near the other substrate may take only the polydomain state.

In the case where the processing is performed to attain the mixed state in each of the liquid crystal domains in the pixel regions near the opposite substrates, it is preferable that a ratio between the liquid crystal domains taking polydomain state and the liquid crystal domains taking monodomain state is different between the liquid crystal domains in the pixel regions near one of the substrates and liquid crystal domains in the pixel regions near the other substrate. It is further preferable that the liquid crystal domains in the pixel regions near the substrate on the element observation side take the polydomain state at a higher rate than that on the other side.

In the case where the processing is performed to attain the mixed state in the liquid crystal domains in the pixel regions near one of the substrates and to provide the other liquid crystal domains formed of only the polydomains, it is preferable that the mixed state is achieved in the liquid crystal domains in the pixel regions near the substrate on the side opposite to the element observation side, and the liquid crystal domains in the pixel regions near the substrate on the element observation side take only the polydomain state.

In the first method of producing the first liquid crystal optical modulation element, the substrate processing step may include a step of providing an orientation control layer on the side opposed to the liquid crystal domains in the mixed state of at least one of the paired substrates opposed to the liquid crystal domains in the mixed state; and a rubbing processing step of effecting rubbing processing on the orientation control layer arranged on the substrate opposed to the liquid crystal domains in the mixed state. In this case, it is desired in the rubbing step that the orientation control layer is rubbed at a rubbing density of 10 or less. The rubbing may be performed, e.g., through a mask having a predetermined pattern of openings so that the rubbing is partially effected on the orientation control layer for achieving the foregoing mixed state.

The substrate processing step may include a step of providing an orientation control layer on the side opposed to the liquid crystal domains in the mixed state of at least one of the substrates opposed to the liquid crystal domains in the mixed state; and a light irradiation step of irradiating the orientation control layer arranged on the substrate opposed to the liquid crystal domains in the mixed state with predetermined light for orientation control. In the light irradiating step, the amount of the predetermined light emitted to the orientation control layer may be changed, the temperature of the substrate during irradiation of the orientation control layer with the predetermined light may be changed, or the incident angle of the predetermined light with respect to the substrate surface during irradiation of the orientation control layer with the predetermined light may be changed. For example, the irradiation with the light may be performed through a mask having a predetermined pattern of openings so that the orientation control layer may be partially irradiated with the light, whereby the mixed state described above may be achieved in the element. In any one of the above cases, the predetermined light may be ultraviolet light.

In the substrate processing step, the processing conditions (e.g., the extent of rubbing in the rubbing processing step; and the amount of light irradiation, the substrate temperature during light irradiation, or the light incident angle to the substrate surface in the light emitting step) can be selected to control the view angle of the produced liquid crystal optical modulation element.

According to the second method of producing the liquid crystal optical modulation element, the substrate processing step may be performed such that the angle of the cholesteric helical axis of the liquid crystal in the liquid crystal domain of each of the pixel regions near the substrate on the observation side with respect to the substrate normal in the selective reflection state is larger than the angle of the cholesteric helical axis of the liquid crystal in the liquid crystal domain of each of the pixel regions near the opposite substrate with respect to the substrate normal in the selective reflection state.

In any one of the above cases, according to the second method of producing the liquid crystal optical modulation element, the substrate processing step may include a step of providing orientation control layers on the sides opposed to the liquid crystal layer of said paired substrate; and a rubbing processing step of effecting rubbing processing on at least one of the orientation control layers arranged on the opposite substrates. In this case, it is desired in the rubbing step that the orientation control layer is rubbed at a rubbing density of 10 or less. The rubbing may be performed, e.g., through a mask having a predetermined pattern of openings so that the rubbing is partially effected on the orientation control layer for achieving the foregoing mixed state.

The substrate processing step may include a step of providing orientation control layers on the sides opposed to the liquid crystal layer of the paired substrates; and a light irradiation step of irradiating at least one of the orientation control layers arranged on the opposite substrates with predetermined light under predetermined conditions. The above predetermined conditions maybe, e.g., the amount of irradiation light, substrate temperature or the incident angle of the light to the substrate surface. More specifically, in the light emitting step, the amount of the predetermined light emitted to the orientation control layer may be changed, the temperature of the substrate during irradiation of the orientation control layer with the predetermined light may be changed, or the incident angle of the predetermined light with respect to the substrate surface during irradiation of the orientation control layer with the predetermined light may be changed. For example, the irradiation with the light may be performed through a mask having a predetermined pattern of openings so that the orientation control layer may be partially irradiated with the light, whereby the mixed state described above may be achieved in the element. In any one of the above cases, the predetermined light may be ultraviolet light.

The substrate processing step may include a step of providing the orientation control layers exhibiting different material parameters on the sides opposed to the liquid crystal layer of the opposite substrates. In this case, the orientation control layers may be made of different materials, respectively, so that the material parameter of each orientation control layer is different from the other. The material parameter may be a pretilt angle, although not restricted thereto. The orientation control layer may be partially made of a different material for controlling the above angle.

In the substrate processing step, the processing conditions (e.g., the extent of rubbing in the rubbing processing step; and the amount of light irradiation in the light emitting step, the substrate temperature during light irradiation; the light incident angle to the substrate surface in the light emitting step; or the selection of the material of the orientation control layer in the case of including the step of, arranging the respective orientation control layers to provide different material parameters) can be selected to control the view angle of the produced liquid crystal optical modulation element.

According to the first and second methods of producing the liquid crystal optical modulation element, the substrate processing step may be preferably performed such that the angle of the cholesteric helical axis of the liquid crystal in each of the liquid crystal domains of the pixel regions near the opposite substrates with respect to the substrate normal is 20° or less on average, and more preferably may be 20° or less in all the liquid crystal domains.

The first and second methods of producing the liquid crystal optical modulation element may include a step of partially arranging a region providing a different orienrtation regulating force on the surface in contact with the liquid crystal of at least one of the substrates for orientating regularly the helical axes of the liquid crystal molecules in the focal conic state, and a step of arranging the liquid crystal layer between the paired substrates including at least one substrate provided with the region having the different orientation regulating force.

According to this method, the form, position, arrangement pitch, orientation direction and others can be arbitrarily determined when forming the region having the orientation regulating force. Accordingly, the orientation regulation of the liquid crystal can be easily controlled. A step for providing an independent member for regulating the orientation of the liquid crystal is not required.

In the step of partially providing the region having the orientation regulating force, the region may be formed by entirely or partially effecting the rubbing, or by entirely or partially effecting the light irradiation. In any one of the above cases, the step of partially providing the region having the orientation regulating force may include a step of arranging a mask layer partially provided with an opening on the substrate, and a step of removing the mask layer.

In the step of partially providing the region having the orientation regulating force, the orientation film partially made of a different material may be formed to provide the region of the different orientation regulating force.

As the manner of entirely or partially effecting the rubbing as well as the manner of entirely or partially effecting the light irradiation described above, similar manner to those executed in the rubbing processing step in the first and second methods of producing the liquid crystal optical modulation element can be employed. As the manner of using the partially different material, simialar manner to that employed in the second method for arranging the orientation control layers providing the different material parameters on the sides of the paired substrates opposed to the liquid crystal layer can be employed.

(2-5) With Respect to Liquid Crystal Light (Optical) Modulation Elements Shown in Figures and Others The liquid crystal optical modulation elements and others of the types already described will now be described with reference to FIGS. 9 to 29.

Figure 9:
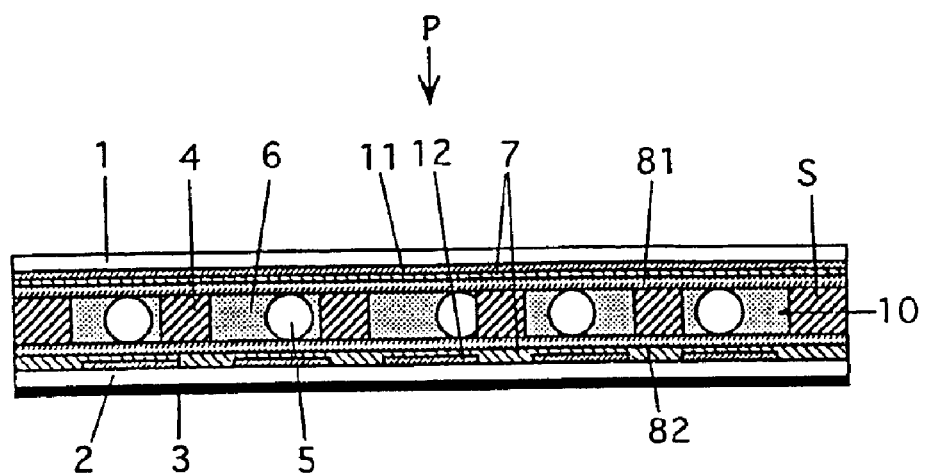
FIG. 9 is a schematic cross section of an example of a liquid crystal light modulation element.

FIG. 9 is a schematic cross section of an example of a liquid crystal light (optical) modulation element.

The liquid crystal light modulation element shown in FIG. 9 includes a pair of substrates 1 and 2 as well as a liquid crystal layer 10 held therebetween. The liquid crystal layer 10 contains a liquid crystal material 6, which exhibits a cholesteric phase at a room temperature, and has a peak of a selective reflection wavelength in a visible wavelength range. Resin structures 4 and spacers 5 are arranged between the substrates 1 and 2 for keeping a space between the substrates 1 and 2. The resin structures 4 also function to couple the substrates together.

A visible light absorber layer is arranged, if necessary, on an outer surface (rear surface) of the substrate opposite to an element observation side P (light incident side). In the example shown in FIG. 9, a visible light absorber layer 3 is arranged on the outer surface (rear surface) of the substrate 2. For example, the substrate 2 may be formed of a black substrate so that the substrate itself may have a light absorbing function.

S indicates a seal member for keeping the liquid crystal material 6 between the substrates 1 and 2.

In the liquid crystal light modulation element shown in FIG. 9, a predetermined voltage is applied for switching the liquid crystal 6 between the planar state (selective reflection state) and the focal conic state.

At least one of the substrates 1 and 2 in this example has light transparency. The substrate having the light transparency may be a glass substrate. Instead of the glass, the flexible substrate may be made of, e.g., polycarbonate, polyether sulfone (PES) or polyethylene terephthalate. In the case where the liquid crystal light modulation element is used as a liquid crystal light modulation element of the reflection type, such a structure is not required that both the substrates are transparent. In this example, both the substrates 1 and 2 have the light transparency.

In liquid crystal light modulation elements including that shown in FIG. 9, electrodes may be formed on the pair of substrates, if necessary.

The electrode may be formed of a transparent conductive film made of ITO (Indium Tin Oxide) or the like, a metal electrode made of, e.g., aluminum or silicon, or a photoconductive film made of, e.g., amorphous silicon or BSO (Bismuth Silicon Oxide). The electrodes formed on the substrate, which is used for holding the liquid crystal layer, have a predetermined pattern, and are used as the electrodes for controlling the liquid crystal display element. The electrodes may have such a pattern that a plurality of belt-like forms extend in parallel with each other. The paired substrates carrying the electrodes of the belt-like pattern are opposed to each other with their electrodes located perpendicular to each other. Thus, the liquid crystal light modulation element can use the electrode structure of a simple matrix form. Further, it is possible to use an electrode structure of an active matrix type, which includes a plurality of pixel electrodes and thin-film transistors connected thereto.

Instead of arranging the above electrode member on the substrate, which is used for holding the liquid crystal layer, an electrode, which serves also as the substrate by itself, can be used as the substrate member.

Figure 10:
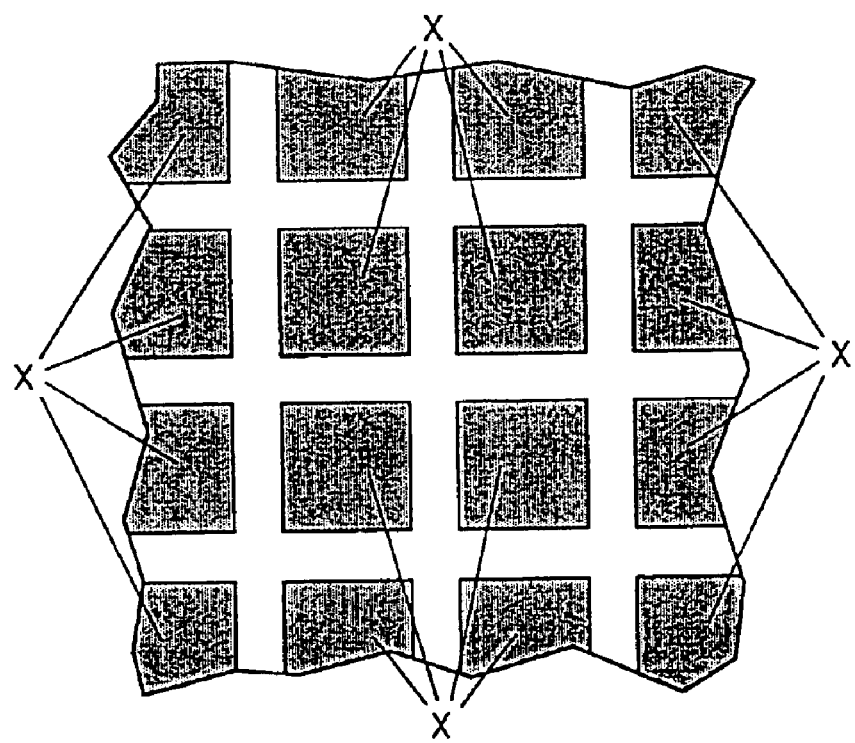
FIG. 10 is a schematic plan of a pixel pattern of the liquid crystal light modulation element shown in FIG. 9.

FIG. 10 is a schematic plan of a pixel pattern of the liquid crystal light modulation element shown in FIG. 9.

In the liquid crystal light modulation element shown in FIG. 9, as already described, the substrates 1 and 2 have light transparency, and these transparent substrates 1 and 2 are provided at their surfaces with electrode groups, respectively, each of which includes a plurality of belt-like parallel electrodes 11 or 12. The transparent electrodes 11 and 12 are opposed and perpendicular to each other so that regions, where these electrodes 11 and 12 intersect, form pixel regions X, respectively (see FIG. 10).

The liquid crystal light modulation element shown in FIG. 9 as well as other liquid crystal optical modulation elements may be provided with gas barrier layers and/or insulating layers, each of which may be formed of an insulating film having a function of improving reliability of the liquid crystal light modulation element. The insulating film may be made of a material selected from various organic and inorganic materials. In this example, insulating films 7 are arranged on the electrodes 11 and 12, respectively.

In addition to the liquid crystal material 6, such a liquid crystal material may be employed in liquid crystal light modulation element that exhibit a cholesteric phase when held between a pair of substrates (e.g., substrates with electrodes). For example, cholesteric liquid crystal having a cholesterol ring may be used. In addition to the above, it is possible to use a nematic liquid crystal having an optical active group, or liquid crystal prepared by adding a chiral agent to cholesteric liquid crystal or nematic liquid crystal. These materials (nematic liquid crystal, cholesteric liquid crystal and chiral agent) may be used solely, or may be used as a mixture of two or more kinds of the materials.

The liquid crystal having a peak of the selective reflection wavelength in the visible wavelength range may be cholesteric liquid crystal having the helical pitch, which is effective at reflecting the light in the visible wavelength range by itself. In addition to the above, such a liquid crystal may be used that is prepared by adding an appropriate amount of material having an optical active group material to the nematic liquid crystal material for controlling the helical pitch.

In general, the visible wavelength range is not strictly defined, and is slightly variable depending upon varied ideas. The visible wavelength range determined in the embodiments may be in a range which is generally considered as the visible wavelength range. In the embodiments and experimental examples, which will be described later, the visible wavelength range is between 400 nm and 700 nm. In the liquid crystal light modulation element of the cholesteric selective reflection type, scattered components are included in a shorter wavelength range than the selective reflection wavelength range. For absorbing the scattered components and improving the color purity, dye(s) absorbing the light in the shorter wavelength range than the selective reflection wavelength range may be added to the liquid crystal material.

Figure 11A:
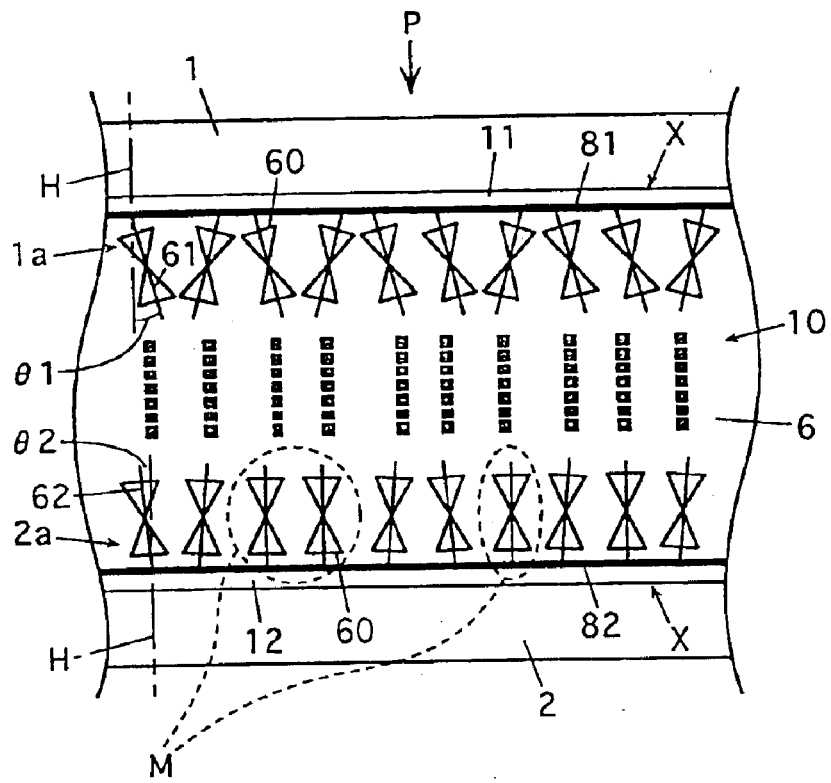
FIG. 11(A) shows a liquid crystal layer in the selective reflection state of the liquid crystal light modulation element shown in FIG. 9, and particularly shows a mixed state of polydomain state and monodomain state of the liquid crystal in the pixel region opposed and neighboring to at least one of the substrates.
Figure 11B:
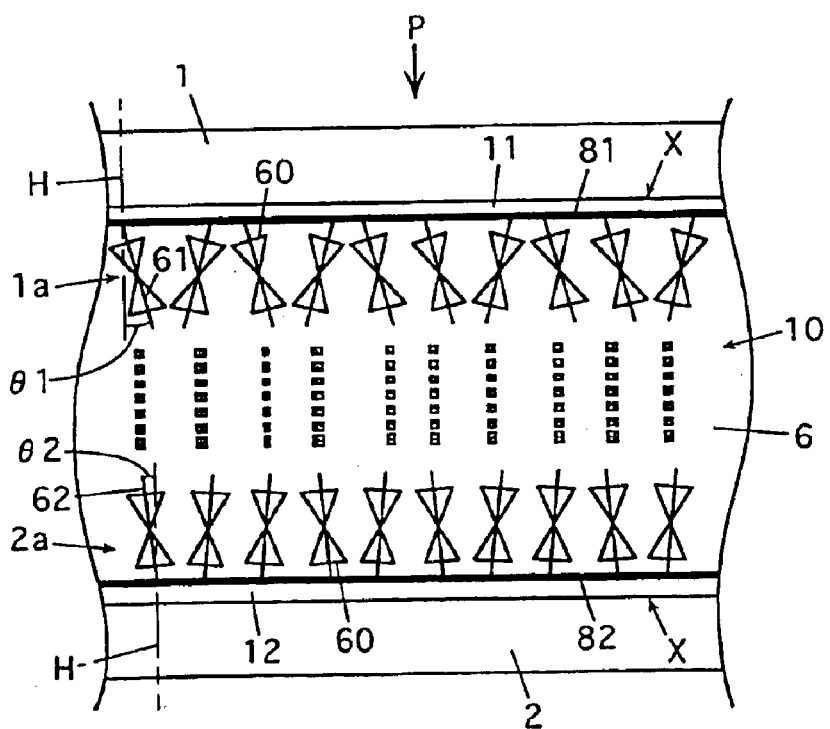
FIG. 11(B) shows a liquid crystal layer in the selective reflection state of the liquid crystal light modulation element shown in FIG. 9, and particularly shows a state wherein each of the liquid crystal domains in the pixel regions opposed and neighboring to the opposite substrates attains the polydomain state and the liquid crystal in each of the liquid crystal domains opposed and neighboring to the opposite substrates has the cholesteric helical axes different in angle with respect to a normal of the substrate from that of the other substrate.

FIGS. 11(A) and 11(B) show examples of the respective liquid crystal domains in pixel regions X opposed and neighboring to the substrates 1 and 2 of the liquid crystal layer 10 of the liquid crystal light modulation element shown in FIG. 9 in the selective reflection state. FIGS. 11(A) and 11(B) do not show the insulating film 7 and others.

In the liquid crystal light modulation element shown in FIG. 9, either of the following states is attained in the respective liquid crystal domains in the pixel regions X opposed and neighboring to the substrates 1 and 2 of the liquid crystal layer 10 in the selective reflection state.

(1) A mixed state of the polydomain state and monodomain state is attained in the respective liquid crystal domains in pixel regions X of at least one of portions 1a and 2a opposed to the substrates 1 and 2 of the liquid crystal layer 10 in the selective reflection state.

(2) A polydomain state is attained in each of the pixel regions X of the portions 1a and 2a opposed to the substrates 1 and 2 of the liquid crystal layer 10 in the selective reflection state, and angles θ1 and θ2 are different, which are defined by cholesteric helical axes 61 and 62 of the liquid crystal with respect to a substrate normal H in the liquid crystal domains in the pixel regions X of the substrate vicinities 1a and 2a, respectively, (see FIG. 11(B)).

The above "polydomain" is a bunch of domains, where the helical axis of the liquid crystal in the selective reflection state is slightly inclined with respect to the substrate normal, and the projection directions of the helical axes with respect to the substrate are randomly different. The "monodomain" is a bunch of domains where the helical axes of the liquid crystal are perpendicular or substantially perpendicular to the substrate surface, and thus are extended in a uniform direction.

The above case (1) will now be described with reference to FIG. 11(A). The liquid crystal domains of the pixel region X of one of the opposite substrate vicinities 1a and 2a are in the mixed state (including monodomain state indicated by "M" in FIG. 11(A)), and the liquid crystal domains of the other substrate vicinity take only the polydomain state. More specifically, the mixed state is attained in the liquid crystal domains in the pixel region X of the substrate vicinity 2a remote from the element observation side P, and the liquid crystal domains in the pixel region X of the substrate vicinity 1a on the element observation side P take only polydomain state.

An orientation control layer 82, which is opposed to the liquid crystal domain and is in contact with the liquid crystal 6, is arranged on the side of the substrate 2 opposed to the liquid crystal domain in the mixed state. The orientation of the crystal molecules 60 in the mixed state is controlled by the orientation control layer 82. This orientation control may be performed in the following manners (a) and (b).

(a) The orientation control can be performed by the rubbing, which is effected on the orientation control layer 82 arranged on the substrate 2 opposed to the liquid crystal domain in the mixed state. In this case, it is desired that the orientation control layer 82 subjected to the rubbing has a rubbing density of 10 or lower. For example, by performing the rubbing through a mask having a predetermined opening pattern, the orientation control layer can be partially subjected to the rubbing so that the foregoing mixed state may be achieved.

(b) The orientation control is performed by emitting light under predetermined conditions to the orientation control layer 82, which is arranged on the substrate 2 opposed to the liquid crystal domain in the mixed state. The orientation control may be determined, e.g., by the amount of the predetermined emitted light, the substrate temperature during the irradiation with the predetermined light, the angle of the incident light on the substrate surface or combination two or more thereof. For example, the light irradiation may be performed with a mask having a predetermined pattern of openings so that the orientation control layer is partially irradiated with the light for achieving the foregoing mixed state. In any one of the above cases, the predetermined light may be ultraviolet light.

In this embodiment, the orientation control is performed by rubbing the orientation control layer 82 arranged on the substrate 2 opposed to the liquid crystal domain in the mixed state. The rubbing density of the orientation control layer 82 thus subjected to the rubbing is 10 or less.

An orientation control layer 81 is arranged on the side of the substrate 1 opposed to the liquid crystal domain formed of only the polydomains. The orientation control layer 81 is made of the same material as the orientation control layer 82, but is not subjected to the rubbing.

Description will now be given on the above case (2) with reference to FIG. 11(B). with respect to the substrate normal H, the cholesteric helical axis 61 of the liquid crystal 6 in the liquid crystal domain of the pixel region X in the substrate vicinity 1a on the element observation side P forms the angle θ1 larger than the angle θ2, which is formed with respect to the substrate normal H by the cholesteric helical axis 62 of the liquid crystal 16 in the liquid crystal domain of the pixel region X of the other substrate vicinity 2a.

The orientation control layers 81 and 82, which are in contact with the liquid crystal 6, are arranged on the sides of the substrates 1 and 2 opposed to the liquid crystal layer 10. The orientation control layers 81 and 82 control the angles θ1 and θ2, which are formed by the cholesteric helical axes 61 and 62 of the liquid crystal 6 in the liquid crystal domains of the pixel regions X in the substrate vicinities 1a and 2a with respect to the substrate normal H, respectively. The control by the orientation control layers 81 and 82 can increase or decrease the angles θ1 and θ2. The angles vary in the following cases (c) and (d).

(c) The change or difference in angle is caused by the rubbing, which is effected on at least one of the orientation control layers 81 and 82 arranged on the respective substrates 1 and 2. In this case, it is desirable that the orientation control layer thus rubbed has the rubbing density of 10 or loess. The angle may be increased or decreased by partially effecting the rubbing on the orientation control layer through a mask having a predetermined pattern of openings. In any one of the above cases, the polydomain having helical axes of a smaller inclination than the original inclination can be obtained without causing monodomain structure, depending on the material of the orientation film and/or rubbing conditions.

(d) The change or difference in angle is caused by the irradiation with predetermined light, which is effected on at least one of the orientation control layers 81 and 82 arranged on the respective substrates 1 and 2. In this case, increase or decrease in angles θ1 and θ2 may be controlled by the amount of the predetermined light emitted to the orientation control layer, the substrate temperature during the irradiation of the orientation control layer with the predetermined light, the angle of the incident light on the substrate surface during the irradiation of the orientation control layer with the predetermined light, or the like. The light irradiation may be performed with a mask having a predetermined pattern of openings so that the orientation control layer is partially irradiated with the light for changing the angle. In any one of the above cases, the polydomain having helical axes of a smaller inclination than the original inclination can be obtained without causing monodomain structure, depending on the orientation film material and the light emitting conditions. In any one of the above cases, the predetermined light may be ultraviolet light.

The material parameter may be different between the orientation control layers 81 and 82 arranged on the substrates 1 and 2. In this case, the orientation control layers 81 and 82, which are arranged on the substrates 1 and 2 and have different material parameters, control the angles θ1 and θ2, which are formed by the cholesteric helical axes 61 and 62 of the liquid crystal 6 in the liquid crystal domains of the pixel regions X in the substrate vicinities 1a and 2a with respect to the substrate normal H, respectively. For providing different material parameters, the orientation control layers 81 and 82 may be made of different kinds of materials, respectively. The material parameter may be a pretilt angle, although not restricted thereto.

The difference between angles θ1 and θ2 may be caused by the rubbing, which is effected on both the orientation control layers 81 and 82 arranged on the substrates 1 and 2, respectively. The rubbing densities of both the orientation control layers 81 and 82 thus rubbed are 10 or less.

In the liquid crystal light modulation element shown in FIG. 9, the angles θ1 and θ2, which are formed by the cholesteric helical axes 61 and 62 of the liquid crystal 6 in the liquid crystal domains of the pixel regions X in the substrate vicinities 1a and 2a in the selective reflection state with respect to the substrate normal H, respectively, are 20° or less.

In the liquid crystal light modulation element shown in FIG. 9 and other liquid crystal light modulation elements, the helical axes of the liquid crystal molecules in the focal conic state may be orientated regularly in a plane substantially parallel to the substrate surface for the purpose of reducing a light scattering effect in the focal conic state.

In this case, orientation regulating means for the liquid crystal molecules may be employed in the liquid crystal element for aligning or orientating helical axes of the liquid crystal molecules in the focal conic state in regular directions within a plane substantially parallel to a substrate surface.

The orientation regulating means for orientating helical axes in regular directions within a plane substantially parallel to a substrate surface may be means for controlling the electric field or means for causing a difference in orientation regulating force.

(A) Means for Controlling the Electric Field (a projected structure or a groove causing anisotropy in the directions of the potential lines (in other words, the lines of electric force) of electric field) is as follows.

Figure 12:
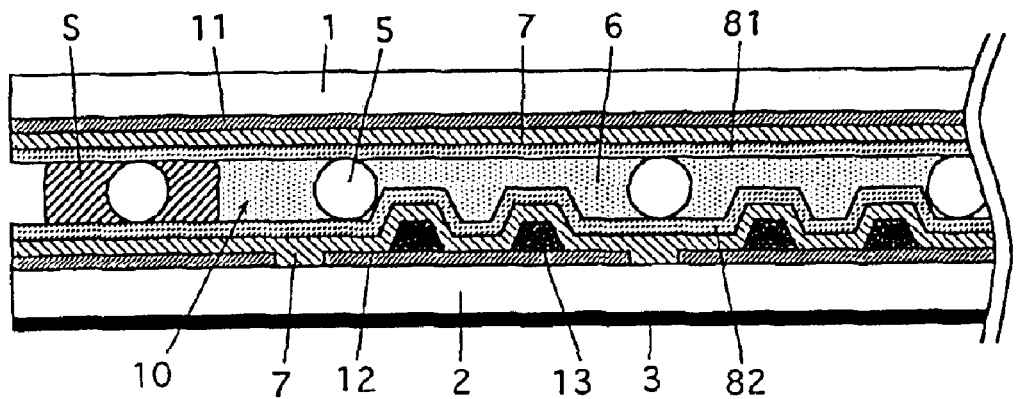
FIG. 12 shows a modified liquid crystal light modulation element similar to that shown in FIG. 9, and particularly a state where rib-like projected structures forming an example of the orientation regulating means is formed.
Figure 13:
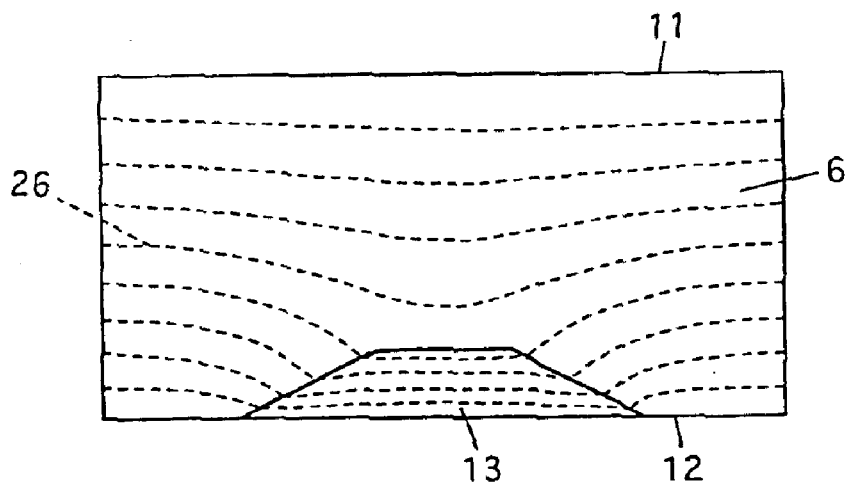
FIG. 13 shows a state where distortion occurs in equal potential lines near the projected structure in the liquid crystal light modulation element provided with the rib-like projected structure.
Figure 14:
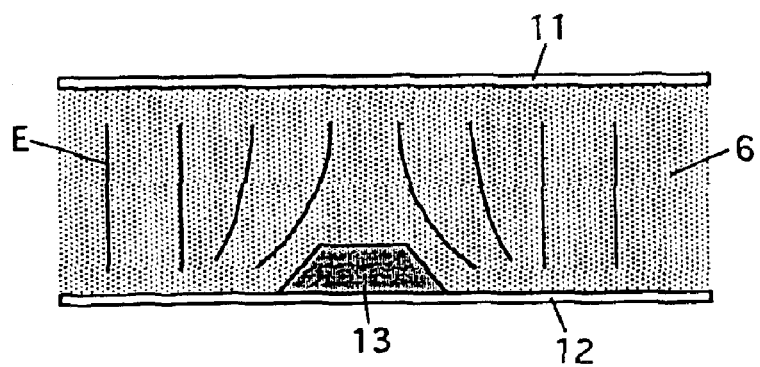
FIG. 14 shows a state where an electric field direction partially inclined in a specific direction in the liquid crystal light modulation element provided with the rib-like projected structure.

FIG. 12 shows projected structures 13 of a rib from, which are an example of the orientation regulating means, and is formed in the liquid crystal light modulation element shown in FIG. 9. FIG. 13 shows a state of distortion caused in equal potential lines near the projected structure 13 in the liquid crystal light modulation element. FIG. 14 shows a state, where electric field directions E are partially inclined to specific directions. FIG. 12 does not show the resin structures 4 which are practically formed. This is true also with respect to FIGS. 17 and 19, which will be described later.

Figure 15:
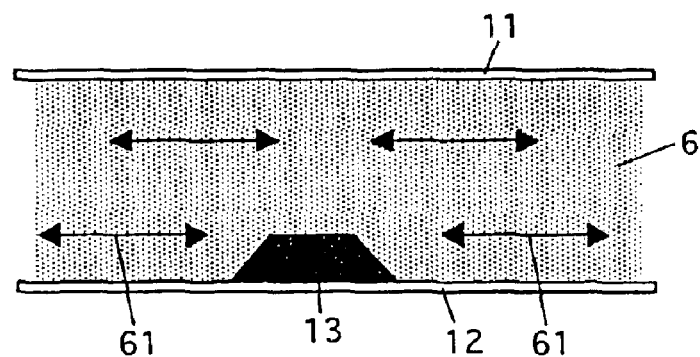
FIG. 15 shows a state where helical axes of the liquid crystal are regularly positioned in a plane substantially parallel to the substrate.
Figure 16:
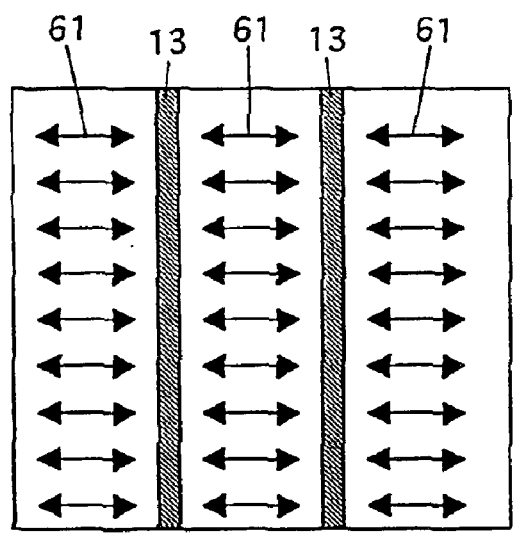
FIG. 16 shows a top view of the liquid crystal light modulation element, and particularly shows a state shown in FIG. 15.

In FIG. 12, the projected structures 13 of the rib form are arranged on the substrate 2. The provision of the projected structure 13 causes distortion in the equal potential lines 26 near the structure when a voltage is applied across the electrodes 11 and 12. Therefore, the electric field directions E (in other words, lines of electric force of the electric field) are partially inclined to the specific directions as shown in FIG. 14. When the application of the voltage is stopped in the above state for changing the liquid crystal to the focal conic state, the influence of the inclined electric field, which was previously present, restricts the direction of the helical axes of the liquid crystal. As a result, the helical axes 61 of the liquid crystal are regularly orientated in a plane substantially parallel to the substrate, as shown in FIGS. 15 and 16. Accordingly, it is possible to achieve the focal conic state, in which the helical axes 61 of the liquid crystal molecules are regularly orientated, and therefore the light scattering is suppressed. FIG. 16 shows a state of the liquid crystal light modulation element viewed from an upper side.

The projected structure is not restricted to the foregoing structure 13, and may be selected from various forms.

Figure 17:
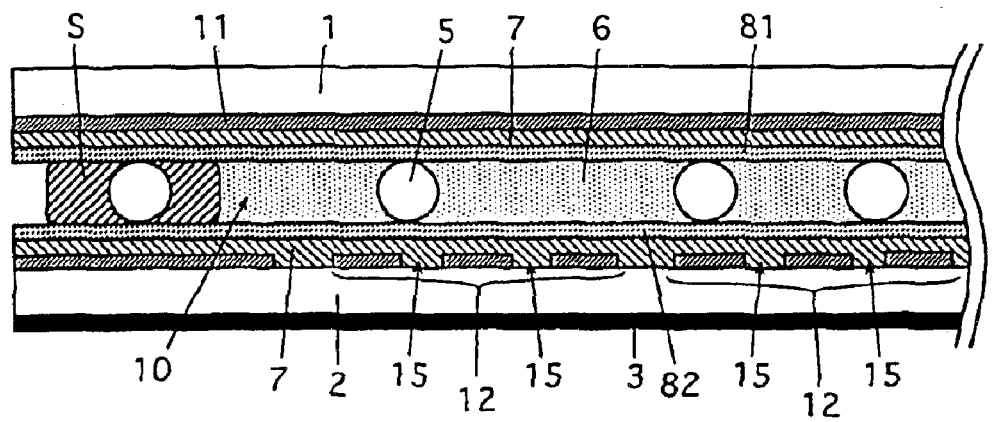
FIG. 17 shows another modified liquid crystal light modulation element similar to that shown in FIG. 9, and particularly shows a state where a groove (slit), i.e., another example of the orientation regulating means is formed on an electrode.

FIG. 17 shows grooves (slits) 15, which are another example of the orientation regulating means, and are formed in the electrode 12 of the liquid crystal light modulation element shown in FIG. 9. FIG. 18 shows distortion in the equal potential lines near the slit 12 formed in the electrode 12 of the liquid crystal light modulation element.

As shown in FIG. 17, the slit 15 formed on the transparent electrode 12 causes the distortion in the potential lines 26 near the slit 15 as shown in FIG. 18, and therefore it is possible for the same reason to achieve the focal conic state, in which the helical axes are regularly orientated, and the scattering is suppressed.

The groove may be formed in a portion other than the electrode, and may be formed in the insulating film or the like.

(B) Means for changing the orientation regulating force is as follows.

A region providing a different orientation regulating force may be used as another means for orientating the helical axes regularly in the plane substantially parallel to the substrate. The region providing the different orientation regulating force may be a region, which an anchoring force or an orientating force with respect to the liquid crystal molecules is different. The region of the different orientation regulating force can be achieved by effecting rubbing processing or optical orientation with ultraviolet light or the like on the orientation film (orientation control layer) of, e.g., polyimide uniformly coating the electrode surface. In particular, low-density rubbing (e.g., of the rubbing density of 10 or less) maybe effect on the whole orientation control layer, rubbing may be partially effected on the orientation control layer through a mask having a predetermined pattern of openings, or light irradiation may be partially effected on the orientation control layer through a mask having a predetermined pattern of openings, whereby the region providing the different orientation regulating force can be formed. By forming the orientation film made of a partially different kind of material, the region providing the different orientation regulating force can be also achieved.

The region providing the different orientation regulating force does not cause such a situation that the rubbing processing or the like causes inclination in the electric field direction, but causes such a situation that the difference in surface regulating force determines the direction of the helical axes during transition of the liquid crystal molecules to the focal conic state, and thereby the effect can be achieved similarly the foregoing means of inclining the electric field direction.

In any one of the above cases, the above orientation processing can bring about such an advantage that an addition member is not required in the liquid crystal display element for regularly orientating the helical axes in a plane parallel to the substrate, and therefore the reliability can be improved. In particular, the optical orientation processing is superior in view of the fact that the possibility of causing dust and others is low.

The manners of entirely or partially effecting the rubbing and the manners of entirely or partially effecting the light irradiation may be similar to the orientation controlling method employed in the fourth liquid crystal light modulation element, if it is provided with the orientation control layer, and the liquid crystal molecules in the mixed state in the liquid crystal layer in the selective reflection state are subjected to the orientation control by the orientation control layer (in the case of FIG. 11(A)). The manners of partially effecting the rubbing, the manners of partially effecting the light irradiation and the manner of employing a partially different material maybe similar to the orientation control manner employed in the fifth liquid crystal light modulation element, if it is provided with the orientation control layer, and the orientation control layer controls the angle of the cholesteric helical axis of the liquid crystal in each of the liquid crystal domains of the pixel regions near the opposite substrates with respect to the substrate normal when the liquid crystal layer is in the selective reflection state (in the case of FIG. 11(B)). By employing the manners similar to the foregoing orientation control manners, it is possible to achieve the foregoing mixed state and the difference in the angle between the upper and lower substrates. At the same time, it is possible to achieve the focal conic state causing less scattering.

FIG. 19 shows an example of the region 16, which is partially processed in the above manner, and is arranged on the orientation control layer (orientation film) 82 in the liquid crystal light modulation element shown in FIG. 9.

The orientation control layer, which is provided with the partially processed region, may be configured to perform the orientation control of the liquid crystal molecules for obtaining the mixed state of the liquid crystal layer in the selective reflection state, as is done in the case of FIG. 11(A). Also, as is done in the case of FIG. 11(B), it may be configured to control the angle with respect to the substrate normal of the cholesteric helical axis of the liquid crystal in each of the liquid crystal domains of the pixel regions near the opposite substrate vicinities of the liquid crystal layer in the selective reflection state. In any one of the above cases, it is possible to orientate regularly the helical axes of the liquid crystal in the focal conic state in a plane substantially parallel to the substrate.

As the manner of controlling the angle with respect to the substrate normal of the cholesteric helical axis of the liquid crystal in each of the liquid crystal domains of the pixel regions near the opposite substrate vicinities in the selective reflection state, such a manner can be effectively employed as appropriately selecting the kind of material of the substrate surface, which may be formed of e.g., film on the substrate, nearest to the cholesteric liquid crystal and/or appropriately processing the substrate surface in accordance with the kind of the cholesteric liquid crystal material.

If the substrate surface nearest to the cholesteric liquid crystal is formed of a film, the material of such surface may be the same as the foregoing electrode and insulating film as well as polyimide. The polyimide is most preferable in view of the fact that the interaction with respect to the cholesteric liquid crystal can be easily changed by the orientation processing, which will be described later. The thickness of the film is merely required to be of a value, which allows application of the voltage to the cholesteric liquid crystal, and does not remarkably reduce the light transmittance.

The manner of performing the orientation processing may be the rubbing processing, in which the surface to be processed is rubbed in a uniform direction, e.g., with a cloth or the like. In the case where the substrate surface nearest to the cholesteric liquid crystal is formed of the film (e.g., polyimide film), such a manner can be appropriately employed that the formed film is irradiated with non-polarized light or linear-polarized light (e.g., ultraviolet light) for causing isomerization, dimerization, decomposition or the like for causing the anisotropy.

If the rubbing processing is employed, such a rubbing device may be employed that is provided with a rubbing roller having a rubbing cloth of a predetermined fiber or brush height. The substrate is moved in a predetermined direction at a predetermined moving speed, and the rubbing roller rotating in a predetermined direction at a predetermined rotation speed is brought into contact with the nearest substrate surface so that the nearest substrate surface is rubbed. If this rubbing device provided with the rubbing roller is employed, the orientation control of the liquid crystal molecules can be performed depending on the pressed fiber or brush height of the rubbing cloth, times of rubbing, rubbing roller radius, rubbing roller rotation speed and the substrate moving speed.

Assuming that N indicates the rubbing times, r indicates the rubbing roller radius, m indicates the rubbing roller rotation speed and v indicates the substrate moving speed, the rubbing density L expressed by the following formula (1) is an important parameter.

$$L=N\{1+2\pi rm/v\} \quad \text{(formula 1)}$$

If the rubbing density is equal to about 100, the helical axes of the cholesteric liquid crystal are perfectly or substantially perfectly perpendicular to the substrate surface so that the foregoing bistability effect is liable to be lost. If the rubbing density is smaller than 100, it is considered that the substrate surface is not entirely rubbed, and the rubbing effect is partially achieved. Thereby, some helical axes of the liquid crystal are perfectly or substantially perfectly perpendicular to the substrate surface, and the others have inclination with respect to the substrate normal. In a range (e.g., having a side of about 100 μm) corresponding one pixel of the liquid crystal light modulation element, the inclination of the helical axes of the liquid crystal serves as an average in this range, and provides a certain angle with respect to the substrate normal. A similar effect can be achieved even in the case where the rubbing density of the rubbing-target region corresponding to the opening portion of the mask layer is increased by the partial rubbing method, in which the rubbing processing is partially performed, e.g., with the mask layer.

When the optical orientation processing is employed by, e.g., irradiating the processing-target region with ultraviolet light, the orientation control for the liquid crystal molecules can be achieved depending on the illuminance of ultraviolet light, light irradiation period, substrate temperature during the light irradiation, incident light angle on the substrate surface, or the like.

Similarly to the partial orientating method (partial rubbing method) already described, the partial optical orientation processing for performing the exposure with a photomask can be effectively used.

A similar effect can be achieved also in the case where the nearest surface films of the opposite substrates are made of different materials (e.g., polyimide film materials), respectively. More specifically, a similar effect can be achieved in the case where the surface films of the opposite substrates are made of materials providing the different pretilt angles determined by the rubbing, respectively, or the materials providing the same pretilt angle but having different material compositions, respectively.

In an example of the method of partially effecting the rubbing processing on the orientation control film (orientation film), a photoresist material is applied, e.g., by spin coating to the orientation film, and then is removed from the portion to be rubbed by conventional photolithography, and then the rubbing is performed. Thereafter the resist is removed. Thereby, the rubbed region is prepared. The rubbing direction is not restricted.

The method of partially performing the optical orientation processing may be performed by effecting the ultraviolet light exposure, e.g., through a photomask and a polarizing plate. This can easily provide the optically orientated region.

FIGS. 20(A)–20(D) show an example of steps for partially processing the orientation film in the foregoing method. This example includes the following steps.

In FIG. 20(A), the insulating film 7 is formed on the electrode surface of the substrate 2 provided with the patterned electrodes 12.

In FIG. 20(B), the orientation film 82 is formed on the insulating film 7.

In FIG. 20(C), the orientation film 82 is exposed to the light coming from a light source 70 through an opening portions 73 in a mask 72, or In FIG. 20(C'), a resist film 40 is formed on the orientation film 82, and is patterned.

Then, rubbing processing 64 is effected on the orientation film 82 through opening portions 41 in the resist film 40. Then, the resist film 40 is removed.

In FIG. 20(D), through the above, the partially processed regions 16 are formed.

Through the above steps, the regions 16 having a desired form can be formed in intended positios by a relatively simple manner.

The method of using the different kinds of orientation films can be performed in such a manner that, after patterning the resist film in the step shown in FIG. 20(C'), different kinds of orientation films are applied and baked, and the resist film is removed.

The liquid crystal light modulation element shown in FIG. 9 can employ the regions 16 thus obtained in the orientation control layer 82 in the case shown in FIG. 11(A), or in each of the orientation control layers 81 and 82 in the case shown in FIG. 11(B).

As described above, the surface treatment is effected on the substrate, or the material of the substrate surface nearest to the liquid crystal is selected so that the difference is caused in the inclination (angle with respect to the substrate normal) of the helical axis of the cholesteric liquid crystal between the opposite substrates. In this case, the cholesteric domains near the respective substrates have different structures, and provide different optical reflection characteristics in the planar state.

In the liquid crystal light modulation element, which performs the display by the selective reflection of the visible light by the cholesteric liquid crystal, if the inclination (angle with respect to the substrate normal) of the helical axis of the liquid crystal is relatively large, the spectrum half bandwidth is large, and thus good view angle characteristics can be achieved, although the light reflectance is low at the front on the element observation side. On the other hand, if the inclination (angle with respect to the substrate normal) of the helical axis of the liquid crystal is relatively small, the light reflectance and color purity are high at the front on the element observation side, and the view angle characteristics are relatively low. Accordingly, as compared with the non-orientated cholesteric liquid crystal display element, good brightness and good color purity characteristics can be achieved at the front on the element observation side while maintaining the bistability. If the inclination (angle with respect to the substrate normal) of the helical axis of the liquid crystal on the element observation side is larger than that on the non-observation side (opposite side), the light reflected by the cholesteric domain having the helical axes of small inclination is slightly scattered by the cholesteric domain having the helical axes of large inclination. This is advantageous from the viewpoint of the view angle characteristics.

The following formula (2) expresses a wavelength λ of the selectively reflected light derived from the incident light which is inclined with respect to the helical axis direction in the planar orientation of the cholesteric liquid crystal.

$$\lambda = \bar{n} p \cos \frac{1}{2}\left[\sin^{-1}\left(\frac{1}{n}\sin\phi_i\right) + \sin^{-1}\left(\frac{1}{n}\sin\phi_s\right)\right] \quad \text{(formula 2)}$$

wherein $\bar{n}$ represents an average refractive index, p represents a helical pitch of the cholesteric liquid crystal, n represents an average refractive index of the liquid crystal, $\phi_i$ and $\phi_s$ represent incident and reflection angles of the light with respect to the helical axis, respectively.

Accordingly, the inclination (angle with respect to the substrate normal) of the helical axis of the liquid crystal can be easily calculated by preparing a liquid crystal cell exhibiting equal or similar inclination angles of the helical axes of the liquid crystals in the opposite substrates, measuring the spectral transmittance of the liquid crystal cell and comparing the spectral transmittance and the selective reflection wavelengths of the cholesteric cells having rubbed opposite substrate surfaces.

The cell subjected to the high-density rubbing exhibits the helical axis angle of 0°. With respect to this cell, the cell transmittance is measured, and the selective reflection center wavelength is read out from the obtained spectrum.

Assuming that the wavelength is λ0, the following relationship is obtained:

$$\lambda_0 = \bar{n} p \cos \frac{1}{2}\left[\sin^{-1}\left(\frac{1}{n}\sin 0\right) + \sin^{-1}\left(\frac{1}{n}\sin 0\right)\right] \quad \text{(formula 3)}$$

Accordingly, $\bar{n}p$ is obtained.

Then, measurement is made on a cell having a helical axis angle of few degrees, and the central wavelength is likewise read out.

Assuming that the wavelength is λ', the following relationship is obtained:

$$\lambda' = \bar{n} p \cos \frac{1}{2}\left[\sin^{-1}\left(\frac{1}{n}\sin\phi_s\right) + \sin^{-1}\left(\frac{1}{n}\sin\phi_s\right)\right] \quad \text{(formula 4)}$$

By substituting the result of the formula (3) into the formula (4), the angle $\phi_s$ is obtained. The angle $\phi_s$ is the inclination angle of the helical axis.

By the above manners, the inclination (angle to the substrate normal) of the helical axis of the liquid crystal was calculated, and the display characteristics were compared. According to the result, the liquid crystal light modulation element having the helical axis inclination of 20° or less is superior in view of the brightness and the color purity. In contrast to this, the liquid crystal light modulation element having the helical axis inclination larger than 20° is inferior in view of the color purity because the scattering between the domains is large. The multilayer liquid crystal light modulation element formed of such elements has a low light transmittance. Accordingly, it is desired that the helical axis inclination of the liquid crystal is 20° or less.

The liquid crystal light modulation element may be provided with spacers, which are arranged between the paired substrates, and serves as a spacer member for defining a gap and keeping a uniform gap between the substrates. The spacer member defining the gap may be spherical spacer particles of, e.g., glass or plastics. In addition to the above, it may be provided with a thermoplastic or thermosetting columnar adhesive. The liquid crystal light modulation element shown in FIG. 9 includes the spacers 5 arranged between the substrates 1 and 2, already described.

The liquid crystal light modulation element shown in FIG. 9 and other liquid crystal light modulation elements may be provided with a structure serving as a space keeping member and carrying the paired substrates for providing a strong self-holding property. The liquid crystal light modulation element in FIG. 9 is provided with the resin structures 4 located between the substrates 1 and 2. The resin structures 4 are equally spaced and arranged in accordance with a predetermined arrangement rule (e.g., grid arrangement), and each may have a columnar dot-like form having a circular, square or elliptic section.

For holding the liquid crystal material between the paired substrates, a known vacuum-supply method or a liquid crystal dropping method may be appropriately used depending on the intended size of the liquid crystal cell and cell gap. These liquid crystal material holding methods cause no difference in effect exerted on the direction of the helical axis of the liquid crystal with respect to the substrate normal.

The seal member may be thermosetting or photo-setting adhesive such as epoxy resin or acrylic resin.

For driving the liquid crystal light modulation element, it is desired to use a combination of high and low voltages of each having a square waveform. In this case, the planar state of the cholesteric liquid crystal can be achieved by suddenly turning off the voltage in the homeotropic state where all the liquid crystal molecules are orientated in the electric field direction. The focal conic state can be obtained by applying a low voltage pulse to the planar state, or applying a low voltage pulse immediately after the homeotropic state.

A plurality of cholesteric liquid crystal light modulation elements each having the above structures and the above characteristics but having different selective reflection wavelengths may be stacked to provide the multicolor display element of the reflection type. In particular, the selective reflection wavelengths for the red (R), green (G) and blue (B) may be employed, whereby the full-color display can be achieved.

Figure 21:
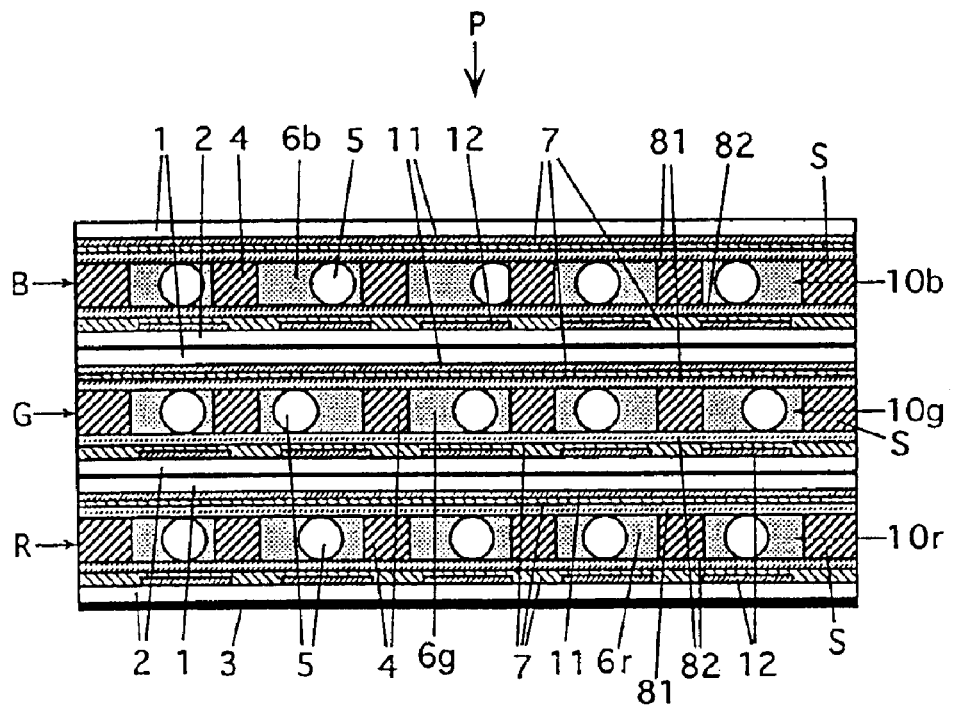
FIG. 21 is a schematic cross section of a multilayer liquid crystal light modulation element formed of three liquid crystal light modulation elements performing display in blue, red and green and layered in this order.

FIG. 21 is a schematic cross section of a multilayer liquid crystal light modulation element, in which liquid crystal light modulation elements for display in blue, green and red are stacked or layered in this order. In the respective liquid crystal light modulation elements of the multilayer liquid crystal light modulation element shown in FIG. 21 is the substantially same as that shown in FIG. 9, and portions having the substantially same structures and the substantially same functions bear the same reference numbers, respectively.

In each of the liquid crystal light modulation elements B, G and R in the multilayer element shown in FIG. 21, a liquid crystal layer 10b, 10g or 10r for display in blue, green or red is held between the paired substrates 1 and 2. The liquid crystal layers 10b, 10g and 10r contain liquid crystal materials 6b, 6g and 6r exhibiting a cholesteric phase at a room temperature and having the peaks of the selective reflection wavelengths in the visible wavelength range, respectively.

A visible light absorber layer is arranged on the outer surface (rear surface) of the substrate remote from the element observation side P (light incident side), if necessary. In the example shown in FIG. 21, the visible light absorber layer 3 is arranged on the outer surface (rear surface) of the substrate 2 in the liquid crystal light modulation element R.

In the multilayer liquid crystal light modulation element shown in FIG. 21, a predetermined voltage is applied to switch the liquid crystal 6b, 6g and 6r between the planar state (selective reflection state) and the focal conic state.

In the liquid crystal light modulation element shown in FIG. 21 and other liquid crystal light modulation elements, the neighboring liquid crystal layers may employ a common substrate between them.

Figure 22:
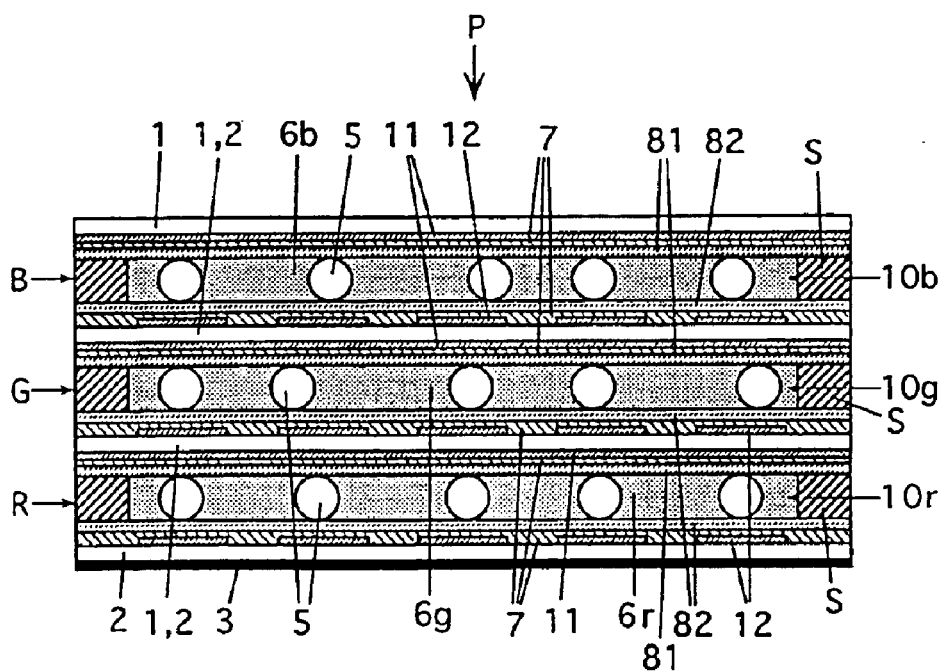
FIG. 22 shows the multilayer liquid crystal light modulation element shown in FIG. 21, and particularly a state where neighboring liquid crystal display elements have common substrates.

FIG. 22 shows common substrates each forming the substrate 1 (and 2) located between neighboring liquid crystal light modulation elements B and G, or between G and R in the multilayer liquid crystal light modulation element in FIG. 21.

In the multilayer liquid crystal light modulation element, it is important for achieving high color purity to reduce the scattering components of the light passing through each cell (liquid crystal light modulation element) in an appropriate manner. As described above, the light transmittance of the cell can be improved by reducing the inclination (angle with respect to the substrate normal) of the helical axis of the liquid crystal. However, excessively small inclination of the helical axis lowers the view angle characteristics, as already described. Therefore, such a structure is employed that the inclination of the helical axis is relatively small on one side, and the inclination of the helical axis is relatively large on the other side. Thereby, the liquid crystal light modulation element of the reflection type can achieve appropriate brightness, contrast and color purity.

In the multilayer liquid crystal light modulation element, the inclination (angle with respect to the substrate normal) of the helical axis of the liquid crystal is controlled in each liquid crystal light modulation element layer. Thereby, characteristics having further improved viewability can be achieved. Thus, the cholesteric liquid crystal domain can scatter the light to a certain extent when it is in the planar state. Therefore, the helical axis inclination of the liquid crystal in the liquid crystal light modulation element layer remote from the element observation side is relatively reduced, and the scattering effect of the liquid crystal light modulation element on the upper layer is used to scatter the light, whereby both the high color purity and the high light reflectance can be achieved.

Accordingly, in the structure including the blue, green and red liquid crystal light modulation elements, which are stacked in this order from the element observation side, the blue liquid crystal element having the largest helical axis inclination of the liquid crystal, and the red liquid crystal element has the smallest helical axis inclination of the liquid crystal. For example, the following relationships are desirable for improving the viewability of the liquid crystal light modulation elements. In any neighboring liquid crystal optical modulation elements, the inclination (angle with respect to the substrate normal) of the cholesteric helical axis of the liquid crystal in the liquid crystal domain of the pixel region near the substrate on the element observation side in the liquid crystal light modulation element on the element observation side is larger than the inclination (angle with respect to the substrate normal) of the cholesteric helical axis of the liquid crystal in the liquid crystal domain of the pixel region near the substrate on the element observation side in the liquid crystal light modulation element on the side remote from the element observation side. Also, the inclination (angle with respect to the substrate normal) of the cholesteric helical axis of the liquid crystal in the liquid crystal domain of the pixel region near the substrate remote from the element observation side in the liquid crystal light modulation element on the element observation side is larger than the inclination (angle with respect to the substrate normal) of the cholesteric helical axis of the liquid crystal in the liquid crystal domain of the pixel region near the substrate on the side remote from the element observation side in the liquid crystal light modulation element on the side remote from the element observation side.

Between the neighboring liquid crystal light modulation elements, a difference may be caused in the helical axis inclination for further improving the above effect. For example, in any neighboring liquid crystal optical modulation elements, the inclination (inclination with respect to the substrate normal) of the cholesteric helical axis of the liquid crystal in the liquid crystal domain of the pixel region near the substrate on the element observation side in the liquid crystal light modulation element on the element observation side may be different from the inclination (inclination with respect to the substrate normal) of the cholesteric helical axis of the liquid crystal in the liquid crystal domain of the pixel region near the substrate on the element observation side in the liquid crystal light modulation element on the side remote from the element observation side. Also, the inclination (inclination with respect to the substrate normal) of the cholesteric helical axis of the liquid crystal in the liquid crystal domain of the pixel region near the substrate remote from the element observation side in the liquid crystal light modulation element on the element observation side may be different from the inclination (inclination with respect to the substrate normal) of the cholesteric helical axis of the liquid crystal in the liquid crystal domain of the pixel region near the substrate on the side remote from the element observation side in the liquid crystal light modulation element on the side remote from the element observation side.

In the multilayer liquid crystal light modulation elements shown in FIGS. 21 and 22, the neighboring liquid crystal light modulation elements B and G (G and R) are in such a relationship that the angle with respect to the substrate normal of the cholesteric helical axis of the liquid crystal 6b (6g) in the liquid crystal domain of the pixel region X in the substrate vicinity 1a (see FIGS. 11(A) and 11(B)) on the element observation side P in the liquid crystal light modulation element B (G) on the element observation side P is larger than the angle with respect to the substrate normal of the cholesteric helical axis of the liquid crystal 6g (6r) in the liquid crystal domain of the pixel region X in the substrate vicinity 1a on the element observation side P in the liquid crystal light modulation element G (R) on the side remote from the element observation side P, and the angle with respect to the substrate normal of the cholesteric helical axis of the liquid crystal 6b (6g) in the liquid crystal domain of the pixel region X in the substrate vicinity 2a (see FIGS. 11(A) and 11(B)) on the side remote from the element observation side P in the liquid crystal light modulation element B (G) on the element observation side P is larger than the angle with respect to the substrate normal of the cholesteric helical axis of the liquid crystal 6g (6r) in the liquid crystal domain of the pixel region X in the substrate vicinity 2a on the side remote from the element observation side P in the liquid crystal light modulation element G (R) on the side remote from the element observation side P.

The neighboring liquid crystal light modulation elements B and G (G and R) are in such a relationship that the rubbing density of the rubbed orientation control layer in the liquid crystal light modulation element B (G) on the element observation side P is smaller than that of the orientation control layer, corresponding to the above control layer, in the liquid crystal light modulation element G (R) on the side remote from the element observation side P.

In the liquid crystal light modulation element (multilayer liquid crystal light modulation element) described above, the state (1) already described may be attained in each liquid crystal domain at the pixel region X of each of the substrate vicinities 1a and 2a opposed to the opposite substrates 1 and 2 in the liquid crystal layer 10 (10b, 10g or 10r) in the selective reflection state. In this case (1), the mixed state of the polydomain(s) and monodomain(s) is attained in the liquid crystal domain at the pixel region X of at least one (2a) of the substrate vicinities 1a and 2a opposed to the opposite substrates 1 and 2 in the liquid crystal layer 10 (10b, 10g or 10r) in the selective reflection state. Also, in the case (2) already described, each liquid crystal domain at the pixel region X of the opposite substrate vicinities 1a and 2a opposed to the opposite substrates 1 and 2 has the polydomain structure, and the cholesteric helical axes 61 and 62 of the liquid crystal in the liquid crystal domains at the pixel regions X in the substrate vicinities 1a and 2a define different angles θ1 and θ2 with respect to the substrate normal H, respectively. Therefore, good images with high brightness, contrast and color purity can be displayed. Further, the displayed state with high brightness, contrast and color purity can be maintained for a long term when a voltage is not applied. In other words, the characteristics achieving the high reflection intensity, high contrast and high color purity in the planar state can be achieved together with the bistability.

The region providing a different orientation regulating force is formed in the orientation film (orientation control layer) for regularly orientating the helical axes of the liquid crystal molecules in the focal conic state in a plane substantially parallel to the substrate surface. Therefore, the light transmittance of the liquid crystal layer in the focal conic state is improved, and the contrast can be improved.

Description will now be given on experiments, which were performed for evaluating the performances of the liquid crystal optical modulation elements, together with comparative examples. Naturally, the invention is not restricted to these experimental examples.

In the respective experimental examples and comparative experimental examples, liquid crystal elements having the substrate, which are processed under different conditions (material of orientation control films, rubbing processing, optical orientation processing and others) were produced, and evaluation was made on the visibility (reflectance and color purity on the element observation side) at the front of the element observation side, memory characteristics (bistability) and view angle characteristics (reflectances at predetermined observation angles).

In each of the respective experimental examples and comparative examples, the measurement of the inclination (angle with respect to the substrate surface) of the helical axis of the liquid crystal in the liquid crystal light modulation element was performed in such a manner that cell having opposite substrates provided with orientation control films of the same structure was employed, the cell filled with the liquid crystal was set to the planar state by applying a predetermined high voltage pulse to the cell, and the light transmittance of the cell in the planar state was measured. In this measurement, the selective reflection peak wavelength was read out, the average inclination of the helical axis of the liquid crystal was calculated from the foregoing formula (2). (Experimental Conditions)

Each liquid crystal layer of the single layer cell was 5 μm in thickness.

Driving was performed by pulse voltage driving using the following pulse.

A planar state was selected with a pulse of 3 ms and 80 V–60 V.

A focal conic state was selected with a pulse of 3 ms and 40 V.

Evaluation of the stability of the memory characteristics was performed by making a comparison between a reflection characteristic value (Y value) determined immediately after application of the pulse voltage and a reflection characteristic value (Y value) determined after leaving the cell for one month.

Evaluation of the view angle characteristics was performed by measuring the peak reflectance while emitting the light at an angle of 30° with respect to the normal line on the element observation side and changing the detection angle with respect to the normal line on the element observation side.

The rubbing processing was performed by the rubbing device, which was provided with a rubbing roller having a rubbing cloth of a predetermined brush height. The substrate was moved at a predetermined speed in a predetermined direction, and the rubbing roller rotating in a predetermined direction at a predetermined rotation speed was brought into contact with the substrate uppermost surface so that the substrate surface was rubbed.

The rubbing density was determined in accordance with the foregoing formula (1).

In each of the experimental examples and comparative examples, the light reflectance, color purity and reflection characteristics value (Y-value) were measured with a reflective spectrocolorimeter CM-3700d (manufactured by Minolta Co., Ltd.).

EXPERIMENTAL EXAMPLE 1

In this experiment, the liquid crystal display element was employed, in which the inclination (angle of the helical axis of the liquid crystal in the selective reflection state with respect to the substrate normal) of the helical axis of the liquid crystal was different between the upper and lower substrates (i.e., the upper and lower substrates were provided with orientation control films of different materials, respectively).

<Orientation Control Film on the Observation Side>
  Orientation control film material:
    polyimide
    JALS-1024-R (manufacture by JSR Corp.)
    non-rubbing
  Inclination of helical axis (average):
    about 18°
  Deposition conditions:
    flexo print of orientation control film material
    preliminary baking with 80° C. for 2 minutes
    baking with 140° C. for 60 minutes
  Thickness of orientation control film 500 Å

<Orientation Control Film on the Non-Observation Side Opposite to the Observation Side>
  Orientation control film material:
    polyimide
    AL1454 (manufacture by JSR Corp.)
    non-rubbing
  Inclination of helical axis (average):
    about 7°
  Deposition conditions:
    flexo print of orientation control film material
    preliminary baking with 80° C. for 2 minutes
    baking with 140° C. for 60 minutes
  Thickness of orientation control film 500 Å

<Liquid Crystal>
  Liquid crystal material:
    nematic liquid crystal E31-LV manufactured by Merk & Co. and chiral agent S-811 (24.5 wt %) manufactured by Merk & Co.
  Selective reflection peak wavelength: λ=550 nm
  By observation with a polarization microscope, it was confirmed that all the liquid crystal near the orientation control films on the substrates took polydomain state in the planar state.

In this experiment, the liquid crystal display element provided the reflectance of 35% and the color purity of 75% on the element observation side, and exhibited high visibility at the front on the element observation side.

Figure 23:
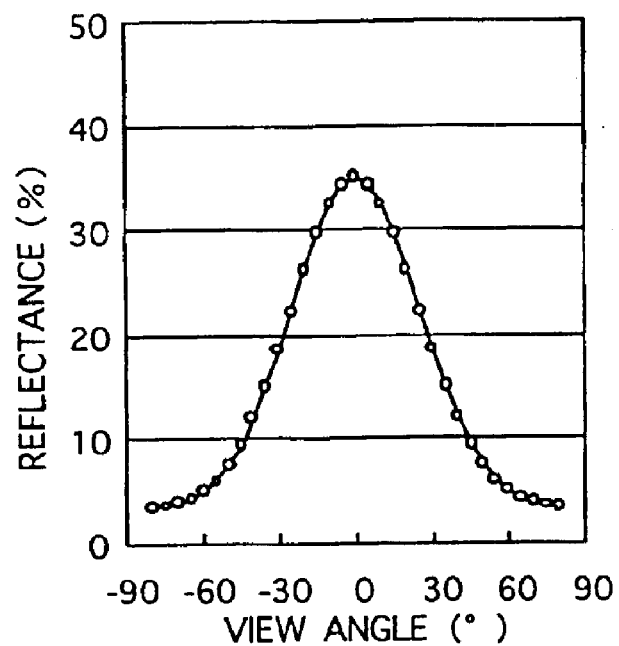
FIG. 23 shows view angle characteristics of a liquid crystal light modulation element obtained in an experimental example 1.

The view angle characteristics of this liquid crystal display element are shown in FIG. 23. As shown in FIG. 23, the reflectance at the observation angle of 30° was 50% or more of the reflectance at the observation angle of 0° so that it can be considered that the view angle characteristics were in a sufficiently practicable range.

When the focal conic state was attained by application of the pulse voltage, the Y-value of 1.2 was obtained immediately after the voltage application, and the Y-value of 1.3 was obtained after one month. Thus, the liquid crystal display element of this experiment could suppress the change in display characteristics, and had the good memory characteristics.

EXPERIMENTAL EXAMPLE 2

This experiment was performed with another example of the liquid crystal display element of a single layer, in which the inclination (angle of the helical axis of the liquid crystal in the selective reflection state with respect to the substrate normal) of the helical axis of the liquid crystal was different between the upper and lower substrates (i.e., the rubbing was effected on the orientation control film of only one of the substrates).

<Orientation Control Film on the Observation Side>
  Orientation control film material:
    polyimide
    JALS-1024-R (manufacture by JSR Corp.)
    non-rubbing
  Inclination of helical axis (average):
    about 18°
  Deposition conditions:
    flexo print of orientation control film material
    preliminary baking with 80° C. for 2 minutes
    baking with 140° C. for 60 minutes
  Thickness of orientation control film 500 Å
<Orientation Control Film on the Non-Observation Side>
  Orientation control film material:
    polyimide
    JALS-1024-R (manufacture by JSR Corp.)
    Rubbing was effect on the entire area.
  Inclination of helical axis (average):
    about 4°
  Deposition conditions:
    flexo print of orientation control film material
    preliminary baking with 80° C. for 2 minutes
    baking with 140° C. for 60 minutes
  Thickness of orientation control film 500 Å
  Rubbing conditions
    pressed brush height (pressed amount): 0.4 mm
    roller radius: 75 mm
    roller rotation speed: 0
    substrate moving speed: 30 mm/sec
    rubbing times: 5
    rubbing density: 5
<Liquid Crystal>
  Liquid crystal material:
    nematic liquid crystal E31-LV manufactured by Merk & Co. and chiral agent S-811 (24.5 wt %) manufactured by Merk & Co.
  Selective reflection peak wavelength: λ=550 nm
  By observation with a polarization microscope, it was confirmed that all the liquid crystal near the orientation control film on the observation side was in the polydomain state in the planar state, and the liquid crystal near the orientation control film on the non-observation side was in the mixed state of the polydomain state and monodomain state.

In this experiment, the liquid crystal display element provided the reflectance of 40% and the color purity of 78% on the element observation side, and exhibited high visibility at the front on the element observation side.

Figure 24:
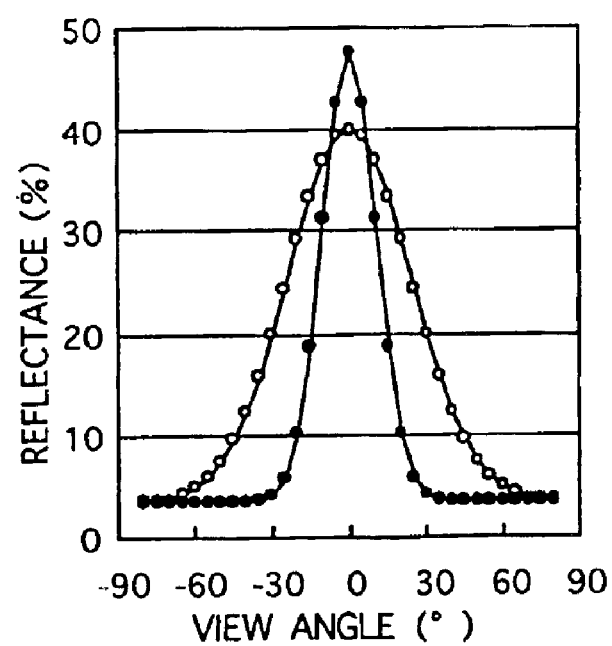
FIG. 24 shows view angle characteristics of liquid crystal light modulation elements obtained in an experimental example 2 and a comparative experimental example 1.

The view angle characteristics of this liquid crystal display element are plotted with "○" in FIG. 24. As shown in FIG. 24, the reflectance at the observation angle of 30° was 50% or more of the reflectance at the observation angle of 0° so that it can be considered that the view angle characteristics were in a sufficiently practicable range.

When the focal conic state was attained by application of the pulse voltage, the Y-value of 1.3 was obtained immediately after the voltage application, and the Y-value of 1.5 was obtained after one month. Thus, the liquid crystal display element of this experiment could suppress the change in display characteristics, and had the good memory characteristics.

COMPARATIVE EXPERIMENTAL EXAMPLE 1

This experiment differed from the experimental example 2 in that the rubbing density of the polyimide film on the non-observation side was increased so that the liquid crystal near this polyimide film entirely took the monodomain state when it was in the planar state. Also, the following conditions were different from those in the experimental example 2.

Other than the above is the same as the example 2.
  Rubbing Conditions
    roll rotation speed: 550 rpm
    rubbing times: 2
    rubbing density: about 290
    inclination of helical axis: about 0° on average By observation with a polarization microscope, it was confirmed that the liquid crystal near the orientation control film on the non-observation side took substantially entirely monodomain state in the planar state.

The view angle characteristics of this liquid crystal display element are plotted with solid circles in FIG. 24. As shown by solid circles in FIG. 24, the reflectance at the front was high, but the view angle characteristics were inferior to that of the liquid crystal element of the experimental example 2. It can also be seen that the reflectance with the observation angle of 30° decreased to about 10% of the reflectance with the observation angle of 0°.

When the focal conic state was attained by application of the pulse voltage, the Y-value was equal to 1.4 immediately after the voltage application, and was 6.7 after one month. Thus, the memory characteristics were deteriorated in the liquid crystal element of this experiment.

COMPARATIVE EXAMPLE 2

This experiment differed from the experiment 2 in that each of the upper and lower substrates of the liquid crystal element was not subjected to the rubbing.

Figure 25:
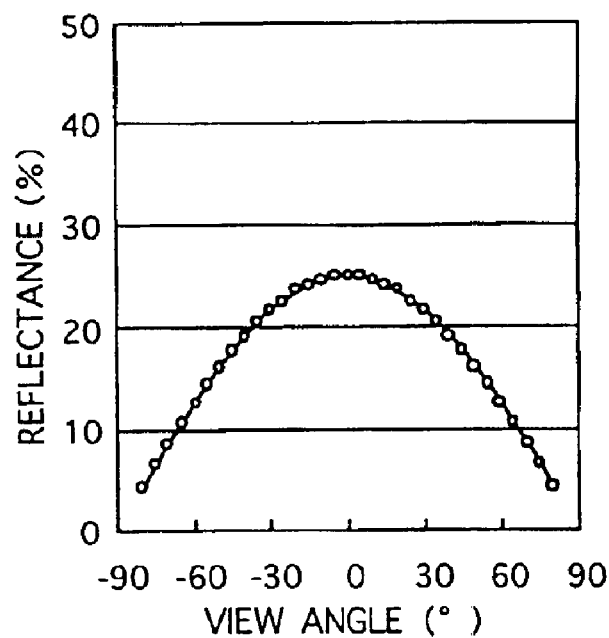
FIG. 25 shows view angle characteristics of a liquid crystal light modulation element obtained in a comparative experimental example 2.

FIG. 25 shows view angle characteristics of this liquid crystal element. As shown in FIG. 25, the view angle characteristics were sufficiently allowable, but the reflectance at the front of the element observation side was smaller by about 38% than that of the experimental example 2.

The Y-value was equal to 1.2 immediately after the voltage application and after one month, and no change occurred in the memory characteristics.

EXPERIMENTAL EXAMPLE 3

This experiment differs from the experimental example 2 in that the liquid crystal element was provided with the polyimide film having a relatively large rubbing density (equal to 10) on the non-observation side. The average inclination of the helical axis was about 4°.

By observation with a polarization microscope, it was confirmed that the liquid crystal near the orientation control film on the non-observation side was in the mixed state of the polydomain state and monodomain state in the planar state.

Figure 26:
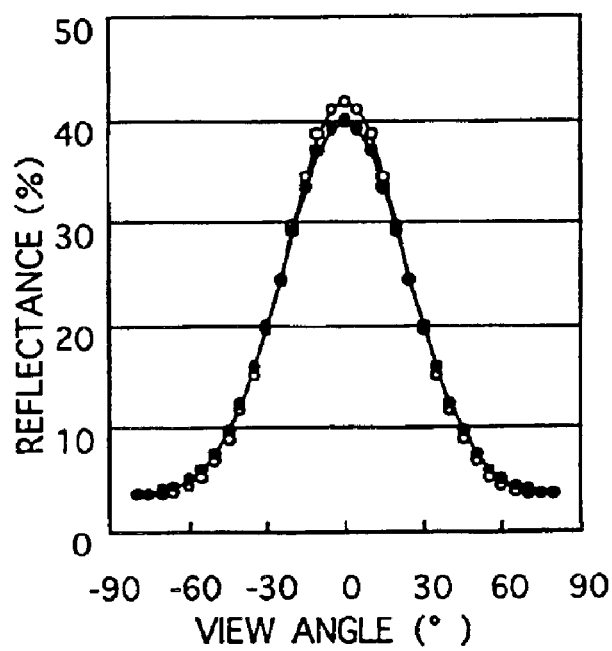
FIG. 26 shows view angle characteristics of liquid crystal light modulation elements obtained in an experimental example 3 and the experimental example 2.

The view angle characteristics of this liquid crystal element were plotted with "○" in FIG. 26. In FIG. 26, solid circles "●" represent the result of the experimental example 2. As can be seen from FIG. 26, the view angle characteristics similar to those of the experimental example 2 were obtained. Results similar to those of the experimental example 2 were also obtained with respect to the reflectance at the front, color purity, memory characteristics for a long term.

EXPERIMENTAL EXAMPLE 4

This experiment was performed with further another example of the liquid crystal display element of a single layer, in which the inclination (angle of the helical axis of the liquid crystal in the selective reflection state with respect to the substrate normal) of the helical axis of the liquid crystal was different between the upper and lower substrates (i.e., the optical orientation processing is effected on the orientation control film of only one of the substrates).

<Orientation Control Film on the Observation Side>

Orientation control film material:
  polyimide
  TT-054 (Hitachi Chemical Co., Ltd.)
  non-rubbing
Inclination of helical axis (average):
  about 16°
Deposition conditions:
  flexo print of orientation control film material
  preliminary baking with 100° C. for 1 minutes
  baking with 230° C. for 30 minutes
Thickness of orientation control film 500 Å

<Orientation Control Film on the Non-Observation Side>

Orientation control film material:
  polyimide
  TT-054 (Hitachi Chemical Co., Ltd.)
  Optical orientation was effected.
Inclination of helical axis (average):
  about 6°
Deposition conditions:
  flexo print of orientation control film material
  preliminary baking with 100° C. for 1 minutes
  baking with 230° C. for 30 minutes Thickness of orientation control film 500 Å
UV irradiation conditions
  5 J/cm$^2$
  incident angle 15°
  substrate temperature 23° C.
  The whole substrate surface was irradiated through a polarizing plate.

<Liquid Crystal>

Liquid crystal material:
  nematic liquid crystal E31-LV manufactured by Merk & Co. and chiral agent S-811 (24.5 wt %) manufactured by Merk & Co.
Selective reflection peak wavelength: $\lambda$=550 nm By observation with a polarization microscope, it was confirmed that the liquid crystal near the orientation control film on the observation side took entirely polydomain state in the planar state, and the liquid crystal near the orientation control film on the non-observation side was in the mixed state of the polydomain state and monodomain state.

In this experiment, the liquid crystal display element provided the reflectance of 38% and the color purity of 72% on the element observation side, and exhibited high visibility at the front on the element observation side.

Although the view angle characteristics of this liquid crystal display element are not shown in the figure, the reflectance at the observation angle of 30° was 20%, and was 50% or more of the reflectance at the observation angle of 0° so that it can be considered that the view angle characteristics were in a sufficiently practicable range.

When the focal conic state was attained by application of the pulse voltage, the Y-value of 1.3 was obtained immediately after the voltage application, and the Y-value of 1.4 was obtained after one month. Thus, the liquid crystal display element of this experiment could suppress the change in display characteristics, and had the good memory characteristics.

EXPERIMENTAL EXAMPLE 5

This experiment was performed with further another example of the liquid crystal display element of a single layer, in which the inclination (angle of the helical axis of the liquid crystal in the selective reflection state with respect to the substrate normal) of the helical axis of the liquid crystal was different between the upper and lower substrates (i.e., the optical orientation processing was effected on the orientation control films of the opposite substrates with different amounts of exposure light, respectively).

<Orientation Control Film on the Observation Side>

Orientation control film material:
  polyimide
  TT-054 (Hitachi Chemical Co., Ltd.)
  Optical orientation was effected.
Inclination of helical axis (average):
  about 12°
Deposition conditions:
  flexo print of orientation control film material
  preliminary baking with 100° C. for 1 minutes
  baking with 230° C. for 30 minutes
Thickness of orientation control film 500 Å
Irradiation conditions
  2 J/cm$^2$
  incident angle 15°
  substrate temperature 23° C.
  The whole substrate surface was irradiated through a polarizing plate.

<Orientation Control Film on the Non-Observation Side>

Orientation control film material:
polyimide
TT-054 (Hitachi Chemical Co., Ltd.)
Optical orientation was effected.

Inclination of helical axis (average):
about 6°

Deposition conditions:
flexo print of orientation control film material
preliminary baking with 100° C. for 1 minutes
baking with 230° C. for 30 minutes Thickness of orientation control film 500 Å

Irradiation conditions
5 J/cm$^2$
incident angle 15°
substrate temperature 23° C.
The whole substrate surface is irradiated through polarizing plate.

<Liquid Crystal>

Liquid crystal material:
nematic liquid crystal E31-LV manufactured by Merk & Co. and chiral agent S-811 (24.5 wt %) manufactured by Merk & Co.

Selective reflection peak wavelength: λ=550 nm

By observation with a polarization microscope, it was confirmed that the liquid crystal near each orientation control film was in the mixed state of the polydomain state and monodomain state.

In this experiment, the liquid crystal display element provided the reflectance of 41% on the element observation side and the color purity of 80%, and exhibited high visibility at the front on the element observation side.

Although the view angle characteristics of this liquid crystal display element is not shown in the figure, the reflectance at the observation angle of 30° was 21%, and was 50% or more of the reflectance at the observation angle of 0° so that it can be considered that the view angle characteristics were in a sufficiently practicable range.

When the focal conic state was attained by application of the pulse voltage, the Y-value of 1.2 was obtained immediately after the voltage application, and the Y-value of 1.4 was obtained after one month. Thus, the liquid crystal display element of this experiment could suppress the change in display characteristics, and had the good memory characteristics.

EXPERIMENTAL EXAMPLE 6

This experiment was performed with further another example of the liquid crystal display element of a single layer, in which the inclination (angle of the helical axis of the liquid crystal in the selective reflection state with respect to the substrate normal) of the helical axis of the liquid crystal was different between the upper and lower substrates (i.e., the optical orientation processing was effected on the orientation control films of the opposite substrates with different temperatures of substrates during the exposure, respectively).

<Orientation Control Film on the Observation Side>

Orientation control film material:
polyimide
TT-054 (Hitachi Chemical Co., Ltd.)
Optical orientation was effected.

Inclination of helical axis (average):
about 12°

Deposition conditions:
flexo print of orientation control film material
preliminary baking with 100° C. for 1 minutes
baking with 230° C. for 30 minutes Thickness of orientation control film 500 Å

Irradiation conditions
2 J/cm$^2$
incident angle 15°
substrate temperature 23° C.
The whole substrate surface was irradiated through a polarizing plate.

<Orientation Control Film on the Non-Observation Side>

Orientation control film material:
polyimide
TT-054 (Hitachi Chemical Co., Ltd.)
Optical orientation was effect.

Inclination of helical axis (average):
about 7°

Deposition conditions:
flexo print of orientation control film material
preliminary baking with 100° C. for 1 minutes
baking with 230° C. for 30 minutes Thickness of orientation control film
500 Å

Irradiation conditions
2 J/cm$^2$
incident angle 15°
substrate temperature 120° C.
The whole substrate surface is irradiated polarizing plate.

<Liquid Crystal>

Liquid crystal material:
nematic liquid crystal E31-LV manufactured by Merk & Co. and chiral agent S-811 (24.5 wt %) manufactured by Merk & Co.

Selective reflection peak wavelength: λ=550 nm

By observation with a polarization microscope, it was confirmed that the liquid crystal near each orientation control film was in the mixed state of the polydomain state and monodomain state.

In this experiment, the liquid crystal display element provided the reflectance of 40% on the element observation side and the color purity of 77%, and exhibited high visibility at the front on the element observation side.

Although the view angle characteristics of this liquid crystal display element is not shown in the figure, the reflectance at the observation angle of 30° was 21%, and was 50% or more of the reflectance at the observation angle of 0° so that it can be considered that the view angle characteristics were in a sufficiently practicable range.

When the focal conic state was attained by application of the pulse voltage, the Y-value of 1.3 was obtained immediately after the voltage application, and the Y-value of 1.5 was obtained after one month. Thus, the liquid crystal display element of this experiment could suppress the change in display characteristics, and had the good memory characteristics.

EXPERIMENTAL EXAMPLE 7

This experiment was performed with still another example of the liquid crystal display element of a single layer, in which the inclination (angle of the helical axis of the liquid crystal in the selective reflection state with respect to the substrate normal) of the helical axis of the liquid crystal was different between the upper and lower substrates (i.e., the partial rubbing was effected on the orientation control film of only one of the substrate).

<Orientation Control Film on the Observation Side>
Orientation control film material:
polyimide
JALS-1024-R (manufacture by JSR Corp.)
non-rubbing
Inclination of helical axis (average):
about 18°
Deposition conditions:
flexo print of orientation control film material
preliminary baking with 80° C. for 2 minutes
baking with 140° C. for 60 minutes
Thickness of orientation control film 500 Å

<Orientation Control Film on the Non-Observation Side>
Orientation control film material:
polyimide
JALS-1024-R (manufacture by JSR Corp.)
Partial rubbing was effect with the following resist pattern.
Inclination of helical axis (average):
about 7°
Deposition conditions:
flexo print of orientation control film material
preliminary baking with 80° C. for 2 minutes
baking with 140° C. for 60 minutes
Thickness of orientation control film
500 Å
Resist pattern
Photomask: non-opening/opening=7 μm/3 μm (pitch 10 μm)
Spin coating of OFPR-800 (Tokyo Ohka Kogyo Co., Ltd.)
Prebake: 80° C. for 15 minutes, clean oven
Exposure: 30 mJ/cm² with UV exposing device
Development: SD-1 (developer manufactured by Tokuyama Corp.)
Rinsing: flowing ultrapure water
Post-bake: 120° C. for 15 minutes
Etching: iron-salt liquid D (manufactured by Hayashi Pure Chemical Ind., Ltd.) 20 minutes
Resist peeling: isopropyl alcohol (IPA: manufactured by Tokuyama Corp.), peeling time=2 minutes
Rubbing conditions
pressed brush height (pressed amount): 0.4 mm
roller radius: 75 mm
roller rotation speed: 900 rpm
substrate moving speed: 30 mm/sec
rubbing times: 2
rubbing density: about 470

<Liquid Crystal>
Liquid crystal material:
nematic liquid crystal E31-LV manufactured by Merk & Co. and chiral agent S-811 (24.5 wt %) manufactured by Merk & Co.
Selective reflection peak wavelength: λ=550 nm By observation with a polarization microscope, it was confirmed that the liquid crystal near the orientation control film on the observation side was entirely in the polydomain state in the planar state, and the liquid crystal near the orientation control film on the non-observation side was in the mixed state of the polydomain state and monodomain state.

In this experiment, the liquid crystal display element provided the reflectance of 39% on the element observation side and the color purity of 72%, and exhibited high visibility at the front on the element observation side.

The view angle characteristics of this liquid crystal display element is not shown in the figure, but the reflectance at the observation angle of 30° was 21%, and was 50% or more of the reflectance at the observation angle of 0° so that it can be considered that the view angle characteristics were in a sufficiently practicable range.

When the focal conic state was attained by application of the pulse voltage, the Y-value of 1.3 was obtained immediately after the voltage application, and the Y-value of 1.4 was obtained after one month. Thus, the liquid crystal display element of this experiment could suppress the change in display characteristics, and had the good memory characteristics. Further, an extremely high transmittance of about 80% was obtained in the focal conic state.

EXPERIMENTAL EXAMPLE 8

This experiment was performed with an example of the multilayer liquid crystal display element formed of a plurality of single-layer liquid crystal display elements each configured such that the inclination (angle of the helical axis of the liquid crystal in the selective reflection state with respect to the substrate normal) of the helical axis of the liquid crystal was different between the upper and lower substrates, and thus an example of the multilayer liquid crystal display element, in which the respective elements were different from each other in angle of the helical axis of the liquid crystal in the selective reflection state with respect to the substrate normal.

<Substrate>
Substrate material: polycarbonate substrate with ITO
Thickness: 0.1 mm <Liquid Crystal>
The peak wavelengths of the liquid crystal compositions in the selective reflection were adjusted by changing the amount of chiral material added to the nematic liquid crystal.
Red display (R) element: adjusted to have the selective reflection peak wavelength λ of 680 nm
cell gap=9 μm
Green display (G) element: adjusted to have the selective reflection peak wavelength λ of 550 nm
cell gap=5 μm
Blue display (B) element: adjusted to have the selective reflection peak wavelength λ of 480 nm
cell gap=5 μm A black light absorber layer was arranged on the lowest surface (bottom surface of the substrate of R element) of the stacked structure of the liquid crystal optical modulation elements R, G and B.

In each of the layers of the liquid crystal elements, the orientation control films were made of the same combination of the materials as that of the example 1, and each element was not subjected to the rubbing, and was configured such that the inclination of the helical axis on the observation side is larger than the inclination of the helical axis on the non-observation side. The inclination angle (angle of the helical axis of the liquid crystal in the selective reflection state with respect to the substrate normal) of the helical axis of the liquid crystal depends on the helical pitch of the cholesteric liquid crystal, and decreases with increase in helical pitch. The inclination angles of the liquid crystal display elements of the R, G and B layers were measured as follows:
R liquid crystal display element:
16° on observation side and 5° on non-observation side G liquid crystal display element:
  18° on observation side and 7° on non-observation side
B liquid crystal display element:
  20° on observation side and 8° on non-observation side As compared with a multilayer liquid crystal display element formed of liquid crystal display elements each configured such that substantially no difference is present in inclination angle (equal to about 18–20°) between the upper and lower substrates, the multilayer liquid crystal display element formed of the liquid crystal display elements, each of which is configured such that a difference is present in inclination angle between the upper and lower substrates, can improve the color purity of each of the liquid crystal display element layer, and can improve the transmittance of the element. Therefore, the color purity is further improved in the multilayer liquid crystal display element formed of the liquid crystal display elements each having a difference in inclination angle between the upper and lower substrates.

Figure 27:
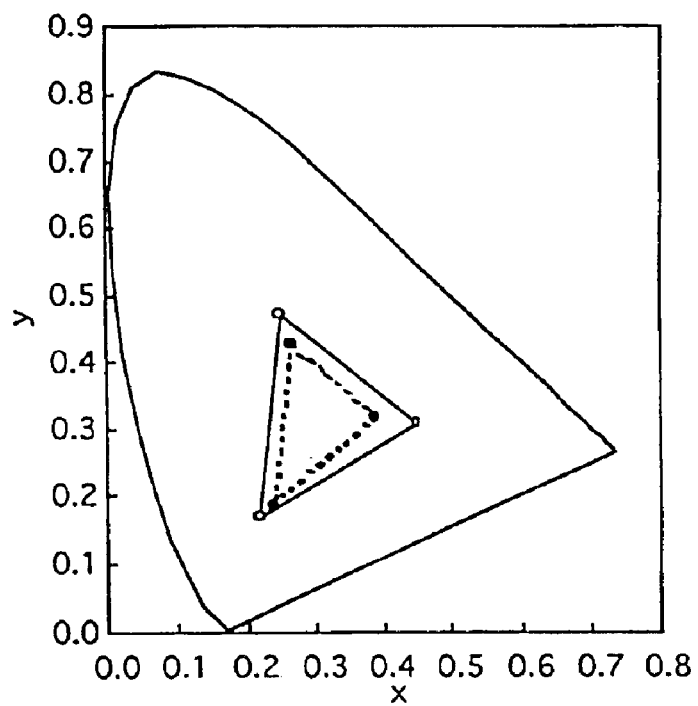
FIG. 27 is chromaticity diagrams of images displayed by a liquid crystal display element obtained in an experimental example 8 and a comparative example of a liquid crystal display element having three layers of liquid crystal display elements each having opposite substrates not subjected to the rubbing.

FIG. 27 shows chromaticity diagrams of displayed images of the multilayer liquid crystal display element obtained in this experimental example and a multilayer liquid crystal display element (comparative example) having three layers of liquid crystal display elements each having opposite substrates made of the same material (JALS-1024-R manufactured by JSR Corp.) and not subjected to the rubbing. In FIG. 27, solid line represents the chromaticity of the multilayer liquid crystal display element of this experimental example, and dotted line represents the chromaticity of the liquid crystal display element of the comparative example. It can be seen from FIG. 27 that the multilayer liquid crystal display element of this experimental example can provide a wider expressible color range.

EXPERIMENTAL EXAMPLE 9

This example was performed with another example of the multilayer liquid crystal display element including liquid crystal display elements each configured such that a difference was present in rubbing density between the orientation control films.

<Substrate>

Substrate material: polycarbonate substrate with ITO

Thickness: 0.1 mm

<Liquid Crystal>

The peak wavelengths of the liquid crystal compositions in the selective reflection were adjusted by changing the amount of chiral material added to the nematic liquid crystal.

Red display (R) element: adjusted to have the selective reflection peak wavelength λ of 680 nm
  cell gap=9 μm Green display (G) element: adjusted to have the selective reflection peak wavelength λ of 550 nm
  cell gap=5 μm Blue display (B) element: adjusted to have the selective reflection peak wavelength λ of 480 nm
  cell gap=5 μm A black light absorber layer was arranged on the lowest surface (bottom surface of the substrate of R element) of the stacked structure of the liquid crystal optical modulation elements R, G and B.

<Orientation Control Film> polyimide

JALS-1024-R (manufactured by JSR Corp.)

In each layer of the liquid crystal display element, the orientation control films for the upper and lower substrates were made of the same material, In each layer of the liquid crystal display element, the orientation control film on the observation side was not subjected to the rubbing, and the orientation control film on the non-observation side was subjected to the rubbing. The rubbing density was controlled based on the rubbing times (N in the foregoing formula (1)). The rubbing times of the orientation control films on the non-observation side in the R, G and B liquid crystal display elements were set to 10, 5 and 3, respectively. The inclination angles (angles of the helical axes of the liquid crystal in the selective reflection state with respect to the substrate normal) of the liquid crystal display elements of the R, G and B layers were measured as follows:

R liquid crystal display element:
  16° on observation side and 3° on non-observation side
G liquid crystal display element:
  18° on observation side and 4° on non-observation side
B liquid crystal display element:
  20° on observation side and 6° on non-observation side As compared with a multilayer liquid crystal display element formed of liquid crystal display elements each configured such that substantially no difference is present in inclination angle (equal to about 18–20°) between the upper and lower substrates, the multilayer liquid crystal display element formed of the liquid crystal display elements, each of which is configured such that a difference is present in inclination angle between the upper and lower substrates, can improve the color purity of the liquid crystal display element of each layer liquid, and can improve the transmittance of the element. Therefore, the color purity is further improved in the multilayer liquid crystal display element formed of the liquid crystal display elements each having a difference in inclination angle between the upper and lower substrates.

Figure 28:
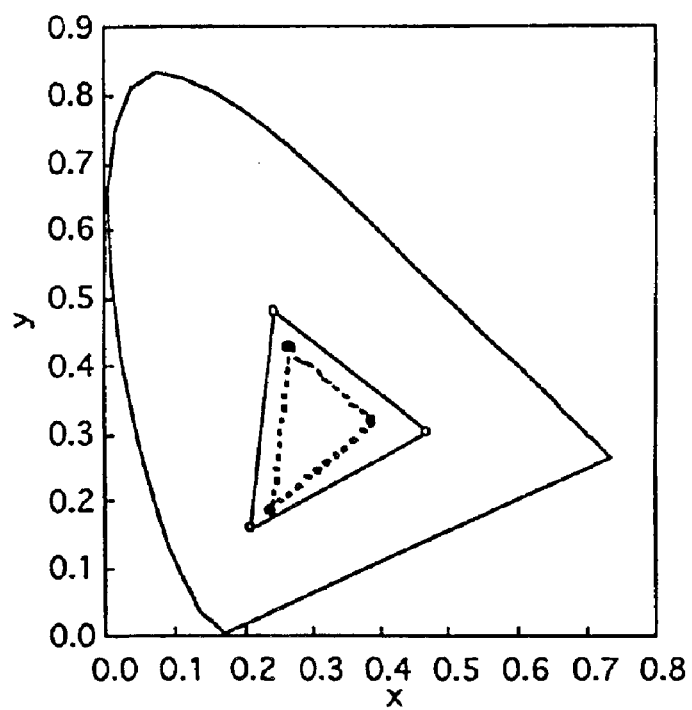
FIG. 28 is a chromaticity diagram of an image displayed by a liquid crystal display element obtained in an experimental example 9.

FIG. 28 shows a chromaticity diagram of a displayed image of the multilayer liquid crystal display element obtained in this experimental example. Similarly to FIG. 27, it can be seen from FIG. 28 that the multilayer liquid crystal display element of this experimental example can provide a wider expressible color range. In FIG. 28, dotted line represents the same chromaticity (dotted line) as shown in FIG. 27.

Description will now be given on experimental examples performed with liquid crystal display elements, each of which was provided with regions having different orientation regulating force for regularly orientating the helical axes of the liquid crystal molecules in the focal conic state in a plane substantially parallel to the substrate surface.

EXPERIMENTAL EXAMPLE 10

In this example, rubbing processing was effected on orientation control films.

Two glass substrates with ITO (manufactured by Central Glass Co., Ltd.) were used. Photolithography was effected on the ITO of each substrate to pattern it into belt-like forms having an electrode width of 300 μm and a pitch of 350 μm.

Then, an insulating material was applied to the ITO-surface of each substrate, and was baked to form the insulating film. Thereafter, a polyimide material AL-8044 (manufactured by JSR Corp.) was applied by flexo printing, and was preliminarily baked at 80° C. for two minutes. Further, baking was performed at 160° C. for 60 minutes so that the orientation control film was formed.

Then, positive resist OFPR-800 (manufactured by Tokyo Ohka Kogyo Co., Ltd.) was applied by spin coating on orientation control film on one of the substrates, and was pre-baked at 80° C. for 15 minutes in a clean oven.

Using a photomask, which is provided with belt-like openings of 4 μm in width at a pitch of 10 μm, exposure was performed at 30 mJ/cm² by a UV exposing device. Then, development was performed with developer liquid (SD-1 manufactured by Tokuyama Corp.), and rising was performed with flowing ultrapure water for removing unnecessary portions. Thereafter, post-baking was performed at 120° C. for 15 minutes. In this manner, the mask layer was formed for the next rubbing processing.

Then, rubbing processing was effected on the substrate coated with the mask layer. The rubbing processing was effected two times through the mask layer by a brush roll with a pressed brush height (pressed amount) of 0.4 mm and a roller radius of 75 mm under the conditions of the roller rotation speed of 900 rpm and the substrate moving speed of 30 mm/sec. The rubbing density was about 470, and the average helical axis inclination was about 5°.

After the rubbing, the resist peeling was performed with isopropyl alcohol (IPA) for two minutes to remove the mask layer. Spacers (Micropearl SP2050 manufactured by Sekisui Chemical Co., Ltd.) of 5 μm were dispersed on the substrate thus rubbed, and a seal agent (XN21S manufactured by Mitsui Chemicals Co., Ltd.) was applied to the other substrate while leaving the liquid crystal inlet. These substrates were bonded together to form an empty cell.

As the liquid crystal composition, such chiral nematic liquid crystal was used that was formed of nematic liquid crystal E31-LV manufactured by Merk & Co. and chiral agent S-811 (24.5 wt %) manufactured by Merk & Co., and had the selective reflection peak wavelength λ adjusted to 550 nm. The liquid crystal composition had the helical pitch of about 343 nm. The liquid crystal composition was supplied into the cell by a vacuum-supply method. Finally, the liquid crystal inlet was closed by a seal agent to complete the liquid crystal light modulation element.

The liquid crystal light modulation element thus prepared was set to the focal conic state by applying a voltage, and then the characteristics of the element were evaluated. The evaluation was made with a spectrophotometer (Hitachi Ltd.) by measuring the transmissivity (transmittance) while keeping a space from an integrating sphere. The transmittance of the element thus measured was about 80%. For comparison, a liquid crystal display element was prepared in the same manner as the experimental example 10 except for that the rubbing was not performed. This element in the focal conic state had the transmittance of about 62%.

The width and arrangement pitch of the rubbing processing portions were changed to various values for determining the influences thereof. There was a tendency that the transmissivity (transmittance) lowers when the above width and pitch excessively increase or decrease beyond the ranges defined by (p<W<20p) where W represents the width of the region of the different orientation regulating force, and p represents the helical pitch of the liquid crystal, and defined by (5p<L<100p) where L represents the arrangement pitch of the regions of the different orientation regulating force.

The element provided with the rubbing processing portions of the uniform arrangement pitch as well as the element provided with the rubbing processing portions arranged randomly were prepared for determining the influences of the arrangements. According to the result, these elements exhibited the transmittances of similar values. However, in the element of the uniform arrangement pitch, diffracted light was observed in a specific angle, and there was a tendency that the visibility lowers.

Further, the arrangement direction of the rubbing processed portions and the pixel arrangement direction were changed variously, and the influences thereof were determined. The transmittances were substantially uniform. However, in the case where these two kinds of directions are the same, moire phenomenon was likely to occur to deteriorate the display quality.

Such elements were prepared that were provided with the rubbing processing portions having a straight form and a dogleg form, respectively. The transmittances were substantially uniform in these elements. However, the rubbing processing portion of the straight form was likely to provide the visibility of different degrees depending on the directions of observation, i.e., the same direction as the arrangement direction of the rubbing processing portions and the direction perpendicular to the arrangement direction.

As compared with the element not subjected to the rubbing processing, a significant change was not found in the memory characteristics. Also, it was confirmed that 50% or more of the view angle characteristics was ensured, and the front reflectance was increased.

EXPERIMENTAL EXAMPLE 11

In this example, optical orientation processing was effected on orientation control films.

Two glass substrates with ITO (manufactured by Central Glass Co., Ltd.) were used. Photolithography was effected on the ITO of each substrate to pattern it into belt-like forms having an electrode width of 300 μm and a pitch of 350 μm.

Then, the insulating films were formed on the ITO-coated surfaces of the opposite substrates in the following manner. Polysilazane solution L120 (manufactured by Tonen Corp.) was used, and a thin film thereof having a thickness of 1000 Å was formed on the electrode surface of each substrate by the spin coat method. The film was heated in a constant temperature oven at 120° C. for 2 hours, and further, was heated in the constant temperature over at a temperature of 90° C. and a humidity of 85% for 3 hours. Thereafter, a polyimide material (TT-054 manufactured by Hitachi Chemical Co., Ltd.) was applied by spin coating under the conditions of 3000 rpm and 30 seconds, and was preliminarily baked at 100° C. for one minute. Further, baking at 230° C. for 30 minutes was performed to complete the orientation control film.

The orientation control film on one of the substrates was subjected to the partial orientation processing, which was effected through a photomask provided with opening portions similar to that of the experimental example 10 and a polarizing plate by the UV irradiation device with 5 J/cm² and the incident angle of 15°.

The inclination angle of the helical axis was about 7°.

Thereafter, the spacer dispersion, sealing formation, substrate bonding and liquid crystal supply were performed in the manner similar to that of the experimental example 10 so that the liquid crystal display element was completed.

The liquid crystal light modulation element thus prepared was set to the focal conic state by applying a voltage, and then measurement was performed similarly to the experimental example 10. The transmittance of the element thus measured was about 80%.

Results similar to those of the experimental example 10 were obtained. Thus, such tendencies were determined that the transmittance lowers when the width and arrangement pitch of the optical processing portion excessively increase or decrease beyond the foregoing ranges, that the uniform arrangement pitch of the optical processing portions provides similar transmittances, but was likely to lower the visibility due to the influence by diffracted light, that the arrangement direction of the optical orientation processing portion equal to the pixel arrangement direction provides similar transmittances, but was likely to lower the display quality due to the influence by moire, and that the straight arrangement of the optical orientation processing portions provides similar transmittances, but was likely to cause a difference in visibility between the observation directions parallel and perpendicular to the arrangement direction.

As compared with the element not subjected to the optical orientation processing, a significant change was not found in the memory characteristics. Also, it was confirmed that 50% or more of the view angle characteristics was ensured, and the front reflectance was increased.

(3) With Respect to Sixth Liquid Crystal Light (Optical) Modulation Element and Third Element Producing Method (3-1) Sixth Element A sixth liquid crystal light (optical) modulation element is a liquid crystal light modulation element for performing light (optical) modulation by utilizing a focal conic state of liquid crystal molecules included in a liquid crystal layer held between a pair of substrates, wherein helical axes of the liquid crystal molecules in the focal conic state extend in regular directions within a plane substantially parallel to a substrate surface.

In this element, since the helical axes of the liquid crystal molecules in the focal conic state extend in regular directions within a plane substantially parallel to the substrate surface, the transmittance (transmissivity) of the liquid crystal layer in the focal conic state is remarkably improved, and the liquid crystal light modulation element can have high contrast.

Orientation regulating means may be employed in the element for orientating the helical axes of the liquid crystal molecules in the focal conic state in regular directions within a plane substantially parallel to the substrate surface.

The orientation regulating means can orientate the helical axes of the liquid crystal molecules in the focal conic state along regular directions when a predetermined voltage is applied across the substrates. In this case, anisotropy (or distortion) may be caused in the electric field directions (in other words, lines of electric force of the electric field or equal potential lines of the electric field) for orientating the helical axes of the liquid crystal molecules in regular directions.

The orientation regulating means may be a projected structure formed on at least one of the substrates for causing the anisotropy in the directions of the electric field by the projected structure. The projected structure has such a feature that the regulating force to the liquid crystal molecules can be easily increased.

The projected structure may be a rib-like form. By employing the rib-like form, the regulating force to the liquid crystal molecules can be expanded toward the substrate surface. The projected structure may have a side surface inclined with respect to the direction of the substrate normal (normal line). This inclination can smoothen the equal potential lines when the electric field is applied, and can suppress irregularities in the regulating force to the liquid crystal molecules. A pixel electrode may be formed on the substrate, and the projected structure may be formed on the pixel electrode.

A height h of the projected structure and a gap d between the substrates preferably satisfy a relationship of:

$$d/20 < h < d/2$$

By keeping the height h of the projected structure in the above range, it is possible keep an appropriate regulating force to the liquid crystal molecules and an appropriate effective gap between the substrates while preventing lowering of the reflection intensity in the planar state.

A width W of the projected structure and a helical pitch p of the liquid crystal preferably satisfy a relationship of:

$$p < W < 20p$$

An arrangement pitch L of the projected structures and a helical pitch p of the liquid crystal preferably satisfy a relationship of:

$$5p < L < 100p$$

By employing the width W and arrangement pitch L of the projected structures within the above ranges, a sufficient regulating force can be kept for the liquid crystal molecules while preventing lowering of a display opening rate and complication of the element producing steps.

The arrangement pitch of the projected structures may not be uniform within the above range. By employing the arrangement pitch of the projected structures, which is not uniform, it is possible to suppress lowering of the visibility due to light diffraction phenomenon.

The display element may include a plurality of pixels. In this case, a direction of arrangement of the projected structures may be different from a direction of arrangement of the pixels. Also, the element may include a plurality of regions which are different in direction of arrangement of the projected structures. Thereby, the visibility does not depend on the light incident direction, and uniform light transmission characteristics can be achieved.

An electrode may be formed on the substrate, and the anisotropy (or distortion) may be caused in the electric field directions (in other words, lines of electric force of the electric field or the like) by a groove, which serves as orientation control means and is formed on the electrode on at least one of the substrates. Formation of the groove on the electrode does not require addition of a new member in the liquid crystal element, and thus improves the reliability. Since the groove can be formed simultaneously with the patterning of the electrode, the producing steps can be simple, and the possibility of mixing of impurities and dust can be low.

A width W of the groove and a helical pitch p of the liquid crystal preferably satisfy a relationship of:

$$p < W < 20p$$

An arrangement pitch L of the grooves on the electrode(s) and the helical pitch p of the liquid crystal preferably satisfy a relationship of:

$$5p < L < 100p$$

By employing the width W and arrangement pitch L of the grooves on the electrode within the above ranges, a sufficient regulating force can be kept for the liquid crystal molecules and complication of the element producing steps can be suppressed.

The arrangement pitch L of the electrode grooves may not be uniform within the above range. By employing the arrangement pitch of the electrode grooves, which is not uniform, it is possible to suppress lowering of the visibility due to light diffraction phenomenon.

A direction of arrangement of the electrode grooves may be different from a direction of arrangement of the pixels. Also, the element may include a plurality of regions which are different in direction of arrangement of the grooves.

Thereby, the visibility does not depend on the light incident direction, and uniform light transmission characteristics can be achieved.

An insulating film may be formed on at least one of the substrates, and the anisotropy may be caused in the electric field directions by a groove, which serves as orientation control means and is formed on the insulating film on at least one of the substrates. Formation of the groove on the insulating film does not require addition of a new member in the liquid crystal element, and thus improves the reliability.

A width W of the groove on the insulating film and a helical pitch p of the liquid crystal preferably satisfy a relationship of:

$$p<W<20p$$

An arrangement pitch L of the grooves on the insulating film and the helical pitch p of the liquid crystal preferably satisfy a relationship of:

$$5p<L<100p$$

By employing the width W and arrangement pitch L of the grooves on the insulating film within the above ranges, a sufficient regulating force can be kept for the liquid crystal molecules and complication of the element producing steps can be suppressed.

The arrangement pitch L of the electrode grooves on the insulating film may not be uniform within the above range. By employing the arrangement pitch of the grooves on the insulating film, which is not uniform, it is possible to suppress lowering of the visibility due to light diffraction phenomenon.

A direction of arrangement of the grooves on the insulating film may be different from a direction of arrangement of the pixels. Also, the element may include a plurality of regions which are different in direction of arrangement of the grooves. Thereby, the visibility does not depend on the light incident direction, and uniform light transmission characteristics can be achieved.

Regions providing a different orientation regulating force may be arranged partially on a surface of at least one of the substrates in contact with the liquid crystal for orientating helical axes of the liquid crystal molecules in a regular direction. By arranging the regions of the different orientation regulating force, the direction of the helical axis is determined by the difference in surface regulating force during transition of the liquid crystal molecules to the focal conic state. Therefore, the helical axes of the liquid crystal can be regularly orientated, similarly to the manner of inclining the direction of the electric field.

The region having the different orientation regulating force may be formed by partially effecting the rubbing, partially effecting the light irradiation or using a partially different material.

A width W of the region having the different orientation regulating force and a helical pitch p of the liquid crystal may satisfy a relationship of:

$$p<W<20p$$

An arrangement pitch L of the regions of the different orientation regulating force and the helical pitch p of the liquid crystal preferably satisfy a relationship of:

$$5p<L<100p$$

By employing the width W and arrangement pitch L of the regions having the different orientation regulating force within the above ranges, a sufficient regulating force can be kept for the liquid crystal molecules and complication of the element producing steps can be prevented.

The arrangement pitch of the regions having the different orientation regulating force may not be uniform within the above ranges. By employing the arrangement pitch of the regions having the different orientation regulating force, which is not uniform, it is possible to suppress lowering of the visibility due to light diffraction phenomenon.

A plurality of pixels may be arranged in a direction different from a direction of arrangement of the regions having the different orientation regulating force. Also, the element may include a plurality of regions which are different in direction of arrangement of the regions having the different orientation regulating force. Thereby, the visibility does not depend on the light incident direction, and uniform light transmission characteristics can be achieved.

A multilayer liquid crystal light (optical) modulation element may be formed of a plurality of liquid crystal light modulation elements stacked together and having the same structure as the element described above.

A multilayer liquid crystal light modulation element may include any one of the foregoing elements as well as an element stacked together with the above element and containing liquid crystal molecules, which have helical axes extending irregularly in a plane parallel to a substrate when being in the focal conic state.

At least the element on the end of the front side may be any one of the foregoing element. In any one of the above cases, stacking of the plurality of liquid crystal layers increases the scattering components, and thereby can effectively suppress the increase in transmittance in the focal conic state.

The liquid crystal exhibiting the focal conic state may be liquid crystal exhibiting a cholesteric phase at a room temperature. In this case, the liquid crystal exhibiting the cholesteric phase at a room temperature may be liquid crystal having positive dielectric anisotropy.

In each of the above elements, display may be performed by switching the liquid crystal between the focal conic state and the planar state. In this case, the liquid crystal in the planar state may have a peak of selective reflection in a visible wavelength range.

In the multilayer liquid crystal light modulation element, the stacked elements may have different peak wavelengths of selective reflection, respectively, in which case display in multicolor can be performed. Also, at least two liquid crystal elements having different optical rotation directions, respectively, may be employed, in which case the light utilizing efficiency can be increased. The liquid crystal layers having different optical rotation directions may have a substantially equal peak wavelength of selective reflection, in which case the reflectance of the liquid crystal layer(s) can be increased.

An example of the third method of producing the liquid crystal light (optical) modulation element will now be described.

(3-2) Third Method of Producing the Liquid Crystal Light (Optical) Modulation Element A third method is a method of producing a liquid crystal light (optical) modulation element for performing light modulation by utilizing a focal conic state of liquid crystal molecules included in a liquid crystal layer held between a pair of substrates.

This method includes the steps of providing orientation regulating means (e.g., a projected structure, a groove in an electrode formed on the substrate, an insulating film having a groove and formed on the substrate, a region on the substrate providing partially different orientation regulating force) for regularly orientating helical axes of the liquid crystal molecules in the focal conic state on at least one of the substrates, and a step of arranging the liquid crystal layer between the paired substrates.

Examples of the third producing method of the liquid crystal light modulation element will now be described.

An example of the element producing method belonging to this type of element producing method includes the steps of providing a projected structure for regularly orientating helical axes of the liquid crystal molecules in the focal conic state on at least one of the substrates, and a step of arranging the liquid crystal layer between the paired substrates including the substrate(s) provided with the projected structure.

The form, position, height, arrangement pitch, arrangement direction and others of the projected structure(s) for regulating the orientation of the liquid crystal can be freely determined. Therefore, the orientation regulation of the liquid crystal can be easily controlled.

The projected structure may be formed by a photolithography.

Another example of the element producing method includes the steps of forming pixel electrodes on the paired substrates, respectively, forming a groove on the electrode of at least one of the substrates for regularly orientating helical axes of liquid crystal molecules in the focal conic state, and arranging the liquid crystal layer between the paired substrates including the substrate(s) provided with the groove.

The form, position, depth, arrangement pitch, arrangement direction and others of the groove(s) on the electrode for regulating the orientation of the liquid crystal can be freely determined. Therefore, the orientation regulation of the liquid crystal can be easily controlled. This method does not require a step of providing an additional member for orientation regulation of the liquid crystal.

The groove on the electrode may be formed by a photolithography. In this case, the patterning of the electrode for forming the pixels may be performed simultaneously with the formation of the groove.

Still another example of the element producing method includes the steps of forming on at least one of the paired substrates an insulating film having a groove for regularly orientating helical axes of liquid crystal molecules in the focal conic state, and arranging the liquid crystal layer between the paired substrates including the substrate(s) provided with the insulating layer.

The form, position, depth, arrangement pitch, arrangement direction and others of the groove(s) on the insulating film for regulating the orientation of the liquid crystal can be freely determined. Therefore, the orientation regulation of the liquid crystal can be easily controlled. This method does not require a step of providing an additional member for orientation regulation of the liquid crystal.

The groove on the insulating film may be formed by a photolithography.

Yet another example of the element producing method includes the steps of partially forming on a surface, in contact with the liquid crystal, of at least one of the substrates a region having a different orientation regulating force for regularly orientating helical axes of liquid crystal molecules in the focal conic state, and arranging the liquid crystal layer between the paired substrates including the substrate(s) provided with the region having the different orientation regulating force.

The form, position, arrangement pitch, arrangement direction and others of the region(s) having the different orientation regulating force can be freely determined. Therefore, the orientation regulation of the liquid crystal can be easily controlled. This method does not require a step of providing an additional member for orientation regulation of the liquid crystal.

The above region may be formed by partially effecting rubbing or by partially effecting light irradiation.

The step of partially forming the region(s) having the different regulating force may include the steps of arranging a mask layer provided with an opening on the substrate, and removing the mask layer.

The region having the different regulating force may be formed by forming an orientation film having a partially different kind of material.

(3-3) With Respect to the Liquid Crystal Light (Optical) Modulation Element and Others Shown in the Figures The liquid crystal light modulation element of the foregoing type and others will now be described with reference to FIGS. 30–45.

(Examples of Basic Structure of the Liquid Crystal Light (Optical) Modulation Element, see FIGS. 30(a)–30(d))

Figure 30A:
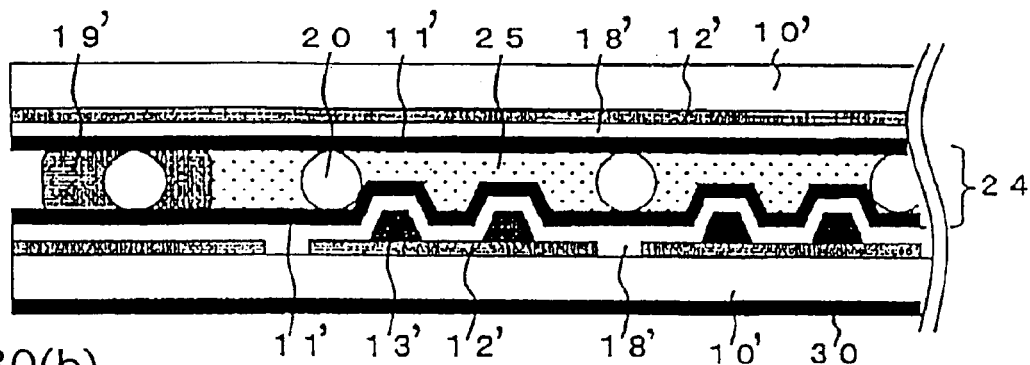
FIGS. 30(a)–30(d) are cross sections showing a structure of a liquid crystal light modulation element.
Figure 30B:
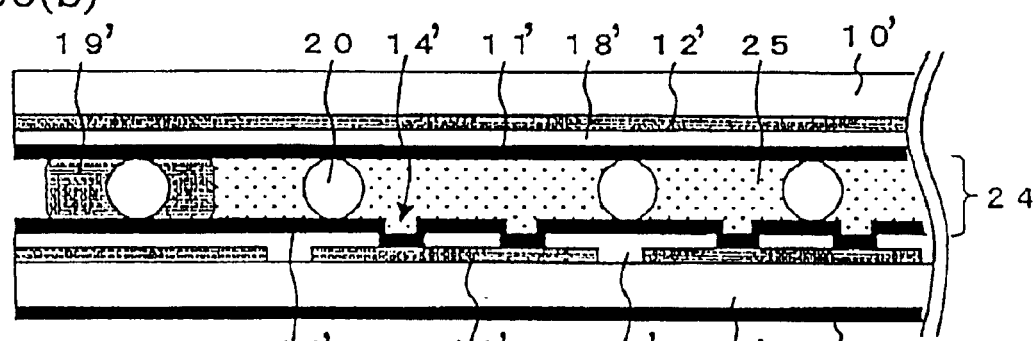
Figure 30C:
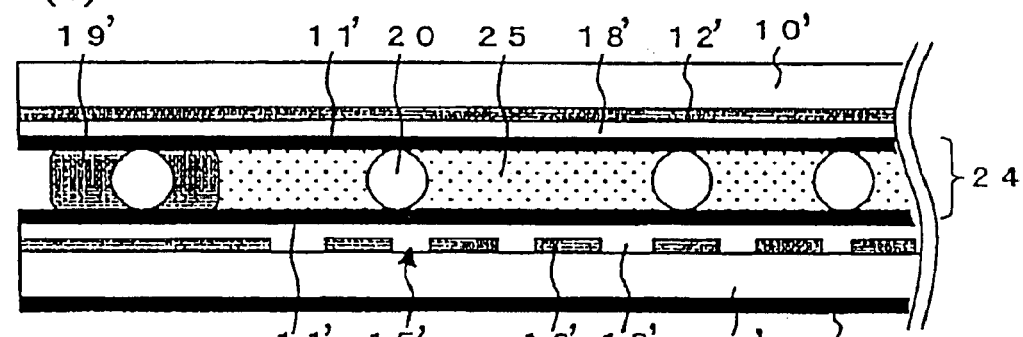

FIGS. 30(a)–30(d) are cross sections each showing an example of the liquid crystal display element. Description will now be given on the basic structure of the liquid crystal light modulation element with reference to FIG. 30(a). As shown in FIG. 30(a), two transparent substrates 10' provided with transparent electrodes 11' are arranged. A liquid crystal material 25 and spacers 20 for controlling the gap are arranged between the substrates 10' with the electrodes 11'. A seal 19' is continuously arranged on the periphery except for a liquid crystal inlet. In FIG. 30(a), only one end of the element is shown. A light absorber layer 30 is arranged on the rear side of the element.

The transparent substrate may be a glass substrate, or may be a flexible resin substrate made of, e.g., polycarbonate, polyether sulfone (PES) or polyethylene terephthalate. If the liquid crystal light modulation element is to be used as the element of the reflection type or the optical writing type, one of the substrates may not be transparent.

The transparent electrode 11' formed on the transparent substrate 10' for controlling the liquid crystal light modulation element may be formed of a transparent conductive film made of ITO (Indium Tin Oxide) or the like, a metal electrode made of, e.g., aluminum or silicon, or a photoconductive film made of, e.g., amorphous silicon or BSO. It is also possible to use an electrode structure of an active matrix type, which includes a plurality of pixel electrodes and thin-film transistors connected thereto. An electrode, which serves also as the substrate by itself, can be used.

If necessary, an orientation film made of, e.g., polyimide may be arranged on the electrode formation surface of the substrate 10', or organic and inorganic films may be arranged thereon as a gas barrier layer and/or an insulating layer for improving the reliability of the liquid crystal light modulation element. FIG. 30(a) and others show an example, in which an insulating film 18' and an orientation film 11' are arranged on each of the substrates.

The spacers 20 may be spherical particles made of glass, plastics or the like.

The seal 19' may be made of various material provided that the liquid crystal composition can be supplied into the liquid crystal element, and is preferably made of ultraviolet-curing resin or thermosetting resin. In particular, the thermosetting resin such as epoxy resin may be used as the seal resin, whereby high gas-tightness can be kept for a long term.

By applying a voltage across the electrodes 12' arranged on the substrates 10', the liquid crystal can be changed from the planar state to the focal conic state, and vice versa.

The liquid crystal material 25 may be of the type, which allows utilization of the focal conic state for light modulation, and may be cholesteric liquid crystal or chiral nematic liquid crystal prepared by adding a chiral agent to nematic liquid crystal for exhibiting a cholesteric phase at a room temperature. In any one of the above cases, the liquid crystal material having positive dielectric anisotropy can be employed.

The focal conic state is such a state that the liquid crystal molecules are orientated parallel to each other so that the helical axes of the liquid crystal may be parallel to both the upper and lower substrate surfaces. Usually, the directions of the helical axes are not uniform in the focal conic state.

For holding the liquid crystal material between the paired substrates, a known vacuum-supply method or a liquid crystal dropping method may be appropriately used depending on the intended size of the liquid crystal element and the gap between the substrates.

Figure 36:
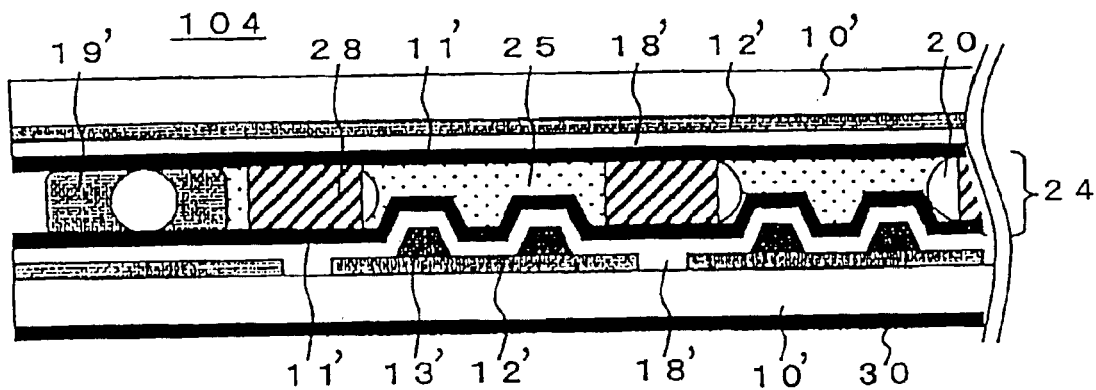
FIG. 36 is a cross section of another structure of the liquid crystal light modulation element.

As shown in FIG. 36, the element may be provided with a structure 28, which is in surface-contact with the upper and lower substrates 10' (and preferably is bonded to the upper and lower substrates). This structure improves the accuracy of the gap between the substrates. Particularly, in the structure having the substrates bonded together, it is possible to prevent the increase in distance between the substrates, and the structure is effective for the substrates formed of resin films. The structure 28 may be made of various resin materials.

The projected structure shown in FIG. 30(*a*), the groove formed on the insulating film shown in FIG. 30(*b*), the groove formed on the transparent electrode shown in FIG. 30(*c*) and the regions having the different orientation regulating force in FIG. 30(*d*) correspond to the region, which regulates the helical axes of the liquid crystal in the focal conic state, and will be referred to as an "orientation regulating region" hereinafter. This will now be described in greater detail.

It is already confirmed that the effect achieved by regularly arranging the direction of the helical axes is not significantly affected by the manner of holding the liquid crystal, the kind of the spacer 20, the present/absence of the structure 28 and the like.

(Manner of Regulating Helical Axis Direction, see FIGS. 31–35)

(1) Manner Utilizing Control of the Electric Field

A manner of utilizing control of the electric field may be one of the manners of regularly orientating the helical axes in a plane substantially parallel to the substrate. This method utilizing the control of the electric field will now be described.

Figure 30D:
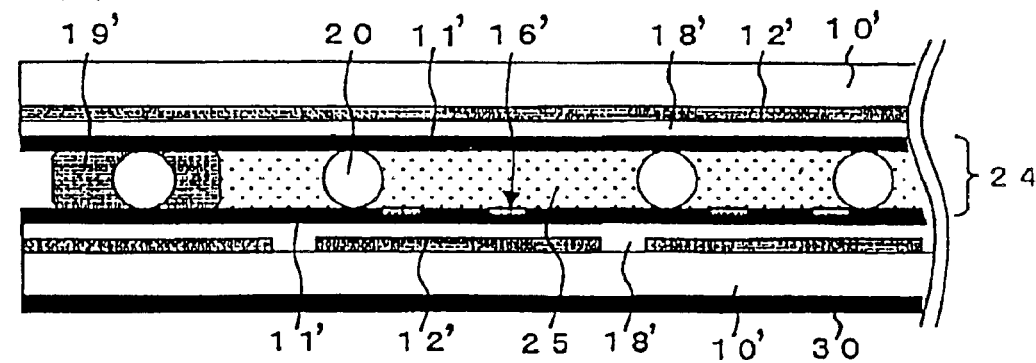
Figure 31:
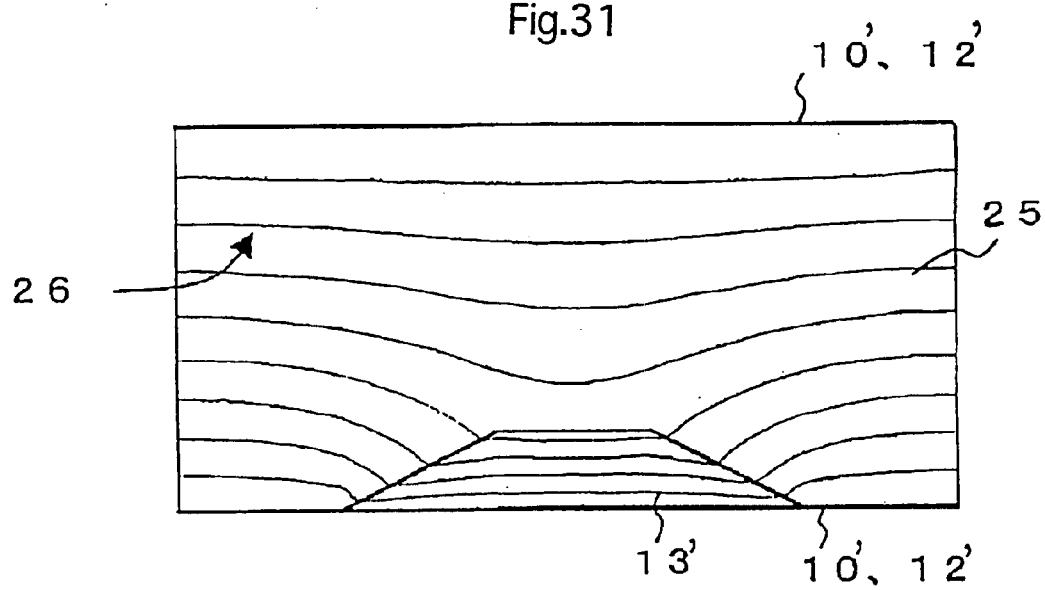
FIG. 31 shows a distribution of equal potential lines by a project structure.
Figure 32:
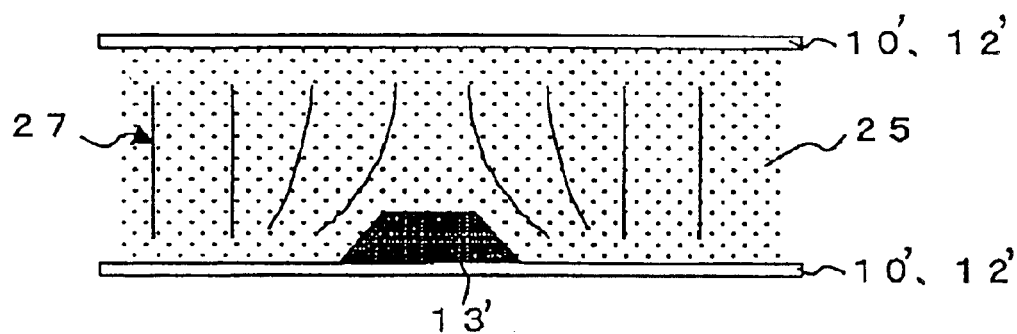
FIG. 32 shows an electric field distribution by an application of voltage.
Figure 33:
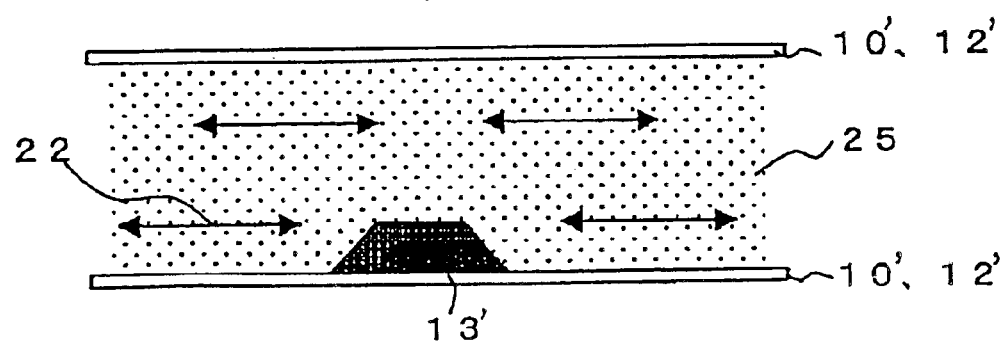
FIG. 33 shows directions of helical axes of respective liquid crystal domains in the focal conic state after removing the voltage.
Figure 34:
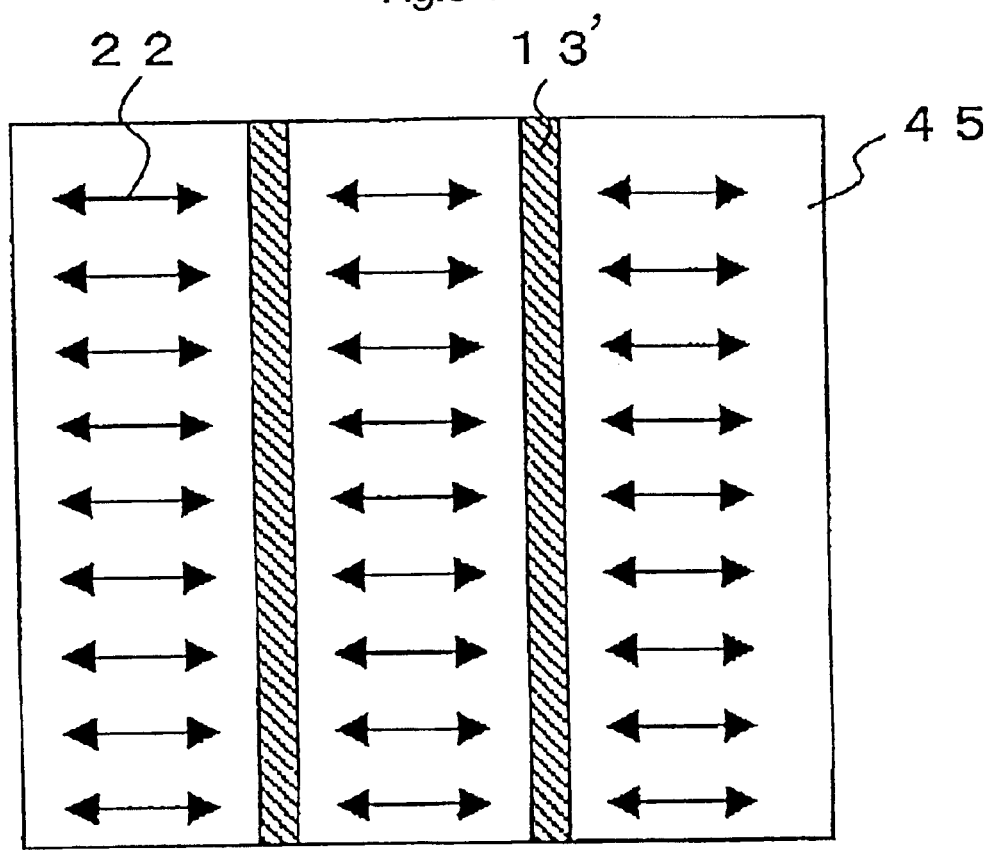
FIG. 34 shows directions of helical axes of respective liquid crystal domains in the focal conic state of the structure provided with orientation regulating means.

For example, as shown in FIG. 30(*a*), a projected structure 13' of the rib form is arranged on the substrate 10'. The provision of the projected structure 13' causes distortion in the equal potential lines 26 near the projected structure 13' when a voltage is applied across the electrodes 12' as shown in FIG. 31. Therefore, the electric field directions 27 (in other words, lines of electric force in the electric field) are partially inclined to specific directions as shown in FIG. 32. When the application of the voltage is stopped in the above state for changing the liquid crystal to the focal conic state, the influence of the inclined electric field, which was previously present, restricts the direction of the helical axes of the liquid crystal. As a result, the helical axes 22 of the liquid crystal are regularly orientated in a plane substantially parallel to the substrate, as shown in FIGS. 33 and 34. Accordingly, it is possible to achieve the focal conic state, in which the helical axes 22 of the liquid crystal molecules are regularly orientated, and therefore the light scattering is suppressed.

As shown in FIG. 30(*b*), the groove 14' is formed on the insulating film 18' likewise causes inclination of the electric field so that it is possible to achieve the focal conic state, in which the helical axes are uniformly orientated, and the light scattering is suppressed.

Figure 35:
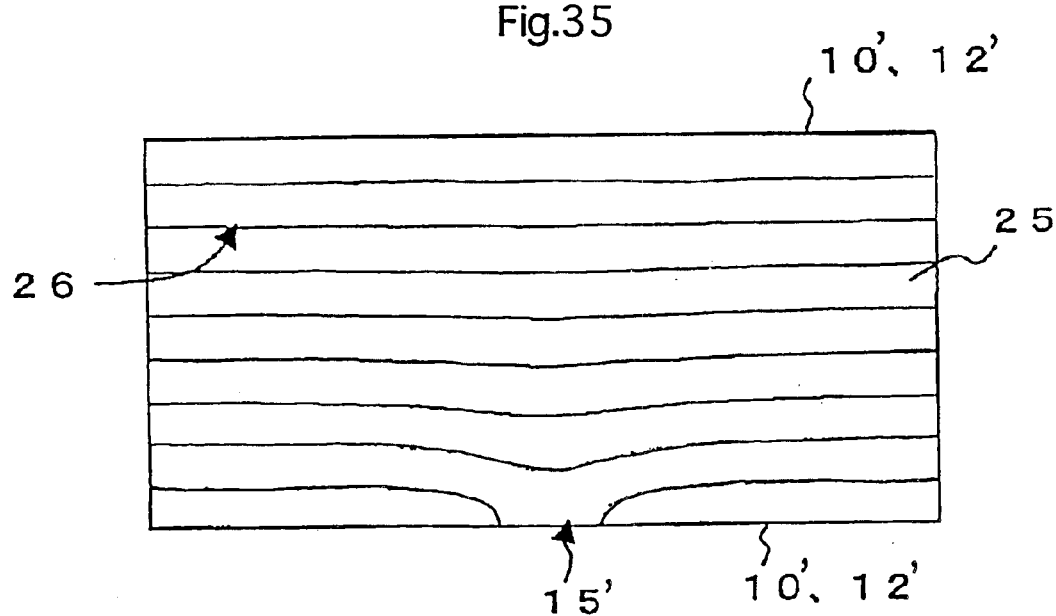
FIG. 35 shows a distribution of equal potential lines caused by a groove formed in an electrode.

As shown in FIG. 30(*c*), the groove 15' formed on the transparent electrode 12' causes the distortion in the potential lines 26 near the groove 15' as shown in FIG. 35, and therefore it is possible for the same reason to achieve the focal conic state, in which the helical axes are regularly orientated, and the scattering is suppressed.

(1-a) Projected Structure

If the projected structure is formed by the photolithography, it may be made of positive type photoresist such as novolac resin, or a negative type photoresist such as acrylic resin. If the printing method is employed, the projected structure may be made of a thermosetting resin such as epoxy resin, a thermoplastic resin such as a polyurethane resin, polyvinylchloride resin, or glass paste printed on the substrate by a known printing method.

If the substrates for holding the liquid crystal layer are formed of resin film substrates, convexities and concavities may be formed on the substrate itself, and the electrode may be formed on the film substrate, whereby the substrate provided with the projected structures can be obtained in an easy manner. The convexities and concavities may be formed on the film substrate itself by a mold method using a molding die pressed to the substrate.

The manner, in which the projected structures are used to orientate regularly the helical axes in a plane substantially parallel to the substrate, has such an advantage that the regulating force to the liquid crystal molecules can be easily increased.

It is desirable that the projected structure exerting the regulating force to the helical axis is formed on the transparent electrode. The height of the projected structure is an important parameter determining the direction of the helical axis. Assuming that the gap between the substrates is d, and the height of the projected structure is h, it is desirable that the height h satisfies a relationship of $(d/20 < h < d/2)$. If the height h of the projected structure is larger than the range of the above relationship, the effective gap between the substrates lowers so that the display brightness lowers in the planar state when observed as the cholesteric liquid crystal display element. If the height h of the projected structure is low, the regulating force lowers, and an effect of uniformly orientating the helical axes cannot be achieved.

The height of the projected structure can be arbitrarily adjusted, e.g., by changing the spin coat rotation speed or the thickness of the form plate.

The form of the projected structure forms an important factor. It is desirable that the side surface thereof is inclined with respect to the substrate normal for obtaining smooth potential lines 26 as shown in FIG. 31.

For inclining the side surface of the projected structure formed on the substrate with respect to the substrate normal, such a manner may be employed that a heat treatment is effected on the projected structure for melting the surface thereof so that the inclination may be formed.

FIGS. 37(*a*)–37(*f*) show an example of formation of the projected structures. This example includes the following steps.

In FIG. 37(*a*), a resist film 40 is formed on an electrode surface of the substrate 10' provided with a pattern of the electrode 12'.

In FIG. 37(*b*), the resist film 40 is exposed to a light source 60' through openings 63' in a mask 62'.

Figure 37A:
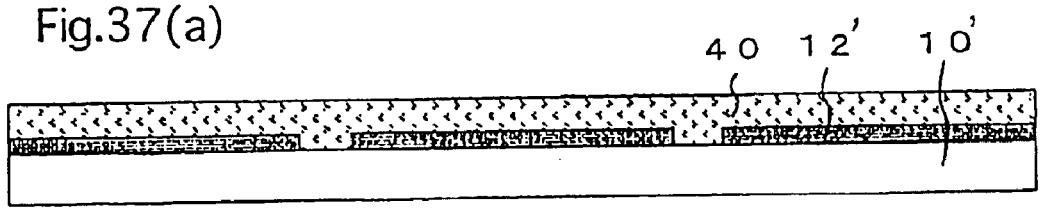
FIGS. 37(a)–37(f) show by way of example steps of producing a liquid crystal light modulation element.
Figure 37B:
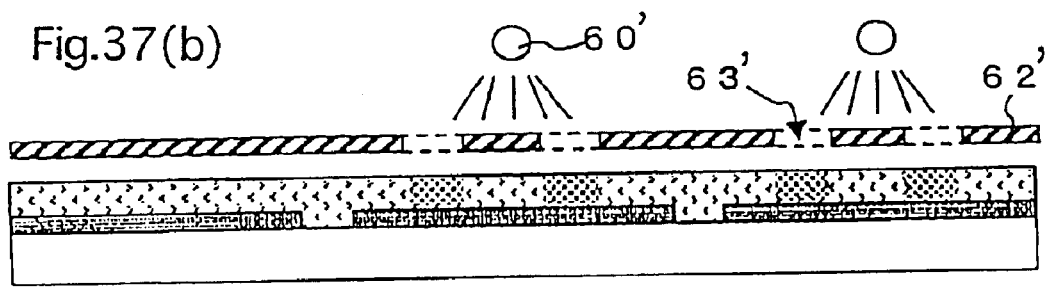
Figure 37C:
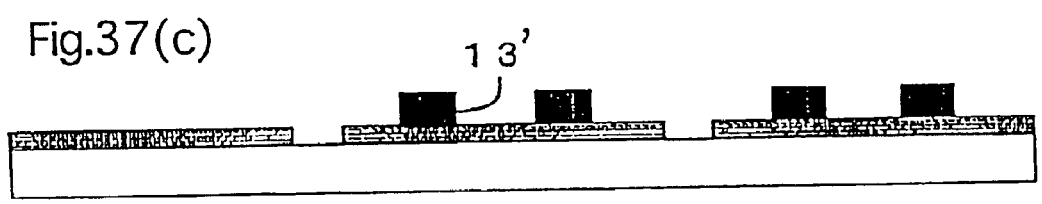

In FIG. 37(c), development and rinsing are performed to remove unnecessary portions of the resist film 40 to form the projected structures 13'.

Figure 37D:
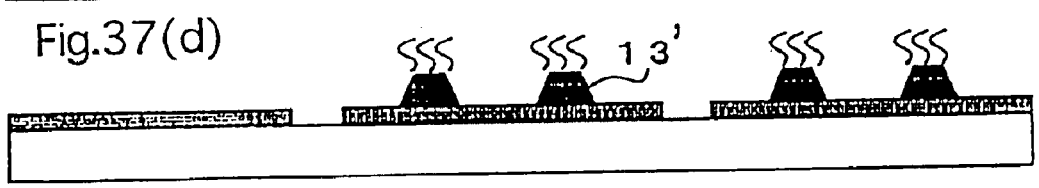

In FIG. 37(d), a heat treatment or the like is performed on the projected structures 13' to provide inclination of the side surfaces thereof.

Figure 37E:
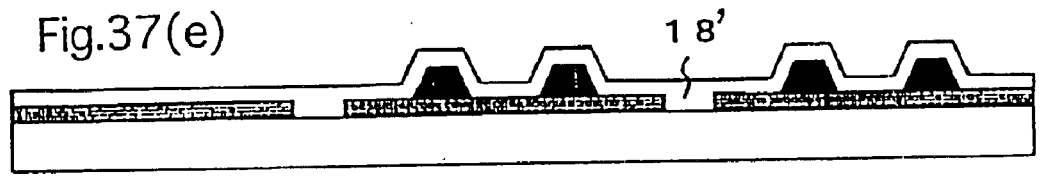

In FIG. 37(e), the insulating film 18' is formed on the surface of the substrate 10' provided with the projected structures 13'.

Figure 37F:
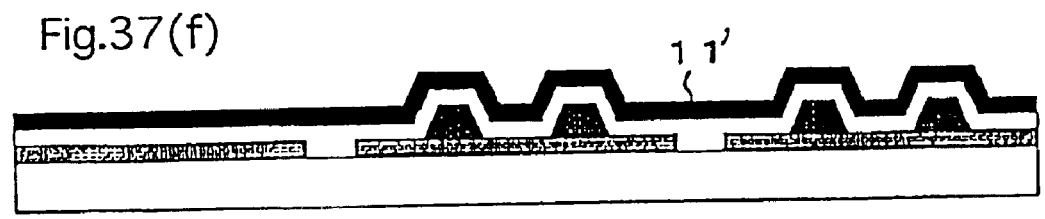

In FIG. 37(f), an orientation film 11' is formed on the insulating film 18'.

Through the above steps, the projected structures 13' of an intended form can be formed in the intended positions.

(1-b) Groove on the Electrode

The groove can be formed by a known photolithography. The photolithography facilitates the formation of the groove (s), and allows formation of the groove(s) simultaneously with formation of the pixel electrodes so that the steps can be simplified. The groove(s) may be formed on only one or both of the substrates.

The manner, in which the groove is formed on the electrode for regularly orientating the helical axes in a plane substantially parallel to the substrate, allows formation of the groove simultaneous with the patterning of the electrode so that the producing steps can be simple. Also, the possibility of mixing of impurities and dust can be low. Since this manner does not require addition of a new member in the liquid crystal element, the reliability can be improved.

FIGS. 38(a)–38(g) show an example of formation of the grooves on the electrode. This example includes the following steps.

Figure 38A:
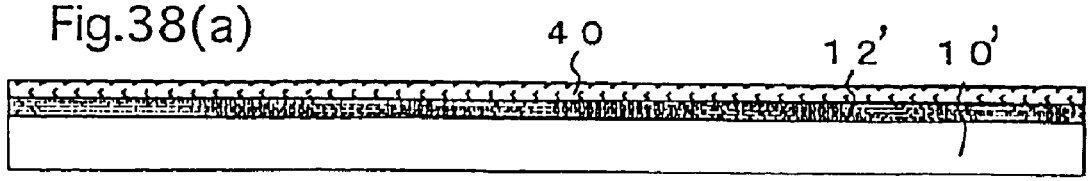
FIGS. 38(a)–38(g) show by way of example steps of producing a liquid crystal light modulation element.

In FIG. 38(a), the resist film 40 is formed on the electrode layer 12' formed on the substrate 10'.

Figure 38B:
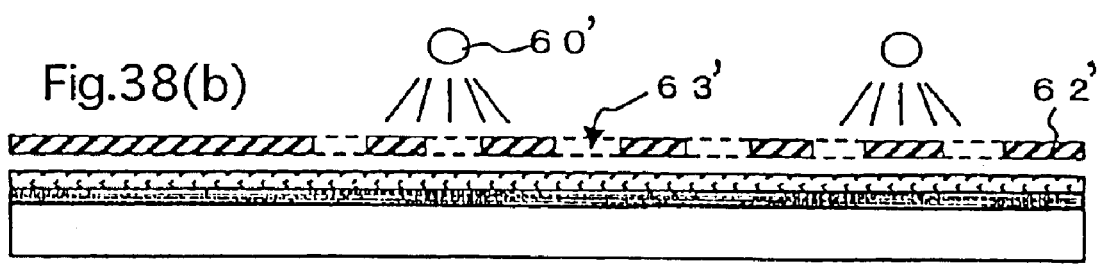

In FIG. 38(b), the resist film 40 is exposed to the light source 60' through the openings 63' in the mask 62'.

Figure 38C:

In FIG. 38(c), development and rinsing are performed to remove unnecessary portions of the resist film 40 to form the openings 41 in the resist film 40.

Figure 38D:
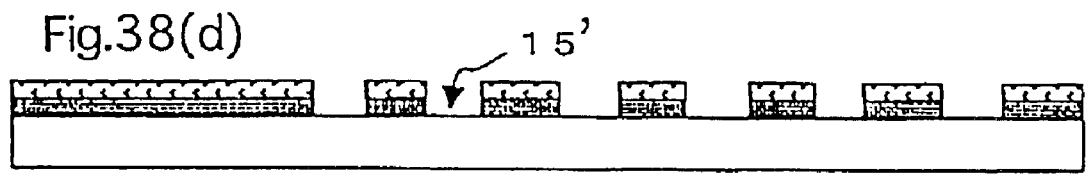

In FIG. 38(d), etching is effected on the electrode layer 12', and the electrode layer 12' is patterned into belt-like forms so that the grooves 15' are formed.

Figure 38E:
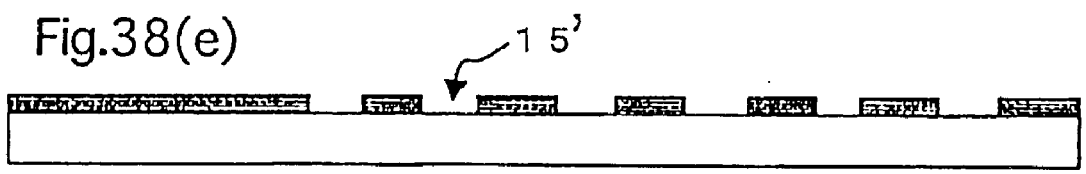

In FIG. 38(e), the resist film 40 is removed.

Figure 38F:
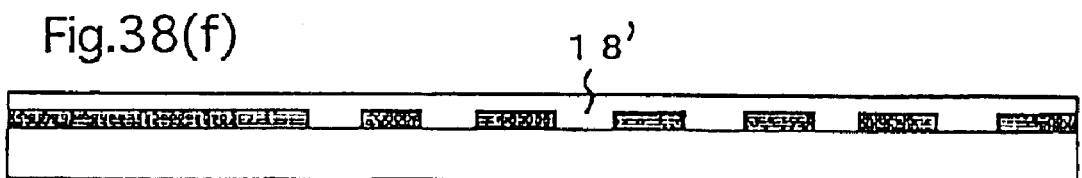

In FIG. 38(f), the insulating film 18' is formed on the substrate 10'.

Figure 38G:
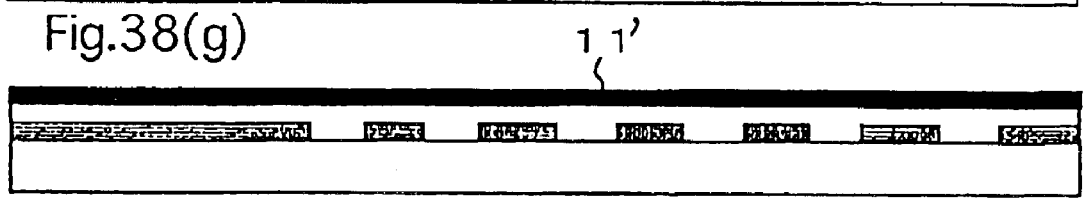

In FIG. 38(g), the orientation film 11' is formed on the insulating film 18'.

Through the above steps, the grooves 15' of an intended form can be formed in the intended positions by a relatively simple manner.

(1-c) Groove on the Insulating Film

For forming the groove on the insulating film, the photolithography can be employed using a photosensitive resin material as the material of the insulating film. The resin material, which exhibits a larger difference in dielectric constant with respect to the liquid crystal material, can achieve a higher effect, and can be selected from various materials depending on the liquid crystal material. The grooves may be formed on either or both of the insulating films on the opposite substrates depending on the used liquid crystal material.

The manner, in which the groove is formed on the insulating film for regularly orientating the helical axes in a plane parallel to the substrate, does not require addition of a new member in the liquid crystal display element, and therefore can improve the reliability.

Figure 39A:
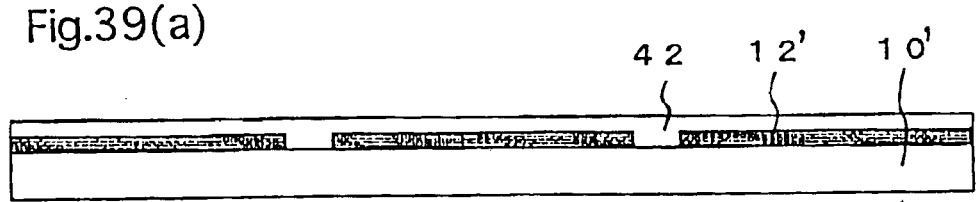
FIGS. 39(a)–39(d) show by way of example steps of producing a liquid crystal light modulation element.

FIGS. 39(a)–39(d) show an example of the steps of forming the grooves on the insulating film. This example includes the following steps:

In FIG. 39(a), a resist film 42 is formed on the electrode surface of the substrate 10' provided with a pattern of the electrode 12'.

Figure 39B:
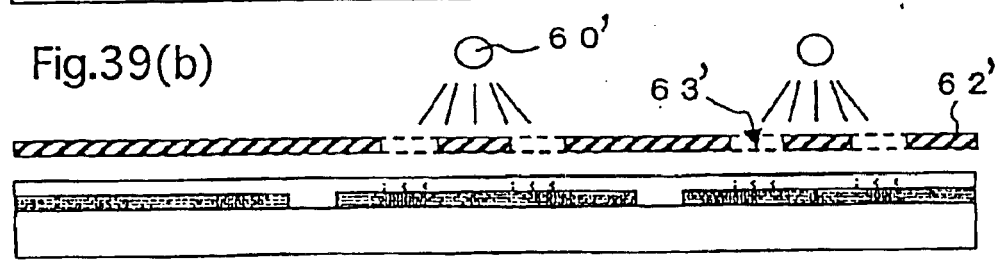

In FIG. 39(b), the resist film 42 is exposed to the light source 60' through the openings 63' in the mask 62'.

Figure 39C:
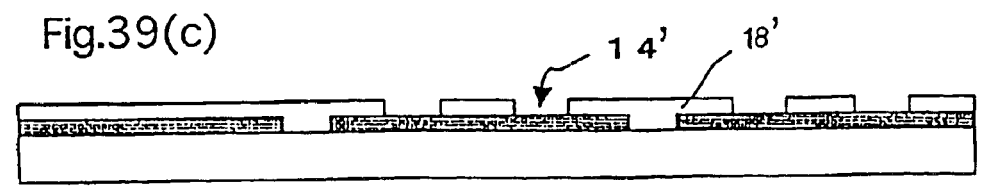

In FIG. 39(c), development and rinsing are performed to remove unnecessary portions of the resist film 42 to form the openings in the resist film 42. Hardening processing is effected on the resist film 42 to form the insulating film 18'. The opening forms the groove 14' on the insulating film 18'.

Figure 39D:
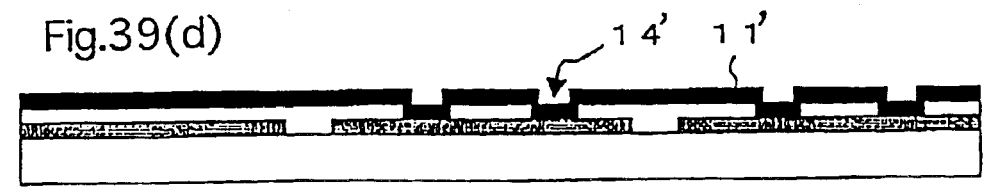

In FIG. 39(d), the orientation film 11' is formed on the surface provided with the insulating film 18'.

Through the above steps, the grooves 14' of an intended form can be formed in the intended positions by a relatively simple manner.

(2) Manner by Employing Different Orientation Regulating Force

A method of forming a portion providing a different orientation regulating force may be used as another means for orientating the helical axes regularly in the plane substantially parallel to the substrate. The portion providing the different orientation regulating force may be a region, which an anchoring force or an orientating force with respect to the liquid crystal molecules is different. The portion of the different orientation regulating force can be formed by, e.g., effecting rubbing processing or optical orientation processing with ultraviolet light or the like on the orientation film of, e.g., polyimide uniformly coating the electrode surface. Also, by forming the orientation film made of a partially different kind of material, the portion providing the different orientation regulating force can be achieved. FIG. 30(d) shows an example, in which portions 16' providing a different orientation regulating force are formed in the orientation film 11'.

The manner of forming the portion providing the different orientation regulating force does not cause such a situation that the rubbing processing or the like causes inclination in the electric field direction, but causes such a situation that the difference in surface regulating force determines the direction of the helical axes during transition of the liquid crystal molecules to the focal conic state, and thereby the effect similarly to that of the foregoing manner of inclining the electric field direction can be achieved.

In the method of partially effecting the rubbing processing on the orientation control film, a photoresist material is applied, e.g., by spin coating to the orientation film, and then is removed from the portion to be rubbed by conventional photolithography, and then the rubbing is performed. Thereafter the resist is removed. The rubbing direction is not restricted.

In the case of the optical orientation, the portion having the different orientation regulating force can be easily formed by performing ultraviolet light exposure through the photomask and the polarizing plate.

FIGS. 40(a)–40(d) show an example of the steps of forming the portion having the different orientation regulating force. This example includes the following steps:

In FIG. 40(a), the insulating film 18' is formed on the electrode surface of the substrate 10' provided with a pattern of the electrode 12'.

In FIG. 40(b), the orientation film 11' is formed on the insulating film 18'.

In FIG. 40(c), the orientation film 11' is exposed to the light source 60' through the openings 63' in the mask 62', or In FIG. 40(c'), the resist film 40 is formed on the orientation film 18', and is patterned. Rubbing processing 64' is effected on the orientation film 11' through the openings 41 in the resist film 40.

Thereafter, the resist film is removed.

In FIG. 40(d), the regions 16' having the different orientation regulating force are formed.

Through the above steps, the regions 16' having an intended form and providing the different orientation regulating force can be formed in the intended positions by a relatively simple manner.

For forming the different kind of orientation film portions, a different kind of orientation film material may be applied and baked after the patterning of the resist film in the step shown in FIG. 40(c), and then the resist film may be removed.

In any one of the above cases, the manner of effecting the orientation processing for regularly orientating the helical axes in a plane substantially parallel to the substrate does not require addition of a new member in the liquid crystal display element, and therefore can improve the reliability. In particular, the optical orientation processing is superior in view of the fact that the possibility of mixing of dust and others is low.

Figure 41A:
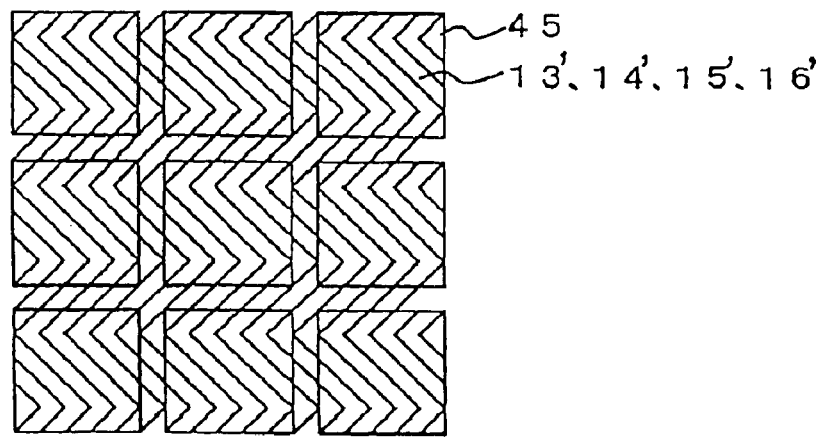
FIGS. 41(a)–41(c) show further different examples of the orientation regulating means.
Figure 41B:
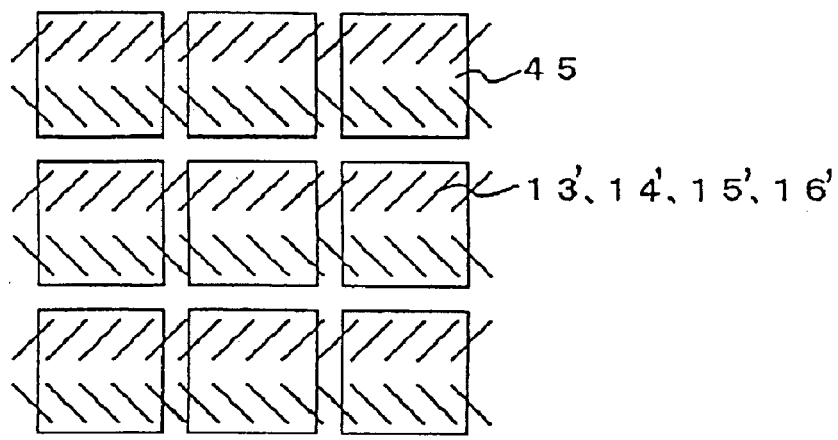
Figure 41C:
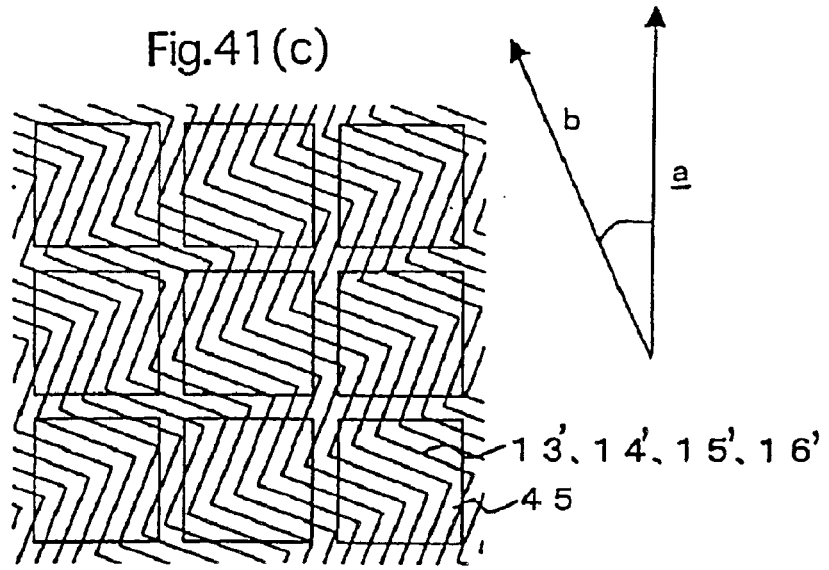

(3) Arrangement of Orientation Regulating Regions (See FIGS. 41(a)–41(c))

In the methods described above, the regulating force of the region having the same for uniformly orientating the helical axes is exerted only to a limited range, and therefore it is preferable that a width W of the region and a helical pitch p of the liquid crystal molecules satisfy a relationship of p<W<20p. An arrangement pitch L of the orientation regulating regions and the helical pitch p of the liquid crystal molecules preferably satisfy a relationship of 5p<L<100p. If the above pitch L is larger than the above range, larger region not subjected to the regulating force is likely to be formed, and the scattering between the domains increases in the focal conic state. If the pitch is smaller than the above range, lowering of the displaying opening rate and complication of the element producing steps occur.

If the arrangement pitch is small, and further is uniform, the orientation regulating region causes light diffraction so that the diffracted light lowers the visibility when observed as the display element. For avoiding the above phenomenon, it is effective to change appropriately (e.g., randomly) the arrangement pitch in the liquid crystal element.

The orientation regulating regions may have linear form in one direction within the element, but may change the direction in the element such as a dogleg form having a bent portion as shown in FIG. 41(a), whereby uniform light transmission characteristics can be achieved independently of the light incident direction. As shown in FIG. 41(b), the portions applying the regulating force may be arranged in the directions, which change periodically.

In general, matrix pixels (group of pixels arranged in rows and columns) are formed for producing the liquid crystal display element. In this case, as shown in FIG. 41(c), it is desired that the arrangement direction b of the structures providing the above regulating force is different from the pixel arrangement direction a even if a straight form, or a dogleg form or the like having a bent portion is selected.

The arrangement pitch and form of the orientation regulating regions, i.e., the projected structures, grooves on the electrode, grooves on the insulating film, the regions having the different orientation regulating force can be freely changed by changing the mask or form plate. The orientation regulating portions may be formed on either or both of the substrates.

(Multilayer Liquid Crystal Display Element, See FIGS. 42–45)

The effect of reducing the light scattering is achieved by regularly orientating the helical axes of the liquid crystal molecules in the focal conic state, as already described, and this effect appears not only in the element of the single layer, but in the multilayer element formed of a plurality of elements. In the multilayer element, the incident light is scattered by the first layer of the liquid crystal, and the straight component and the scattered component enter the second layer so that the scattering component further increases. Accordingly, the orientation regulation region for regularly orientating the helical axes of the liquid crystal may be arranged on at least the first element nearest the observation side, whereby the characteristics of the multilayer element can be improved.

Figure 42:
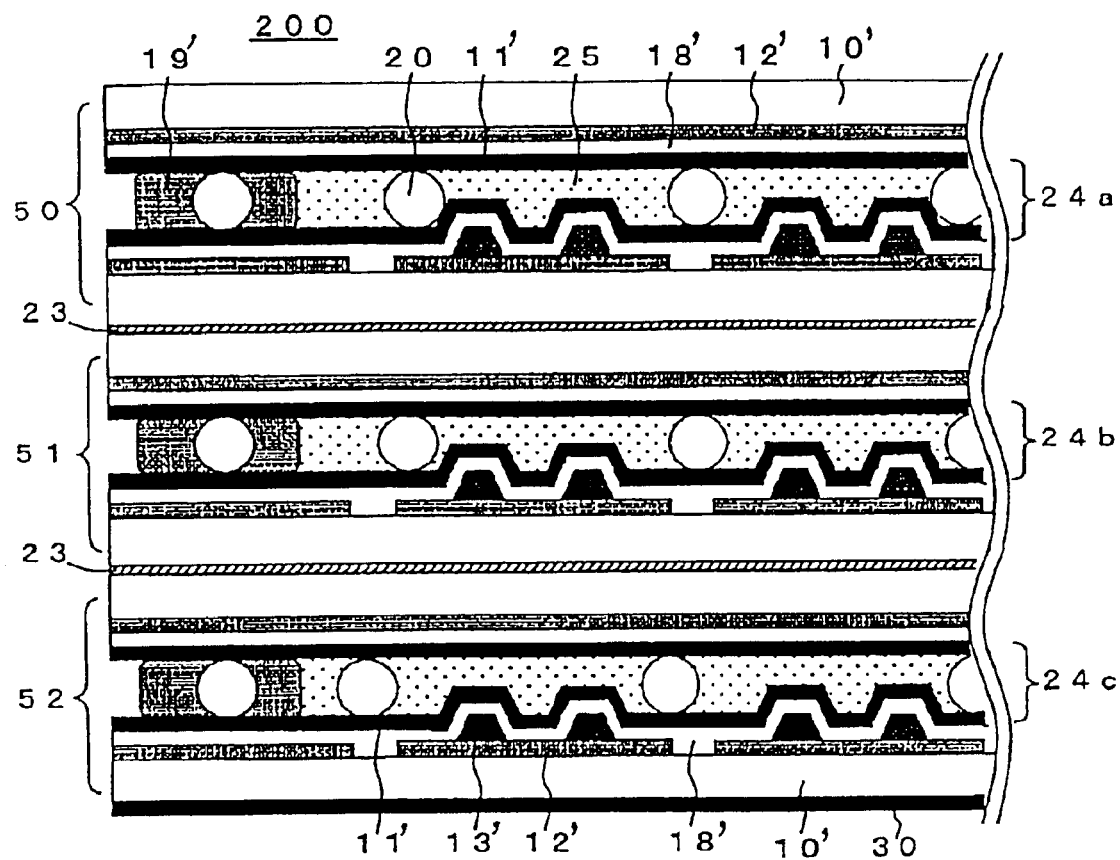
FIG. 42 is a cross section showing a structure of a multilayer liquid crystal display element.
Figure 43:
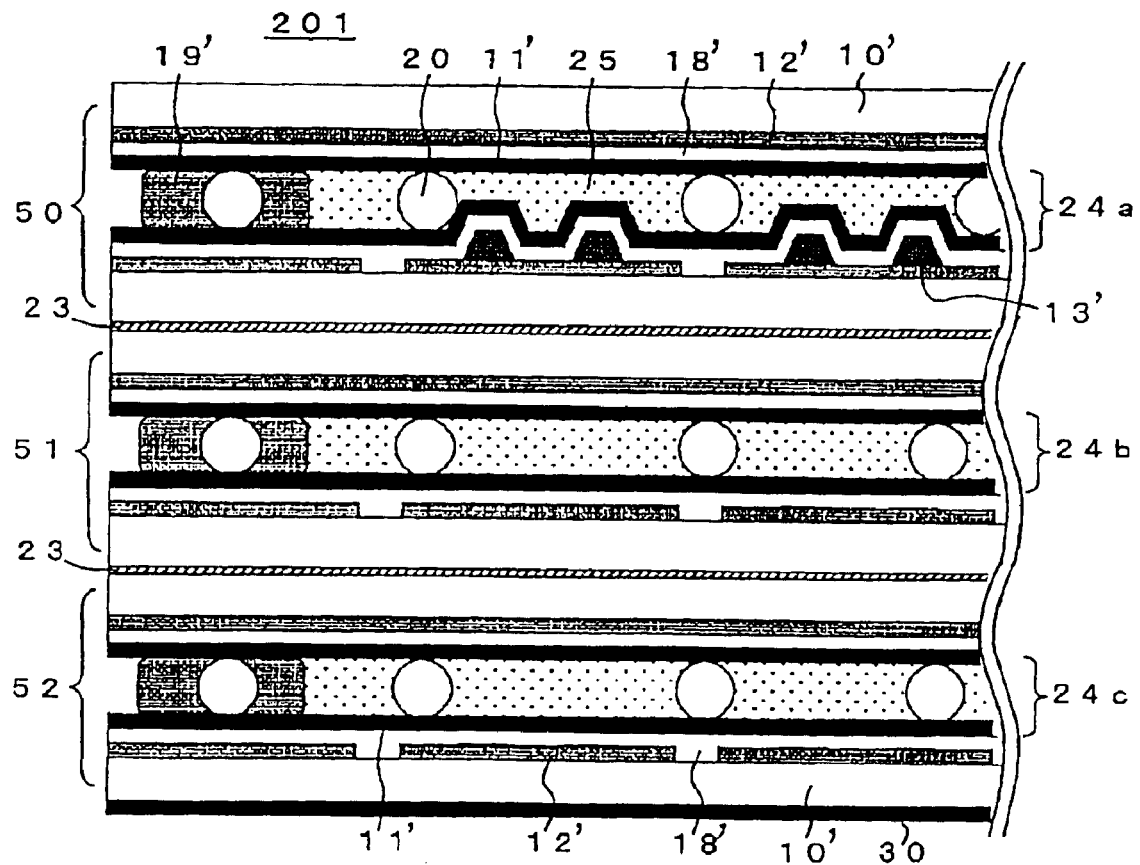
FIG. 43 is a cross section showing another structure of a multilayer liquid crystal display element.

(1) Element for Full-Color Display (See FIGS. 42 and 43)

As the multilayer element of the above type, the full-color liquid crystal display element of the reflection type can be achieved, in which the liquid crystal compositions, exhibing a cholesteric phase in the room temperature and having the positive dielectric anisotropy, are used, and the liquid crystal materials having the selective reflection wavelengths, which are adjusted to for red, green and blue, are used in the elements, respectively.

A multilayer element 200 shown in FIG. 42 includes liquid crystal elements 50, 51 and 52 for display in blue, green and red, which are arranged in this order from the observation side, and are stacked together, as well as a light absorber layer 30 on the rear-end surface. Each element has a basic structure similar to that shown in FIG. 30(a), but contains the liquid crystal composition, which is different in the selective reflection wavelength from the others. The element 50 uses the liquid crystal composition 24a having a peak wavelength of selective reflection in the blue region. The element 51 uses the liquid crystal composition 24b having a peak wavelength of selective reflection in the green region. The element 52 uses the liquid crystal composition 24c having a peak wavelength of selective reflection in the red region. The diameter of the spacer in each element may be appropriately determined independently of the others.

The layering or stacking order of these elements are not particularly restricted. In view of the selective reflection characteristics of the cholesteric liquid crystal, the blue, green and red elements may be layered in this order from the observation side, whereby the display characteristics such as brightness and color purity in the planar state can be improved.

The respective elements are bonded together by adhesive layer 23. For bonding the elements, for example, drops of the adhesive agent are applied between the elements, and alignment is performed to prevent shifting of the positions of the pixels. In this case, the adhesive may be a setting resin material such as a thermosetting resin material or a photo-setting resin material, or may be thermoplastic resin. The respective elements may be bonded together by the adhesive or adhesive sheet. The neighboring liquid crystal layers may use a common substrate.

In the multilayer element 200 shown in FIG. 42, the projected structures 13', which are the regulating means for reducing the light scattering in the focal conic state, are provided for each element. In particular, the arrangement pitch, height and material thereof are optimized for each element, whereby the display characteristics are further improved.

As shown in FIG. 43, the projected structures 13' may be arranged on only the element 50 on the observation side.

The groove(s) formed on the transparent electrode, the groove(s) formed on the insulating film and the region(s) on the orientation film providing the different orientation regulating force may be employed in all the elements or only one or some (particularly, the element on the observation side) of the elements.

Figure 44:
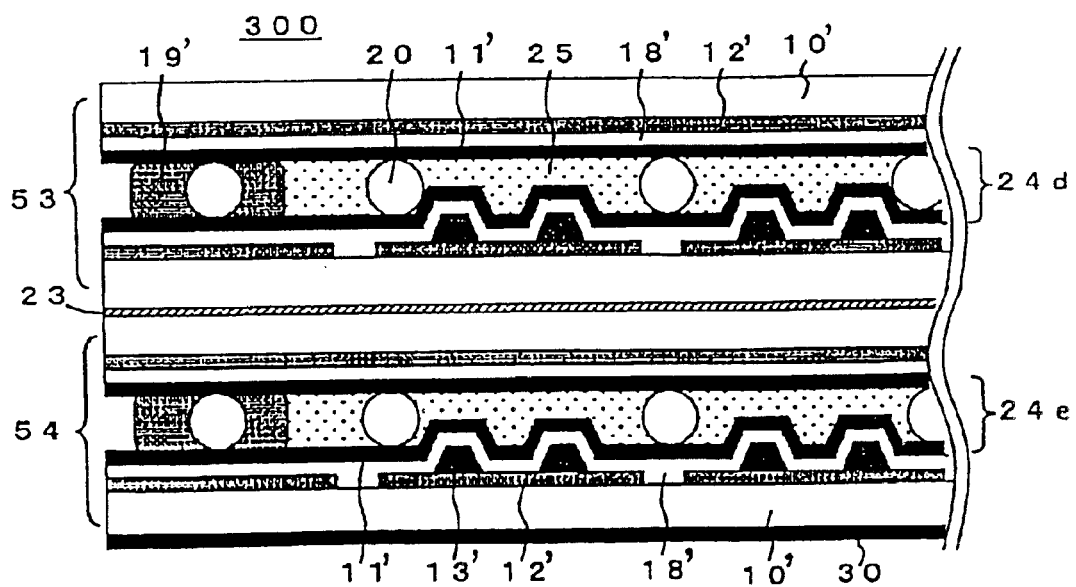
FIG. 44 is a cross section showing still another structure of a multilayer liquid crystal display element.
Figure 45:
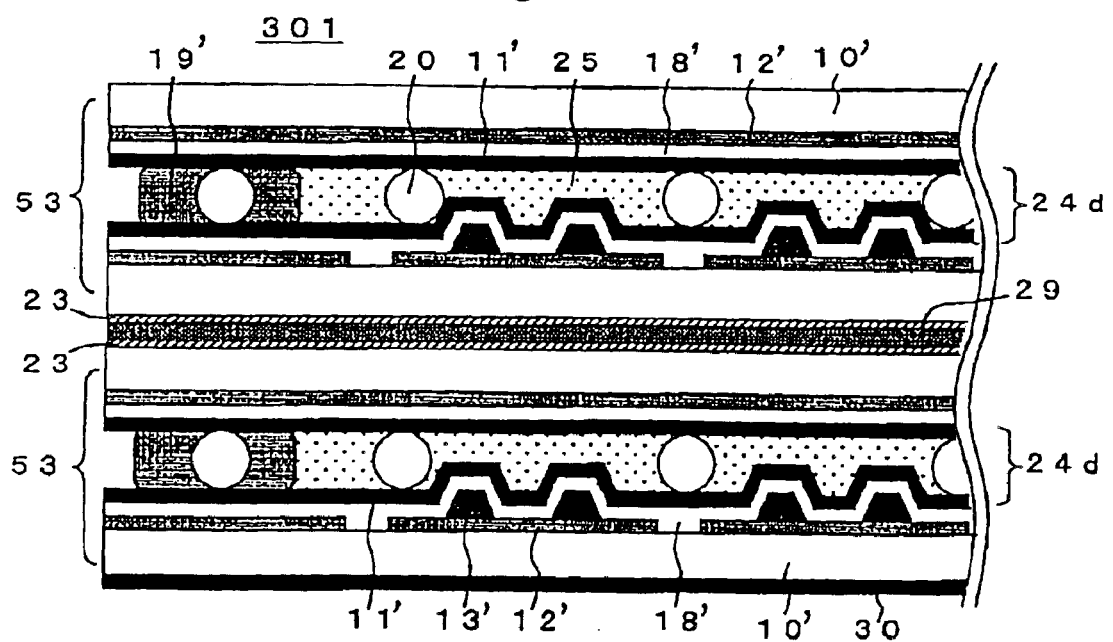
FIG. 45 is a cross section showing further another structure of a multilayer liquid crystal display element.

(2) High Reflectance Element (See FIGS. 44 and 45)

A multilayer element 300 shown in FIG. 44 includes two liquid crystal elements 53 and 54, which are stacked together and contains liquid crystal compositions 24d and 24e having different optical rotation directions, respectively. In general, when the cholesteric liquid crystal is in the planar state, the light coming in the direction parallel to the helical axes of the liquid crystal molecules is divided into two types of (i.e., right and left) circularly polarized light. One of them passes through the liquid crystal layer, and the other is reflected by the liquid crystal molecules. Accordingly, by stacking the plurality of elements providing different optical rotation directions, respectively, the light utilizing efficiency can be increased. If the elements 53 and 54 have the substantially same helical pitch, the reflectance can be substantially two times larger than that of the element providing only single optical rotation direction.

As shown in FIG. 45, a multilayer element 301 may include a ½ wavelength plate 29 interposed between the neighboring liquid crystal elements 53 of the same properties. Thereby, the light utilizing efficiency can be increased similarly to the multilayer element 300, and the element can have high reflectance.

In any one of the above cases, at least one of the liquid crystal elements may be provided with the orientation regulating means for regularly orientating the helical axes of the liquid crystal molecules in the focal conic state within a plane substantially parallel to the substrate surface. Thereby, the multilayer element can exhibit extremely high contrast.

The various forms have been described, the element is not restricted to them, and may be modified in various manners. Various manners may also be employed for orientation regulation or restriction.

EXPERIMENTAL EXAMPLES

Experimental examples will now be described. The following kinds of material, numeric values and others are described merely by way of example, the element according to the invention is not restricted to the following experimental examples.

Experimental Example 1'

In this experimental example, projected structures were formed.

Two glass substrates with ITO (manufactured by Central Glass Co., Ltd.) were used. Photolithography was effected on the ITO of each substrate to pattern it into belt-like forms having an electrode width of 300 μm and a pitch of 350 μm. Then, the projected structures were formed on the ITO-coated surface of one of the substrates in the following manner.

First, positive resist PC403 (manufacture by JSR Corp.) was applied by spin coating on the ITO-coated surface of the substrate under the conditions of 2000 rpm and 30 seconds, and was pre-baked at 90° C. for 2 minutes in a clean oven.

Using a photomask, which is provided with belt-like openings of 4 μm in width at a pitch of 10 μm, exposure was then performed at 100 mJ/cm2 by a UV exposing device. Then, development was performed with developer liquid (a 0.2% diluted liquid of PD-523AD manufactured by JSR Corp.) for 90 seconds, and rising was performed with flowing ultrapure water for removing unnecessary portions. Thereby, the belt-like structures of 1.5 μm in height were formed.

Thereafter, the structures wree subjected to post-exposure by the UV exposing device at 300 mJ/cm2. Post baking at 150° for five minutes was performed by a suction hot plate so that an inclined portion was formed on each of the above structures. Finally, a main curing processing was performed by a clean oven at 150° C. for 120 minutes so that the projected structures having a trapezoidal section were formed. The projected structure had a height of about 1.5 μm, an upper surface width of about 4 μm and a lower portion width of about 8 μm, and each inclined portion thereof is about 2 μm in width.

Then, the insulating films were formed on the opposite substrates in the following manner. Polysilazane solution L120 (manufactured by Tonen Corp.) was used, and a thin film thereof having a thickness of 1000 Å was formed on the electrode surface of each substrate by a spin coat method. The film was heated in a constant temperature oven at 120° C. for 2 hours, and further, was heated in the constant temperature oven at a temperature of 90° C. and a humidity of 85% for 3 hours. Thereafter, a polyimide material AL-8044 (manufactured by JSR Corp.) was applied by flexo printing, and was preliminarily baked at 80° C. for two minutes. Further, baking was performed at 160° C. for 60 minutes so that the orientation control film was formed.

Spacers (Micropearl SP2050 manufactured by Sekisui Chemical Co., Ltd.) of 5 μm were dispersed on the substrate provided with the projected structures, and a seal agent (XN21S manufactured by Mitsui Chemicals Co., Ltd.) was applied to the other substrate while leaving the liquid crystal inlet. These substrates were bonded together to form an empty cell.

As the liquid crystal composition, such chiral nematic liquid crystal was used that was formed of nematic liquid crystal E31-LV manufactured by Merk & Co. and chiral agent S-811 (24.5 wt %) manufactured by Merk & Co., and had the selective reflection peak wavelength λ adjusted to 550 nm. The liquid crystal composition had the helical pitch of about 343 nm. The liquid crystal composition was supplied into the cell by a vacuum-supply method. Finally, the liquid crystal inlet was closed by a seal agent to complete the liquid crystal light modulation element.

The liquid crystal light modulation element thus prepared was set to the focal conic state by applying a voltage across the transparent electrodes on the upper and lower substrates, and then the characteristics of the element were evaluated. The evaluation was made with a spectrophotometer (Hitachi Ltd.) by measuring the transmittance (transmissivity) while keep a space from an integrating sphere.

The transmittance of the element thus measured was 78%. For comparison, a liquid crystal display element was prepared in the same manner as the above except for that the projected structure was not employed. This element had the transmittance of about 62%. For determining the difference in states of the domains caused by present and absence of the projected structures, the elements in the focal conic state were observed with the polarization microscope. It was found that the directions of the helical axes were regulated and orientated uniformly in the element of this experimental example provided with the projected structures. In contrast to this, it was observed in the element for comparison not provided with the projected structure that the respective domains were oriented to have the helical axes in random directions.

The height, width and arrangement pitch of the projected structures were changed to various values for determining the influence by them. Such a tendency was found that the excessively large or small values outside the foregoing ranges lower the transmittance.

The arrangement pitch state of the projected structures was changed between the uniform pitch state and random pitch state for determining the influence by it. The transmittance was not changed substantially. However, the uniform pitch produced the diffracted light at a specific angle, which tendeds to lower the visibility.

Further, the arrangement direction of the projected structures and the arrangement direction of the pixels were changes variously for determining the influence by them. The transmittance was substantially same in any case. However, there was a tendency that the moire deteriorated the display quality if both kinds of directions were same.

Further, the longitudinal form of the projected structure was changed between the straight form and the dogleg form for determining the influence by it. The transmittance was substantially same in any case. However, the projected structure of the straight form was likely to cause a difference in visibility between observation in the same direction as the arrangement direction of the projected structures and observation in the direction perpendicular thereto.

Experimental Example 2'

In this experimental example, grooves were formed on the transparent electrode.

Two glass substrates with ITO (manufactured by Central Glass Co., Ltd.) were used. Photolithography was effected on the ITO of each substrate to pattern it into belt-like forms having an electrode width of 300 μm and a pitch of 350 μm. Simultaneously with the patterning of ITO, the grooves were formed on one of the substrates in the following manner.

First, positive resist OFPR-800 (manufactured by Tokyo Ohka Kogyo Co., Ltd.) was applied by spin coating on the ITO-coated surface of the substrate, and was pre-baked at 80° C. for 15 minutes in a clean oven. Using a photomask, which is provided with belt-like openings of 4 μm in width at a pitch of 10 μm, exposure was then performed at 30 mJ/cm2 by a UV exposing device.

Then, development was performed with developer liquid (SD-1 manufactured by Tokuyama Corp.), and rising was performed with flowing ultrapure water for removing unnecessary portions. Thereafter, post-baking was performed at 120° C. for 15 minutes. Etching for ITO was performed with iron-salt liquid D (manufactured by Hayashi Pure Chemical Ind., Ltd.) for 20 minutes. Finally, the resist peeling processing was performed with a 2% water solution of NaOH for 2 minutes. In this manner, the ITO pattern provided with the grooves was formed on one of the substrates. Thereafter, processing similar to that of the experimental example 1' was performed to form the insulating film and the orientation film, disperse the spacers, apply the seal agent, bond the substrates and supply the liquid crystal so that the liquid crystal light modulation element was produced.

The liquid crystal light modulation element thus prepared was set to the focal conic state by applying a voltage, and then the characteristics of the element were evaluated similarly to the experimental example 1'. The transmittance of the element was 82%.

The width and arrangement pitch of the grooves were changed to various values for determining the influence by them. Such a tendency was found that the excessively large or small values outside the foregoing ranges lower the transmittance.

The arrangement pitch state of the grooves was changed between the uniform pitch state and random pitch state for determining the influence by it. The transmittance was substantially same in any case. However, the uniform pitch produced the diffracted light at a specific angle, which tended to lower the visibility.

Further, the arrangement direction of the grooves and the arrangement direction of the pixels were changes variously for determining the influence by them. The transmittance was substantially same in any case. However, there was a tendency that the moire deteriorated the display quality if both kinds of directions were substantially same.

Further, the longitudinal form of the groove was changed between the straight form and the dogleg form for determining the influence by it. The transmittance was substantially same in any case. However, the groove of the straight form was likely to cause a difference in visibility between observation in the same direction as the arrangement direction of the grooves and observation in the direction perpendicular thereto.

Experimental Example 3'

In this experimental example, rubbing processing is effected on the orientation film.

Two glass substrates with ITO (manufactured by Central Glass Co., Ltd.) were used. Photolithography was effected on the ITO of each substrate to pattern it into belt-like forms having an electrode width of 300 μm and a pitch of 350 μm.

An insulating material was applied to the ITO-coated surface, and was baked to form the insulating film. A polyimide material AL-8044 (manufactured by JSR Corp.) was applied by flexo printing, and was preliminarily baked at 80° C. for two minutes. Further, baking was performed at 160° C. for 60 minutes so that the orientation control film was formed.

Then, positive resist OFPR-800 (manufactured by Tokyo Ohka Kogyo Co., Ltd.) was applied by spin coating on the orientation control film-coated surface of one of the substrates, and was pre-baked at 80° C. for 15 minutes in a clean oven. Using a photomask, which is similar to that used in the experimental example 1' and is provided with openings, exposure was then performed at 30 mJ/cm2 by a UV exposing device. Then, development was performed with developer liquid (SD-1 manufactured by Tokuyama Corp.), and rising was performed with flowing ultrapure water for removing unnecessary portions. Thereafter, post-baking was performed at 120° C. for 15 minutes. In this manner, the mask layer was formed for the next rubbing processing.

Then, rubbing processing was effected on the substrate coated with the mask layer. The rubbing processing was effected two times through the mask layer with a brush roll having a pressed brush height (brush pressed amount) of 0.4 mm and a roller radius of 75 mm under the conditions of the roller rotation speed of 900 rpm and the substrate moving speed of 30 mm/sec.

After the rubbing, the resist peeling was performed with isopropyl alcohol (IPA) for two minutes to remove the mask layer. Thereafter, processing similar to that of the experimental example 1' was performed to disperse the spacers, apply the seal agent, bond the substrates and supply the liquid crystal so that the liquid crystal light modulation element was produced.

The liquid crystal light modulation element thus prepared was set to the focal conic state by applying a voltage, and then the characteristics of the element were evaluated similarly to the experimental example 1'. The transmittance of the element was 80%.

The width and arrangement pitch of the rubbed portions were changed to various values for determining the influence by them. Such a tendency was found that the excessively large or small values outside the foregoing ranges lower the transmittance.

The arrangement pitch state of the rubbed portions was changed between the uniform pitch state and random pitch state for determining the influence by it. The transmittance was substantially same in any case. However, the uniform pitch produced the diffracted light at a specific angle, which tended to lower the visibility.

Further, the arrangement direction of the rubbed portions and the arrangement direction of the pixels were changes variously for determining the influence by them. The transmittance was substantially same in any case. However, there was a tendency that the moire deteriorated the display quality if both kinds of directions were substantially same.

Further, the form of the rubbed portion was changed between the straight form and the dogleg form for determining the influence by it. The transmittance was substantially same in any case. However, the rubbed portion of the straight form was likely to cause a difference in visibility between observation in the same direction as the arrangement direction of the rubbed portions and observation in the direction perpendicular thereto.

Experimental Example 4'

In this experimental example, optical orientation processing is effected on the orientation film.

Two glass substrates with ITO (manufactured by Central Glass Co., Ltd.) were used. Photolithography was effected on the ITO of each substrate to pattern it into belt-like forms having an electrode width of 300 $\mu$m and a pitch of 350 $\mu$m. Polysilazane solution L120 (manufactured by Tonen Corp.) was used, and a thin film thereof having a thickness of 1000 Å was formed on the electrode surface of each substrate by a spin coat method. The film was heated in a constant temperature oven at 120° C. for 2 hours, and further, was heated in the constant temperature oven at a temperature of 90° C. and a humidity of 85% for 3 hours. Thereafter, a polyimide material (TT-054 manufactured by Hitachi Chemical Co., Ltd.) was applied by spin coating under the conditions of 3000 rpm and 30 seconds, and was preliminarily baked at 100° C. for one minute. Further, baking at 230° C. for 30 minutes was performed to complete the orientation film.

The orientation film on one of the substrates was subjected to the partial orientation processing, which was effected through a photomask provided with opening portions similar to that of the experimental example 1' and a polarizing plate by the UV irradiation device with 5 J/cm2 and the incident angle of 15°.

Thereafter, processing similar to that of the experimental example 1' was performed to disperse the spacers, apply the seal agent, bond the substrates and supply the liquid crystal so that the liquid crystal light modulation element was produced.

The liquid crystal light modulation element thus prepared was set to the focal conic state by applying a voltage, and then the characteristics of the element were evaluated similarly to the experimental example 1'. The transmittance of the element was 80%.

In connection with the width and arrangement pitch of the optically orientated portions, such a tendency was found that the excessively large or small values outside the foregoing ranges lower the transmittance. If the arrangement pitch of the optically orientated portions was uniform, the transmittance was not changed substantially, but the visibility was likely to lower due to the influence of the diffracted light. If the arrangement direction of the optically orientated portions and the arrangement direction of the pixels were same, the transmittance was not changed substantially, but there was a tendency that the moire deteriorated the display quality. If the arrangement of the optically orientated portion was straight, the transmittance was not changed substantially, but a difference was likely to be caused in visibility between observation in the same direction as the arrangement of the optically orientated portions and observation in the direction perpendicular thereto.

Experimental Example 5'

In this experimental example, grooves were formed on the insulating film.

Two glass substrates with ITO (manufactured by Central Glass Co., Ltd.) were used. Photolithography was effected on the ITO of each substrate to pattern it into belt-like forms having an electrode width of 300 $\mu$m and a pitch of 350 $\mu$m.

Then, positive resist PC335 (manufactured by JSR Corp.) was applied by spin coating on the ITO-coated surface of the substrate under the conditions 3000 rpm and 30 seconds, and was pre-baked at 90° C. for 2 minutes in a clean oven. Using a photomask provided with openings of 2 $\mu$m in width and 10 $\mu$m in arrangement pitch, exposure was then performed at 100 mJ/cm2 by a UV exposing device.

Then, development was performed with developer liquid (five times diluted liquid of PD-532AD manufactured by JSR Corp.), and rising was performed with flowing ultrapure water for removing unnecessary portions. Thereafter, post-exposure was performed at 300 mJ/cm2 by a UV exposing device. Finally, a main curing processing was performed by a clean oven at 150° C. for 120 minutes so that the insulating film of 0.5 $\mu$m in height having the belt-like grooves was formed.

Thereafter, processing similar to that of the experimental example 1' was performed to form the orientation film, disperse the spacers, apply the seal agent, bond the substrates and supply the liquid crystal so that the liquid crystal light modulation element was produced.

The liquid crystal light modulation element thus prepared was set to the focal conic state by applying a voltage, and then the characteristics of the element were evaluated similarly to the experimental example 1'. The transmittance of the element was 80%.

The width and arrangement pitch of the grooves were changed to various values for determining the influence by them. Such a tendency was found that the excessively large or small values outside the foregoing ranges lower the transmittance.

The arrangement pitch of the grooves was changed between the uniform pitch and random pitch for determining the influence by it. The transmittance was not changed substantially. However, the uniform pitch produced the diffracted light at a specific angle, which tended to lower the visibility.

Further, the arrangement direction of the grooves and the arrangement direction of the pixels were changes variously for determining the influence by them. The transmittance was substantially same in any case. However, there was a tendency that the moire deteriorated the display quality if both kinds of directions were same.

Further, the longitudinal form of the groove was changed between the straight form and the dogleg form for determining the influence by it. The transmittance was substantially same in any case. However, the groove of the straight form was likely to cause a difference in visibility between observation in the same direction as the arrangement direction of the grooves and observation in the direction perpendicular thereto.

Experimental Example 6'

In this experimental example, projected structures were formed in the multilayer liquid crystal display element.

As substrates, two films FST-5352 (manufactured by Sumitomo Bakelite Co., Ltd.) with flexible ITO film were used. Photolithography was effected on the ITO of each substrate to pattern it into belt-like forms having an electrode width of 300 μm and a pitch of 350 μm.

On the surface of one (first substrate) of the substrates provided with the transparent electrode, the projected structures having a trapezoidal section was formed similarly to the experimental example 1'. The projected structure had a height of about 1.5 μm, an upper surface width of about 4 μm and an inclined side portion width of about 2 μm.

Polysilazane solution L120 (manufactured by Tonen Corp.) was used, and a thin film thereof having a thickness of 1000 Å was formed on the electrode surface of each substrate by a spin coat method. The film was heated in a constant temperature oven at 120° C. for 2 hours, and further, was heated in the constant temperature oven at a temperature of 90° C. and a humidity of 85% for 3 hours. Thus the insulating film was prepared. Then, an orientation film material AL4552 (manufactured by JSR Corp.) was applied by the spin coat method to form a thin film of 500 Å in thickness on the insulating film of each substrate, and was heated in the constant temperature oven at a temperature of 165° C. for 2 hours. Thus the orientation film was prepared on which the rubbing processing was not performed.

UV-curing resin (epoxy resin) material UV RESIN T-470/UR-7092 (manufactured by Nagase-CIBA Ltd., glass transition point of 144° C.), in which spacers (Micropearl SP205) of 5 μm in particle diameter were mixed, was applied to the periphery of the first substrate by screen printing. Then, the resin material was irradiated with light emitted from a high-voltage mercury lamp HMW-244-11CM (manufactured by ORC Producing Co., Ltd.) of 4 kW with an integrated amount of light of 4000 mJ/cm2. Thereby, a seal was formed. The seal thus formed had an annular form surrounding the display region. After applying the resin material for the seal, it was sucked and fixed on the hot plate at 80° C. for 30 minutes.

Then, resin structures for adhering the opposite substrates were formed on the substrate (second substrate) not provided with the projected structures. In this example, polyester resin Alonmelt PES-360SA40 (manufactured by Three Bond Co., Ltd), which is thermoplastic resin, was used for the above resin structures, and was applied by the screen printing method to form the resin structures arranged in a grid-like form with a pitch of 350 μm. Each resin structure had a diameter of 50 μm and a height of 6.5 μm.

In this manner, the two substrates were prepared before bonding. The first substrate was vacuum-sucked onto the hot plate, and liquid crystal composition containing spacers of an intended particle diameter dispersed therein was applied to the end of the substrate. The opposite substrates were overlaid at the end carrying the resin composition such that the belt-like electrodes on the opposite substrates may be perpendicular to each other. The substrates were pressed and bonded together by a heating roller and a pressure roller.

In the bonding operation, the first substrate was vacuum-sucked and fixed onto the hot plate preheated to 80° C. with its orientation film directed upward, and the liquid crystal composition was applied to the end of the substrate. The volume of applied composition is smaller than a volume of a space defined between the opposite substrates and within the seal.

The liquid crystal composition was formed of nematic liquid crystal E44 and chiral agent S811 (32 wt %) both manufactured by Merk & Co., and contained spacers formed of Micropearl SP205 of 5 μm in particle diameter. A liquid crystal element for blue display was prepared in this manner, In this element, the liquid crystal layer had the selective reflection wavelength of 490 nm, and the liquid crystal composition had the helical pitch of about 306 nm.

In similar manners, the liquid crystal elements for green display and red display were prepared. The liquid crystal composition for green display was formed of nematic liquid crystal E44 and 30 wt % of chiral agent S811, both manufactured by Merk & Co. The liquid crystal composition for red display was formed of nematic liquid crystal E44 and 25 wt % of chiral agent S811, both manufactured by Merk & Co. For providing the substrate gaps of 7 μm and 9 μm, spacers SP205 and SP209 (manufactured by Sekisui Chemical Co., Ltd.) of 7 μm and 9 μm in diameter were used. The liquid crystal element for green display had the selective reflection wavelength of 560 nm, and the liquid crystal element for red display had the selective reflection wavelength of 680 nm. The helical pitches of the liquid crystal composition were about 350 nm and about 425 nm.

After forming the elements for display in respective colors, the respective elements were bonded together by an adhesive T-#5511 (manufactured by Sekisui Chemical Co., Ltd.) while locating the pixels in the aligned positions. A light absorber layer was arranged on the substrate surface in the third layer not provided with the transparent electrode. Thereby, the multilayer liquid crystal display element was prepared.

Predetermined voltages were applied to the respective elements of the multilayer liquid crystal display element thus prepared to set all the liquid crystal layer to the focal conic state, and the Y-value of 3.5 was obtained when measured by a reflective spectrocolorimeter CM-3700d (manufactured by Minolta Co., Ltd.). If the projected structure was not present, the Y-value was equal to 4.5.

Experimental Example 7'

In this experimental example, projected structures were formed in the two elements of the multilayer liquid crystal display element.

In addition to the liquid crystal display element for blue display, the projected structures having a trapezoidal section were formed in the liquid crystal display element for green display, similarly to the experimental example 6'. The arrangement pitch of the structure was 14 μm. The projected structure had a height of about 1.5 μm, an upper surface width of about 4 μm and an inclined portion width of about 2 μm. Structures and manners other than the above are the same as those of the experimental example 6'.

Predetermined voltages were applied to the respective elements of the multilayer liquid crystal display element thus prepared to set all the liquid crystal layer to the focal conic state, and the Y-value of 3.1 was obtained when measured by the reflective spectrocolorimeter CM-3700d (manufactured by Minolta Co., Ltd.).

Experimental Example 8'

In this experimental example, projected structures were formed in the three elements of the multilayer liquid crystal display element.

In addition to the liquid crystal display elements for blue display and green display, the projected structures were formed with a pitch of 18 µm in the liquid crystal display element for red display. The projected structure had a height of about 1.5 µm, an upper surface width of about 4 µm and an inclined portion width of about 2 µm. Structures and manners other than the above are the same as those of the experimental example 6'.

Predetermined voltages were applied to the respective elements of the multilayer liquid crystal display element thus prepared to set all the liquid crystal layer to the focal conic state, and the Y-value of 2.8 was obtained when measured by the reflective spectrophotometric calorimeter CM-3700d (manufactured by Minolta Co., Ltd.).

Experimental Example 9'

In this experimental example, grooves were formed on the transparent electrode in the multilayer liquid crystal display element.

The liquid crystal display element for green display was formed in a manner similar to that of the experimental example 5' except for that grooves of a pitch of 10 µm and a width of 3.0 µm were formed on the transparent electrode of the substrate remote from the observation side of the green display liquid crystal display element, and the projected structure was not formed. The grooves were formed in a manner similar to that of the experimental example 2'.

The liquid crystal display elements for blue display and green display were prepared in a manner similar to that of the experimental example 5' without forming the projected structure and the groove on the transparent electrode. Thus, the multilayer liquid crystal display element was formed.

Predetermined voltages were applied to the respective elements of the multilayer liquid crystal display element thus prepared to set all the liquid crystal layer to the focal conic state, and the Y-value of 3.4 was obtained when measured by the reflective spectrocolorimeter CM-3700d (manufactured by Minolta Co., Ltd.).

Experimental Example 10'

In this experimental example, projected structures were formed on the three elements in the multilayer liquid crystal display element with different sizes and arrangement pitches depending on the elements, respectively.

The multilayer liquid crystal element was prepared in a manner similar to that of the experimental example 7' except for that different masks were used for forming the projected structures of different sizes and arrangement pitches depending on the elements, respectively. The liquid crystal display element for blue display had the projected structures of the pitch of 10 µm and height of 3.0 µm. The liquid crystal display element for green display had the projected structures of the pitch of 14 µm and height of 3.5 µm. The liquid crystal display element for red display had the projected structures of the pitch of 18 µm and width of 4.5 µm.

Predetermined voltages were applied to the respective elements of the multilayer liquid crystal display element thus prepared to set all the liquid crystal layer to the focal conic state, and the Y-value of 2.8 was obtained when measured by the reflective spectrocolorimeter CM-3700d (manufactured by Minolta Co., Ltd.).

Experimental Example 11'

In this experimental example, a structure formed of two layers of cells having the same selective wavelength and different helical directions were prepared.

The left handed rotatory chiral nematic liquid crystal was formed of nematic liquid crystal E-31LV and 24.5 wt % of chiral agent S-811, both manufactured by Merk & Co. The right handed rotatory chiral nematic liquid crystal was formed of nematic liquid crystal E-31LV and 24.5 wt % of chiral agent R-811, both manufactured by Merk & Co.

These liquid crystal compositions had the selective reflection wavelength of 550 nm for green display. These liquid crystal compositions had the helical pitch of 343 nm.

In the producing method similar to that of the experimental example 1' and with the similar projected structures, the respective elements were prepared. The elements thus prepared were stacked with transparent adhesive layers therebetween so that the element was prepared. The element thus prepared had the reflectance of 73% in the reflecting state and the reflectance of 2% in the transparent state, and therefore had high contrast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal light modulation element for performing light modulation by utilizing a focal conic state of liquid crystal molecules included in a liquid crystal layer having a plurality of liquid crystal domains and held between a pair of substrates, wherein the liquid crystal layer includes regions in which helical axes of the liquid crystal molecules of neighboring liquid crystal domains in the focal conic state extend in directions which are substantially the same and substantially parallel to a substrate surface, and thereby the helical axes of the liquid crystal molecules in the focal conic state extend in regular directions within a plane substantially parallel to a substrate surface.

2. A liquid crystal light modulation element according to claim 1, wherein a region providing a different orientation regulating force is arranged partially on a surface of at least one of the substrates in contact with the liquid crystal for orienting helical axes of the liquid crystal molecules in regular directions.

3. A liquid crystal light modulation element according to claim 2, wherein an orientation film is arranged on the surface, in contact with the liquid crystal, of the substrate provided with said region.

4. A liquid crystal light modulation element according to claim 3, wherein said region is formed by partially effecting rubbing.

5. A liquid crystal light modulation element according to claim 3, wherein said region is formed by partially effecting light irradiation.

6. A liquid crystal light modulation element according to claim 2, wherein
said region is formed by partially effecting rubbing.

7. A liquid crystal light modulation element according to claim 3, wherein
said region is formed by partially effecting light irradiation.

8. A liquid crystal light modulation element according to claim 2, wherein
said region is formed by partially using a different material.

9. A liquid crystal light modulation element according to claim 2, wherein
a width W of said region of the different orientation regulating force and a helical pitch p of the liquid crystal molecules satisfy a relationship of p<W<20p.

10. A liquid crystal light modulation element according to claim 2, wherein
an arrangement pitch L of said regions of the different orientation regulating force and a helical pitch p of the liquid crystal molecules satisfy a relationship of 5p<L<100p.

11. A liquid crystal light modulation element according to claim 10, wherein
said arrangement pitch L of said regions of the different orientation regulating force is not uniform within a range satisfying said relationship.

12. A liquid crystal light modulation element according to claim 2, comprising:
a plurality of pixels arranged in a direction different from a direction of arrangement of said regions of the different orientation regulating force.

13. A liquid crystal light modulation element according to claim 2, comprising:
a plurality of regions which are different in a direction of arrangement of said regions of the different orientation regulating force.

14. A multilayer liquid crystal light modulation element comprising a plurality of liquid crystal light modulation elements stacked together in which an element according to claim 1 is included.

15. A multilayer liquid crystal light modulation element according to claim 14, wherein
at least the element on the end of the front side is the element according to claim 1.

16. A multilayer liquid crystal light modulation element according to claim 14, wherein
the elements have different peak wavelengths of selective reflection, respectively.

17. A multilayer liquid crystal light modulation element according to claim 14, comprising:
at least two liquid crystal layers having different optical rotation directions, respectively.

18. A multilayer liquid crystal light modulation element according to claim 17, wherein
said liquid crystal layers having different optical rotation directions have a substantially equal peak wavelength of selective reflection.

19. A multilayer liquid crystal light modulation element comprising an element according to claim 1 and an element stacked together with said element and containing liquid crystal molecules having helical axes extending irregularly in a plane substantially parallel to a substrate surface when being in the focal conic state.

20. A liquid crystal light modulation element according to claim 19, wherein
at least the element on the end of the front side is the element according to claim 1.

21. A multilayer liquid crystal light modulation element according to claim 19, wherein
the elements have different peak wavelengths of selective reflection, respectively.

22. A multilayer liquid crystal light modulation element according to claim 19, comprising:
at least two liquid crystal layers having different optical rotation directions, respectively.

23. A multilayer liquid crystal light modulation element according to claim 22, wherein
said liquid crystal layers having different optical rotation directions have a substantially equal peak wavelength of selective reflection.

24. A liquid crystal light modulation element according to claim 1, wherein
the liquid crystal exhibiting the focal conic state is a liquid crystal exhibiting a cholesteric phase at a room temperature.

25. A liquid crystal light modulation element according to claim 24, wherein
the liquid crystal exhibiting the focal conic state is a liquid crystal having positive dielectric anisotropy.

26. A liquid crystal light modulation element according to claim 1, wherein
display is performed by switching the liquid crystal between the focal conic state and a planar state.

27. A liquid crystal light modulation element according to claim 26, wherein
the liquid crystal in the planar state has a peak of selective reflection in a visible wavelength range.

28. A liquid crystal light modulation element for performing light modulation by utilizing a focal conic state of liquid crystal molecules included in a liquid crystal layer having a plurality of liquid crystal domains and held between a pair of substrates, wherein the liquid crystal layer includes regions in which helical axes of the liquid crystal molecules of neighboring liquid crystal domains in the focal conic state are extended in directions which are substantially the same and substantially parallel to a substrate surface by orientation regulating means for orienting the helical axes of the liquid crystal molecules in the focal conic state, and thereby the helical axes of the liquid crystal molecules in the focal conic state are extended in regular directions within the plane substantially parallel to the substrate surface.

29. A liquid crystal light modulation element according to claim 28, wherein
the orientation regulating means orients the helical axes of the liquid crystal molecules in the focal conic state along the regular directions when a predetermined electric field is applied across the substrates.

30. A liquid crystal light modulation element according to claim 29, wherein
the orientation regulating means orients the helical axes of the liquid crystal molecules in the focal conic state along the regular directions by causing anisotropy in directions of lines of electric force of the electric field.

31. A liquid crystal light modulation element according to claim 30, wherein
the orientation regulating means is a projected structure formed on at least one of the substrates, and the anisotropy is caused in the directions of the equal potential lines of said electric field by the projected structure.

32. A liquid crystal light modulation element according to claim 31, wherein said projected structure has a rib-like form.

33. A liquid crystal light modulation element according to claim 31, wherein said projected structure has a side surface inclined with respect to a direction of a substrate normal.

34. A liquid crystal light modulation element according to claim 31, wherein an electrode is formed on a surface of each of said substrates, and said projected structure is formed on the electrode of at least one of the substrates.

35. A liquid crystal light modulation element according to claim 31, wherein a height h of said projected structure and a gap d between said substrates satisfy a relationship of $d/20 < h < d/2$.

36. A liquid crystal light modulation element according to claim 31, wherein a width W of said projected structure and a helical pitch p of the liquid crystal molecules satisfy a relationship of $p < W < 20p$.

37. A liquid crystal light modulation element according to claim 31, wherein an arrangement pitch L of said projected structures and a helical pitch p of the liquid crystal molecules satisfy a relationship of $5p < L < 100p$.

38. A liquid crystal light modulation element according to claim 37, wherein said arrangement pitch L of said projected structures is not uniform within a range satisfying said relationship.

39. A liquid crystal light modulation element according to claim 31, comprising:

a plurality of pixels arranged in a direction different from a direction of arrangement of said projected structures.

40. A liquid crystal light modulation element according to claim 31, comprising:

a plurality of regions which are different in a direction of arrangement of said projected structures.

41. A liquid crystal light modulation element according to claim 30, wherein an electrode is formed on each of said substrates and the orientation regulating means is a groove formed on the electrode on at least one of the substrates, and the anisotropy is caused in the directions of the lines of electric force of said electric field by the groove.

42. A liquid crystal light modulation element according to claim 41, wherein a width W of said groove and a helical pitch p of the liquid crystal molecules satisfy a relationship of $p < W < 20p$.

43. A liquid crystal light modulation element according to claim 41, wherein an arrangement pitch L of said grooves and a helical pitch p of the liquid crystal molecules satisfy a relationship of $5p < L < 100p$.

44. A liquid crystal light modulation element according to claim 43, wherein said arrangement pitch L of said grooves is not uniform within a range satisfying said relationship.

45. A liquid crystal light modulation element according to claim 41, comprising:

a plurality of pixels arranged in a direction different from a direction of arrangement of said grooves.

46. A liquid crystal light modulation element according to claim 41, comprising:

a plurality of regions which are different in a direction of arrangement of said grooves.

47. A liquid crystal light modulation element according to claim 30, wherein an insulating film is formed on at least one of the substrates and the orientation regulating means is a groove formed on the insulating film, and the anisotropy is caused in the directions of the lines of electric force of the electric field by the groove.

48. A liquid crystal light modulation element according to claim 47, wherein a width W of said groove and a helical pitch p of the liquid crystal molecules satisfy a relationship of $p < W < 20p$.

49. A liquid crystal light modulation element according to claim 47, wherein an arrangement pitch L of said grooves and a helical pitch p of the liquid crystal molecules satisfy a relationship of $5p < L < 100p$.

50. A liquid crystal light modulation element according to claim 49, wherein said arrangement pitch L of said grooves is not uniform within a range satisfying said relationship.

* * * * *

UNITED STATES PATENT AND TRADEMARK OFFICE
CERTIFICATE OF CORRECTION

PATENT NO. : 6,947,114 B2  Page 1 of 1
APPLICATION NO. : 10/901885
DATED : September 20, 2005
INVENTOR(S) : Masakazu Okada, Kiyofumi Hashimoto and Mitsuyoshi Miyai It is certified that error appears in the above-identified patent and that said Letters Patent is hereby corrected as shown below:

Title Page:
(75) Inventors:, delete "Jun Yamada, Takatsuki (JP); Masakazu Okada, Kyoto (JP); Kiyofumi Hashimoto, Suita (JP); Mitsuyoshi Miyai, Sakai (JP)" and insert -- Masakazu Okada, Kyoto (JP); Kiyofumi Hashimoto, Suita (JP); Mitsuyoshi Miyai, Sakai (JP) --.

Column 81:
Line 5, delete" claim 3," and insert -- claim 2, --.

Signed and Sealed this

Twenty-fourth Day of April, 2007

JON W. DUDAS
*Director of the United States Patent and Trademark Office*